(12) United States Patent
Lindores et al.

(10) Patent No.: US 9,058,633 B2
(45) Date of Patent: *Jun. 16, 2015

(54) WIDE-AREA AGRICULTURAL MONITORING AND PREDICTION

(75) Inventors: Robert J. Lindores, Christchurch (NZ); Ted Mayfield, Ukiah, CA (US); Morrison Ulman, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 863 days.

This patent is subject to a terminal disclaimer.

(21) Appl. No.: 13/280,298

(22) Filed: Oct. 24, 2011

(65) Prior Publication Data
US 2012/0101861 A1 Apr. 26, 2012

Related U.S. Application Data

(63) Continuation-in-part of application No. 12/911,046, filed on Oct. 25, 2010, now abandoned.

(51) Int. Cl.
*G01D 18/00* (2006.01)
*G06Q 50/02* (2012.01)
*G06Q 10/06* (2012.01)

(52) U.S. Cl.
CPC ............... *G06Q 50/02* (2013.01); *G06Q 10/06* (2013.01); *G06Q 10/063* (2013.01)

(58) Field of Classification Search
USPC ................... 702/2, 3, 5, 188; 382/110, 195
See application file for complete search history.

(56) References Cited

U.S. PATENT DOCUMENTS

| 5,003,329 A | 3/1991 | Itabashi |
| 5,087,916 A | 2/1992 | Metzdorff et al. |
| 5,103,250 A | 4/1992 | Arifuku et al. |
| 5,229,552 A | 7/1993 | Cole |
| 5,247,356 A | 9/1993 | Ciampa |

(Continued)

FOREIGN PATENT DOCUMENTS

| JP | 2004073203 A | 3/2004 |
| JP | 2007024859 A | 2/2007 |

(Continued)

OTHER PUBLICATIONS

U.S. Appl. No. 13/023,411, filed Feb. 8, 2011, Wuestefeld et al.

(Continued)

*Primary Examiner* — Sujoy Kundu
*Assistant Examiner* — Ricky Ngon

(57) ABSTRACT

A system for agricultural monitoring and prediction comprises a first reporting agent a second reporting agent a database, and a processor. The first reporting agent is configured for reporting aerial data representing relative measurements of an agricultural metric in a geographic area, the relative measurements having an unknown bias. The second reporting is configured for reporting ground-based data representing absolute measurements of the agricultural metric for a portion of the geographic area. The database is configured for storing the absolute measurement data and the relative measurement data along with other farming data for a wide geographic area. The processor is configured for accessing the database and using the ground-based data for the portion of the geographic area to calibrate the aerial data, thereby synthesizing absolute measurements of the agricultural metric for the geographic area from the aerial data.

20 Claims, 26 Drawing Sheets

(56) References Cited

U.S. PATENT DOCUMENTS

| | | |
|---|---|---|
| 5,427,356 A | 6/1995 | Krotov et al. |
| 5,506,644 A | 4/1996 | Suzuki et al. |
| 5,517,419 A | 5/1996 | Lanckton et al. |
| 5,581,299 A | 12/1996 | Raney |
| 5,596,494 A | 1/1997 | Kuo |
| 5,633,946 A | 5/1997 | Lachinski et al. |
| 5,646,207 A | 7/1997 | Schell |
| 5,689,742 A | 11/1997 | Chamberlain |
| 5,719,773 A | 2/1998 | Choate |
| 5,768,640 A | 6/1998 | Takahashi et al. |
| 5,771,169 A | 6/1998 | Wendte |
| 5,845,161 A | 12/1998 | Schrock et al. |
| 5,897,728 A | 4/1999 | Cole et al. |
| 5,902,347 A | 5/1999 | Backman et al. |
| 5,913,078 A | 6/1999 | Kimura et al. |
| 5,922,939 A | 7/1999 | Cota |
| 5,966,122 A | 10/1999 | Itoh |
| 5,969,243 A | 10/1999 | Frey et al. |
| 5,991,690 A | 11/1999 | Murphy |
| 6,009,359 A | 12/1999 | El-Hakim et al. |
| 6,070,682 A | 6/2000 | Isogai et al. |
| 6,076,917 A | 6/2000 | Wen |
| 6,085,135 A | 7/2000 | Steckel |
| 6,128,446 A | 10/2000 | Schrock et al. |
| 6,141,614 A | 10/2000 | Janzen et al. |
| 6,160,902 A | 12/2000 | Dickson et al. |
| 6,185,990 B1 | 2/2001 | Missotten et al. |
| 6,205,397 B1 | 3/2001 | Eslambolchi et al. |
| 6,222,985 B1 | 4/2001 | Miyake |
| 6,282,362 B1 | 8/2001 | Murphy et al. |
| 6,337,951 B1 | 1/2002 | Nakamura |
| 6,346,980 B1 | 2/2002 | Tani et al. |
| 6,393,927 B1 | 5/2002 | Biggs et al. |
| 6,401,069 B1 | 6/2002 | Boys et al. |
| 6,504,571 B1 | 1/2003 | Narayanaswami et al. |
| 6,529,615 B2 | 3/2003 | Hendrickson et al. |
| 6,574,561 B2 | 6/2003 | Alexander et al. |
| 6,597,818 B2 | 7/2003 | Kumar et al. |
| 6,690,883 B2 | 2/2004 | Pelletier |
| 6,691,135 B2 | 2/2004 | Pickett et al. |
| 6,732,162 B1 | 5/2004 | Wood et al. |
| 6,741,948 B2 | 5/2004 | Hauger et al. |
| 6,802,205 B2 | 10/2004 | Barguirdjian et al. |
| 6,868,340 B2 | 3/2005 | Alexander et al. |
| 6,917,206 B2 | 7/2005 | Rains et al. |
| 6,975,942 B2 | 12/2005 | Young et al. |
| 6,993,196 B2 | 1/2006 | Sun et al. |
| 7,038,681 B2 | 5/2006 | Scott et al. |
| 7,106,328 B2 | 9/2006 | Royan |
| 7,148,898 B1 | 12/2006 | Howard et al. |
| 7,167,187 B2 | 1/2007 | Scott et al. |
| 7,191,056 B2 | 3/2007 | Costello et al. |
| 7,234,106 B2 | 6/2007 | Simske |
| 7,248,285 B2 | 7/2007 | Needham |
| 7,248,968 B2 | 7/2007 | Reid |
| 7,254,485 B2 | 8/2007 | Rooney et al. |
| 7,283,975 B2 | 10/2007 | Broughton |
| 7,313,604 B2 | 12/2007 | Wood et al. |
| 7,343,867 B2 | 3/2008 | Fraisse et al. |
| 7,411,493 B2 | 8/2008 | Smith |
| 7,430,455 B2 | 9/2008 | Casey et al. |
| 7,447,613 B2 | 11/2008 | Mertins et al. |
| 7,465,323 B2 | 12/2008 | Au et al. |
| 7,466,244 B2 | 12/2008 | Kimchi et al. |
| 7,482,973 B2 | 1/2009 | Tucker et al. |
| 7,508,840 B2 | 3/2009 | Delaney |
| 7,516,563 B2 | 4/2009 | Koch |
| 7,541,975 B2 | 6/2009 | Sever et al. |
| 7,617,246 B2 | 11/2009 | Koch et al. |
| 7,634,380 B2 | 12/2009 | Martin et al. |
| 7,658,096 B2 | 2/2010 | Pinto et al. |
| 7,664,233 B1 | 2/2010 | Kirchmeier et al. |
| 7,689,356 B2 | 3/2010 | Dix et al. |
| 7,720,703 B1 | 5/2010 | Broughton |
| 7,723,660 B2 | 5/2010 | Holland |
| 7,724,130 B2 | 5/2010 | Norstrom et al. |
| 7,739,138 B2 | 6/2010 | Chauhan et al. |
| 7,742,862 B2 | 6/2010 | Anderson et al. |
| 7,766,547 B2 | 8/2010 | Weppenaar et al. |
| 7,813,741 B2 | 10/2010 | Hendrey et al. |
| 7,836,760 B2 | 11/2010 | Saylor |
| 7,848,865 B2 | 12/2010 | Di Federico et al. |
| 7,872,669 B2 | 1/2011 | Darrell et al. |
| 7,974,853 B1 | 7/2011 | Zimmerman |
| 7,991,754 B2 | 8/2011 | Maizel et al. |
| 8,098,894 B2 | 1/2012 | Soderstrom |
| 8,105,720 B2 | 1/2012 | Koenig et al. |
| 8,131,118 B1 | 3/2012 | Jing et al. |
| 8,156,136 B2 | 4/2012 | Davis et al. |
| 8,265,835 B2 | 9/2012 | Peterson et al. |
| 8,296,056 B2 | 10/2012 | Becker et al. |
| 8,319,165 B2 | 11/2012 | Holland |
| 8,326,537 B2 | 12/2012 | Laake |
| 8,594,879 B2 | 11/2013 | Roberge et al. |
| 8,737,720 B2 | 5/2014 | Mas et al. |
| 8,768,558 B2 | 7/2014 | Reeve et al. |
| 2002/0055902 A1 | 5/2002 | Faeth |
| 2002/0120424 A1 | 8/2002 | Hauger et al. |
| 2003/0182260 A1 | 9/2003 | Pickett et al. |
| 2003/0187560 A1 | 10/2003 | Keller et al. |
| 2004/0100285 A1 | 5/2004 | Rains et al. |
| 2004/0168148 A1 | 8/2004 | Goncalves et al. |
| 2004/0203571 A1 | 10/2004 | Hashizume |
| 2004/0225444 A1 | 11/2004 | Young et al. |
| 2005/0034062 A1 | 2/2005 | Bufkin et al. |
| 2005/0038587 A1 | 2/2005 | Berg et al. |
| 2005/0150160 A1 | 7/2005 | Norgaard et al. |
| 2005/0192752 A1 | 9/2005 | Rooney et al. |
| 2005/0203671 A1 | 9/2005 | Mertins et al. |
| 2005/0209815 A1 | 9/2005 | Russon et al. |
| 2005/0223337 A1 | 10/2005 | Wheeler et al. |
| 2005/0225439 A1 | 10/2005 | Watanabe et al. |
| 2005/0273300 A1 | 12/2005 | Patwardhan et al. |
| 2006/0015374 A1 | 1/2006 | Ochs et al. |
| 2006/0061595 A1 | 3/2006 | Goede et al. |
| 2006/0095207 A1 | 5/2006 | Reid |
| 2006/0217105 A1 | 9/2006 | Kumar et al. |
| 2007/0010924 A1 | 1/2007 | Otani et al. |
| 2007/0076920 A1 | 4/2007 | Ofek |
| 2007/0131438 A1 | 6/2007 | Brandt et al. |
| 2007/0255502 A1 | 11/2007 | Pruett et al. |
| 2007/0260400 A1 | 11/2007 | Morag et al. |
| 2008/0125920 A1 | 5/2008 | Miles et al. |
| 2008/0140431 A1 | 6/2008 | Anderson et al. |
| 2008/0191054 A1 | 8/2008 | Di Federico et al. |
| 2008/0258881 A1 | 10/2008 | Manson et al. |
| 2008/0258967 A1 | 10/2008 | Manson et al. |
| 2008/0261627 A1 | 10/2008 | Manson et al. |
| 2008/0262727 A1 | 10/2008 | Manson et al. |
| 2008/0262733 A1 | 10/2008 | Manson et al. |
| 2008/0262734 A1 | 10/2008 | Manson et al. |
| 2008/0263097 A1 | 10/2008 | Manson et al. |
| 2008/0263174 A1 | 10/2008 | Manson et al. |
| 2008/0284587 A1 | 11/2008 | Saigh et al. |
| 2008/0304711 A1 | 12/2008 | Scharf et al. |
| 2009/0007697 A1 | 1/2009 | May |
| 2009/0105969 A1 | 4/2009 | Saylor |
| 2009/0132132 A1 | 5/2009 | Peterson et al. |
| 2009/0136788 A1 | 5/2009 | Koenig et al. |
| 2009/0164281 A1 | 6/2009 | Norgaard et al. |
| 2009/0293322 A1 | 12/2009 | Faivre et al. |
| 2010/0100540 A1 | 4/2010 | Davis et al. |
| 2010/0223008 A1 | 9/2010 | Dunbabin et al. |
| 2010/0250136 A1 | 9/2010 | Chen |
| 2010/0274657 A1 | 10/2010 | Workman et al. |
| 2010/0277185 A1 | 11/2010 | Hughes |
| 2010/0306012 A1 | 12/2010 | Zyskowski et al. |
| 2011/0064312 A1 | 3/2011 | Janky et al. |
| 2011/0066397 A1 | 3/2011 | Kranz |
| 2011/0166705 A1 | 7/2011 | Anderson et al. |
| 2011/0181610 A1 | 7/2011 | Baggs et al. |
| 2011/0282578 A1 | 11/2011 | Miksa et al. |
| 2012/0255354 A1 | 10/2012 | Fu et al. |
| 2013/0041549 A1 | 2/2013 | Reeve et al. |

(56) References Cited

U.S. PATENT DOCUMENTS

FOREIGN PATENT DOCUMENTS

| JP | 2010068719 A | 4/2010 |
|----|--------------|--------|
| WO | 9821927 A1 | 5/1998 |
| WO | 02069230 A1 | 9/2002 |

OTHER PUBLICATIONS

U.S. Appl. No. 12/902,013, filed Oct. 11, 2010, Hamilton et al.
Pawelka, Elizabeth "Make your 3270 applications accessible from PDAs and cell phones", *CCR2: A Publication for the IBM System z Software Community*, Issue 6., (2008),6 pages.
Luhmann, T. et al., "Close Range Photogrammetry", *Whittles Publishing*, ISBN 0-470-10633-6, (2006).
Gruen, Armin et al., "Algorithms for Automated Extraction of Man-Made Objects from Raster Image Data in a GIS", *Institute of Geodesy & Photogrammetry, Swiss Federal Institute of Technology*, 1 page, 2005.
"UpNext: 3D Local Search and Community.", www.upnext.com, (2009).
"You City", www.youcity.com, (2009).
Agrios, Bronwyn et al., "Get in Touch with Volunteered Geographic Information", *ArcUser* www.esri.com, (Summer 2010),50-55.
Qtaishat, K. S., "Assessing the Performance of Different Direct-Georeferencing Strategies", *Institute of Engineering Surveying and Space Geodesy*, University of Nottingham, ASPRS 2006 Annual Congference, Reno, NV,(May 2006),9 pages.
Schwarz, Klaus-Peter "Aircraft Position and Attitude Determination by GPS and INS", *International Archives of Photogrammetry and Remote Sensing,* vol. XXXI, Part B6, Vienna., (1996),7 pages.
Mostafa, Mohamed M., "Digital Image Georeferencing From a Multiple Camera Source by GNS/INS", *ISPRS Journal of Photogrammetry and Remote Sensing,* vol. 56, Issue 1, (Jun. 2001),12 pages.
"PCT International Search Report and Written Opinion", PCT/US2012/061681, Apr. 22, 2013.
Saha, S. K. , "Water and Wind Induced Soil Erosion Assessment and Monitoring Using Remote Sensing and GIS", Proceedings of a Training Workshop, Dehra Dun, India, Jul. 7-11, 2003, 315-330.
Verkroost, A. W. M. , "A Simplt Model for Nitrogen-limited Plant Growth and Nitrogen Allowcation", Annals of Botany 96, Oxford University Press., 2005, 871-876.
"PCT/US20120/061681 Extended European Search Report", Jan. 5, 2015, 7 Pages.

1700

RECEIVES CROP TREATMENT INFORMATION AT A COMPUTER SYSTEM, THE CROP TREATMENT INFORMATION COMPRISING A REAL-TIME LOCATION OF A CROP TREATMENT APPLICATOR AND A DESCRIPTION OF A CROP TREATMENT RESIDENT IN THE CROP TREATMENT APPLICATOR.
1710

ACCESSES PLANTED CROP INFORMATION FOR A PLANTED FIELD WHICH ENCOMPASSES THE REAL-TIME LOCATION, THE PLANTED CROP INFORMATION COMPRISING A DESCRIPTION OF A PLANTED CROP IN THE PLANTED FIELD.
1720

DETERMINES WHETHER THE CROP TREATMENT IS COMPATIBLE WITH APPLICATION TO THE PLANTED CROP.
1730

IN RESPONSE TO DETERMINING THE CROP TREATMENT IS NOT COMPATIBLE WITH APPLICATION TO THE PLANTED CROP, INITIATES, IN REAL-TIME FROM THE COMPUTER SYSTEM, A CROP TREATMENT INCOMPATIBILITY ACTION.
1740

```
ACCESS A DATABASE CONTAINING PLANT GROWTH MODELS FOR A
PLURALITY OF FIELDS.
2410
```
↓
```
DETERMINE AT LEAST ONE HARVESTED FIELD WITH A FIRST PLANT
GROWTH MODEL WHICH CORRELATES WITH A SECOND PLANT
GROWTH MODEL FOR AT LEAST A PORTION OF AN UNHARVESTED
FIELD.
2420
```
↓
```
ESTIMATE A CROP CHARACTERISTIC FOR THE UNHARVESTED FIELD
BASED ON ACTUAL CROP CHARACTERISTIC DATA OBTAINED FROM
THE AT LEAST ONE HARVESTED FIELD.
2430
```

GENERATE A CROP CHARACTERISTIC MAP OF THE UNHARVESTED FIELD.
2440

2400 Continued

GENERATE A HARVESTING PATH FOR THE UNHARVESTED FIELD BASED ON THE CROP CHARACTERISTIC MAP.
2450

WIDE-AREA AGRICULTURAL MONITORING AND PREDICTION

CROSS REFERENCE TO RELATED APPLICATIONS (CONTINUATION-IN-PART)

This application claims priority and is a continuation-in-part to the co-pending U.S. patent application Ser. No. 12/911,046, entitled "Wide-area Agricultural Monitoring and Prediction," by Robert Lindores, et al., with filing date Oct. 25, 2010 now abandoned, and assigned to the assignee of the present patent application.

CROSS REFERENCE TO RELATED U.S. APPLICATIONS

This Application is related to U.S. patent application Ser. No. 13/280,306 by Robert Lindores et al., filed on Oct. 24, 2011, entitled "EXCHANGING WATER ALLOCATION CREDITS,", and assigned to the assignee of the present patent application.

This Application is related to U.S. patent application Ser. No. 13/280,310 by Robert Lindores, filed on Oct. 24, 2011, entitled "CROP TREATMENT COMPATIBILITY,", and assigned to the assignee of the present patent application.

This Application is related to U.S. patent application Ser. No. 13/280,312 by Robert Lindores., filed on Oct. 24, 2011, entitled "CROP CHARACTERISTIC ESTIMATION,", and assigned to the assignee of the present patent application.

This Application is related to U.S. patent application Ser. No. 13/280,315 by Robert Lindores, filed on Oct. 24, 2011, entitled "WATER EROSION MANAGEMENT INCORPORATING TOPOGRAPHY, SOIL TYPE, AND WEATHER STATISTICS,", and assigned to the assignee of the present patent application.

BACKGROUND

A modern crop farm may be thought of as a complex biochemical factory optimized to produce corn, wheat, soybeans or countless other products, as efficiently as possible. The days of planting in spring and waiting until fall harvest to assess results are long gone. Instead, today's best farmers try to use all available data to monitor and promote plant growth throughout a growing season. Farmers influence their crops through the application of fertilizers, growth regulators, harvest aids, fungicides, herbicides and pesticides. Precise crop monitoring—to help decide quantity, location and timing of field applications—has a profound effect on cost, crop yield and pollution. Normalized difference vegetative index (NDVI) is an example of a popular crop metric.

NDVI is based on differences in optical reflectivity of plants and dirt at different wavelengths. Dirt reflects more visible (VIS) red light than near-infrared (NIR) light, while plants reflect more NIR than VIS. Chlorophyll in plants is a strong absorber of visible red light; hence, plants' characteristic green color.

$$NVDI = \frac{r_{NIR} - r_{VIS}}{r_{NIR} + r_{VIS}},$$

where r is reflectivity measured at the wavelength indicated by the subscript. Typically, NIR is around 770 nm while VIS is around 660 nm. In various agricultural applications, NDVI correlates well with biomass, plant height, nitrogen content or frost damage.

Farmers use NDVI measurements to decide when and how much fertilizer to apply. Early in a growing season it may be hard to gauge how much fertilizer plants will need over the course of their growth. Too late in the season, the opportunity to supply missing nutrients may be lost. Thus the more measurements are available during a season, the better.

A crop's yield potential is the best yield obtainable for a particular plant type in a particular field and climate. Farmers often apply a high dose of fertilizer, e.g., nitrogen, to a small part of a field, the so-called "N-rich strip". This area has enough nitrogen to ensure that nitrogen deficiency does not retard plant growth. NDVI measurements on plants in other parts of the field are compared with those from the N-rich strip to see if more nitrogen is needed to help the field keep up with the strip.

The consequences of applying either too much or too little nitrogen to a field can be severe. With too little nitrogen the crop may not achieve its potential and profit may be left "on the table." Too much nitrogen, on the other hand, wastes money and may cause unnecessary pollution during rain runoff. Given imperfect information, farmers tend to over apply fertilizer to avoid the risk of an underperforming crop. Thus, more precise and accurate plant growth measurements save farmers money and prevent pollution by reducing the need for over application.

NDVI measurements may be obtained from various sensor platforms, each with inherent strengths and weaknesses. Aerial imaging such as satellite or atmospheric imaging can quickly generate NDVI maps that cover wide areas. However, satellites depend on the sun to illuminate their subjects and the sun is rarely, if ever, directly overhead a field when a satellite acquires an image. Satellite imagery is also affected by atmospheric phenomena such as clouds and haze. These effects lead to an unknown bias or offset in NDVI readings obtained by satellites or airplanes. Relative measurements within an image are useful, but comparisons between images, especially those taken under different conditions or at different times, may not be meaningful.

Local NDVI measurements may be obtained with ground based systems such as the Trimble Navigation "GreenSeeker". A GreenSeeker is an active sensor system that has its own light source that is scanned approximately one meter away from plant canopy. The light source is modulated to eliminate interference from ambient light. Visible and near-infrared reflectivity are measured from illumination that is scanned over a field. Ground-based sensors like the GreenSeeker can be mounted on tractors, spray booms or center-pivot irrigation booms to scan an entire field. (GreenSeekers and other ground-based sensors may also be hand-held and, optionally, used with portable positioning and data collection devices such as laptop computers, portable digital assistants, smart phones or dedicated data controllers.) Active, ground-based sensors provide absolute measurements that may be compared with other measurements obtained at different times, day or night. It does take time, however, to scan the sensors over fields of interest.

BRIEF DESCRIPTION OF THE DRAWINGS

Unless noted, the drawings referred to in this brief description of drawings should be understood as not being drawn to scale.

FIGS. 17A-17B illustrate a flow diagram of an example method of ensuring crop treatment compatibility, according to various embodiments.

FIGS. 24A, 24B, and 24C illustrate a flow diagram of an example method of crop characteristic estimation, according to various embodiments.

DESCRIPTION OF EMBODIMENT(S)

Figure 1:
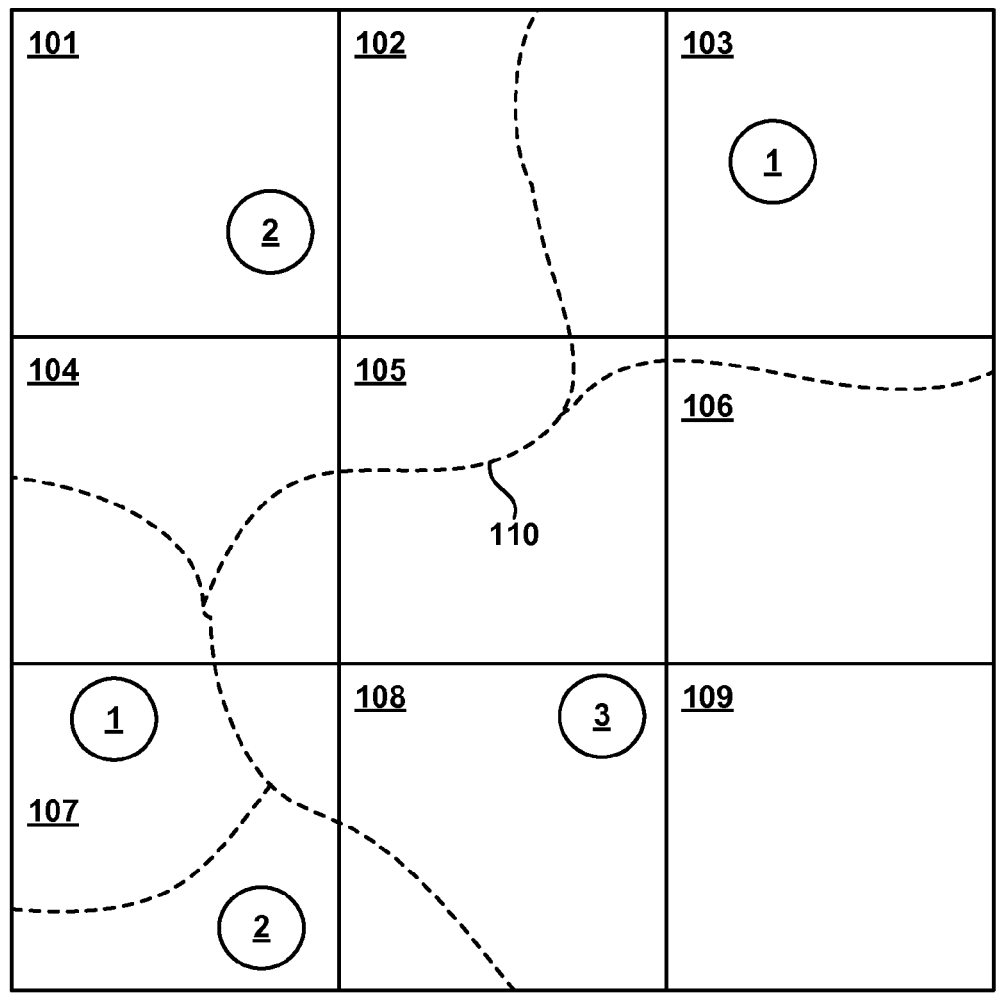
FIG. 1 shows a schematic map of nine farm fields with management zones, according to various embodiments.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "accessing," "aggregating," "analyzing," "applying," "brokering," "calibrating," "checking," "combining," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "sending," "sensing," "storing," "transforming," "updating," "using," "validating," or the like, refer to the actions and processes of a computer system or similar electronic computing device (or portion thereof) such as, but not limited to one or more or some combination of: a visual organizer system, a request generator, an Internet coupled computing device, and a computer server. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s). Under the direction of computer-readable instructions, the electronic computing device may carry out operations of one or more of the methods described herein.

OVERVIEW OF DISCUSSION

Discussion below is divided into multiple sections. Section 1 describes wide-area agricultural monitoring and prediction. Section 2 describes water erosion management incorporating topography, soil type, and weather statistics. Section 3 describes aspects of crop treatment compatibility. Section 4 describes aspects of exchanging water allocation credits. Section 5 describes crop characteristic estimation. As described herein, in various embodiments, one or more items of information pertaining to a particular field or farm may be collected by one or more individuals and/or sensors and utilized by a farmer or other entity to make decisions related to: that field, crops planted in that field, one or more other fields, or crops planted in one or more other fields. Each section tends to focus on collection and/or use of a particular type or types of information. Although discussed independently, these various types of information are, in some embodiments, stored in various combinations with one another. These various types of information may be collected independently or in various combinations with one another. That is, in some embodiments, an individual sensor, reporting source, and/or platform described herein may collect only a single item of information during a period of time or during conduct of a particular activity, while in other instances two or more items of information may be collected during single period of time or during conduct of a particular activity. A single type of collected information may be used in isolation or in a combination with one or more other types of collected information.

Section 1: Wide-Area Agricultural Monitoring and Prediction

Wide-area agricultural monitoring and prediction encompasses systems and methods to generate calibrated estimates of plant growth and corresponding field prescriptions. Data from ground and satellite based sensors are combined to obtain absolute, calibrated plant metrics, such as NDVI, over wide areas. Further inputs, such as soil, crop characteristics and climate data, are stored in a database. A processor uses the measured plant metrics and database information to create customized field prescription maps that show where, when and how much fertilizer, pesticide or other treatment should be applied to a field to maximize crop yield.

Ground data are used to remove the unknown bias or offset of overhead aerial images thereby allowing images taken at different times to be compared with each other or calibrated to an absolute value. Soil, crop and climate data may also be stored as images or maps. The volume of data stored in the database can be quite large depending on the area of land covered and the spatial resolution. Simulations of plant growth may be run with plant and climate models to build scenarios such that a farmer can predict not just what may happen to his crops based on average assumptions, but also probabilities for outlying events.

A basic ingredient of any field prescription, however, is an accurate map of actual plant progress measured in the field. NDVI is used here as a preferred example of a metric for measuring plant growth; however, other parameters, such as the green vegetation index, or other reflectance-based vegetative indices, may also be useful. FIG. 1 shows a schematic map of nine farm fields, 101, 102 . . . 109, delineated by solid boundary lines. Dashed lines in the figure show the boundaries of field management zones which are labeled by circled numbers 1, 2 and 3. Management zones are areas of common growing characteristics. Qualities that define a zone may include drainage, soil type, ground slope, naturally occurring nutrients, weed types, pests, etc. Regardless of how zones differ, plants within a zone tend to grow about the same. Targeted fertilizer application within a zone can help smooth out growth variation. Plants in different zones may require markedly different fertilizer prescriptions.

Figure 2:
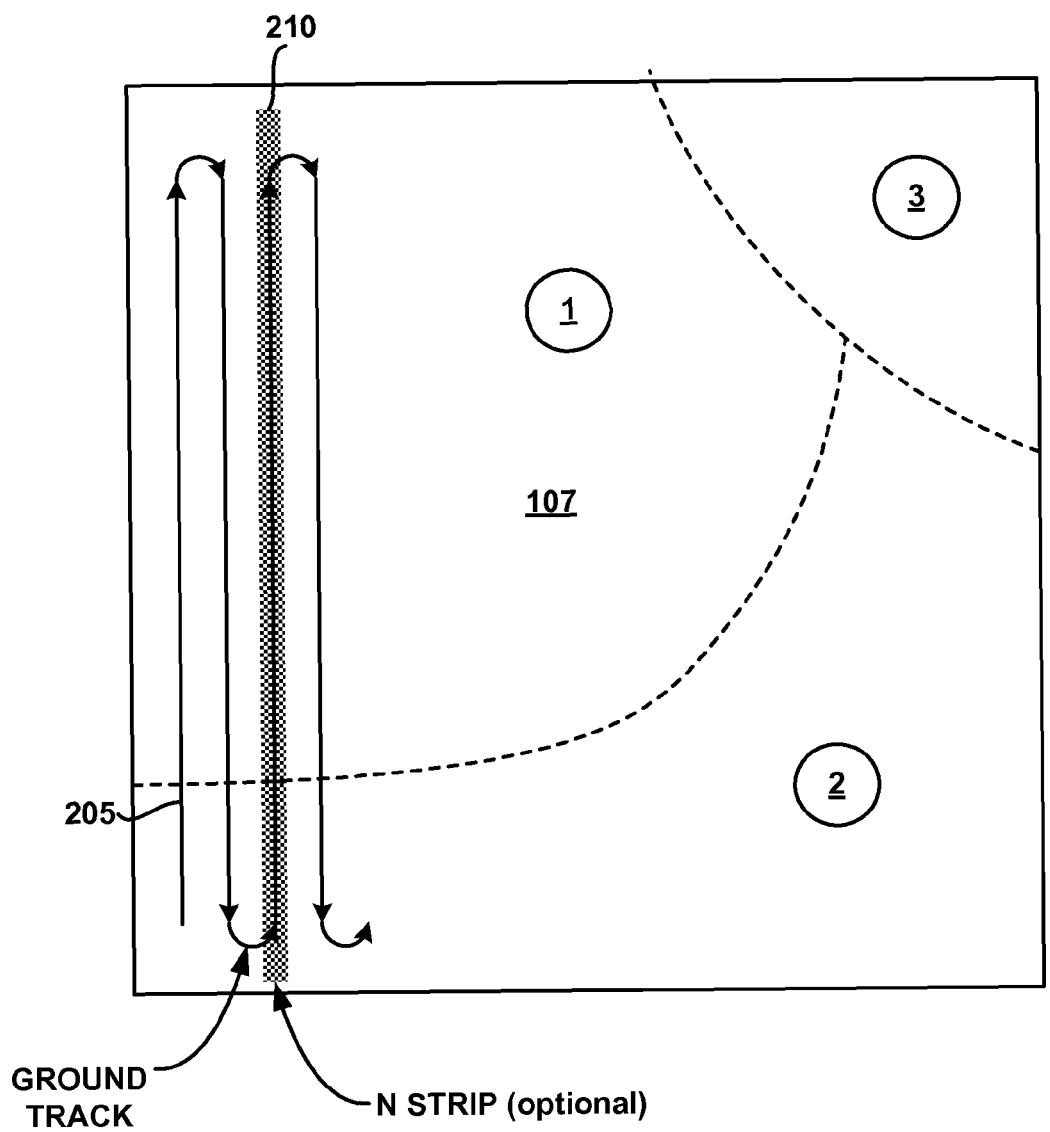
FIG. 2 shows one of the fields of FIG. 1 in greater detail, according to various embodiments.

FIG. 2 shows field 107 of FIG. 1 in greater detail. The field overlaps three management zones labeled by circled numbers 1, 2 and 3. Path 205 shows the track that a ground-based NDVI scanner like a GreenSeeker takes as it measures plant growth in the field. Ground-based scanners can be deployed on tractors, spray trucks or other equipment and can be programmed to record data whenever the equipment moves over a growing area. (Groundbased scanners may also be handheld and connected to portable data collection and/or positioning equipment.) Ground-based scanners are often used for real-time, variable-rate application, but because the scanners are automated, they can run any time, not just during fertilizer application.

In FIG. 2, gray stripe 210 marks the location of an N-rich strip. The N-rich strip is an area where an excess of nitrogen fertilizer has been applied. Plant growth in the N-rich strip is not limited by the availability of nitrogen, so those plants exhibit the maximum yield potential of similar plants in the field. Because N-rich strips are useful for yield potential calculations, measurement of NDVI in an N-rich strip is often part of a real-time, variable-rate application procedure. N-rich strips are not always needed, however. The performance of the top 10% of plants in a representative part of a field may provide an adequate standard for maximum yield potential, for example.

Figure 3:
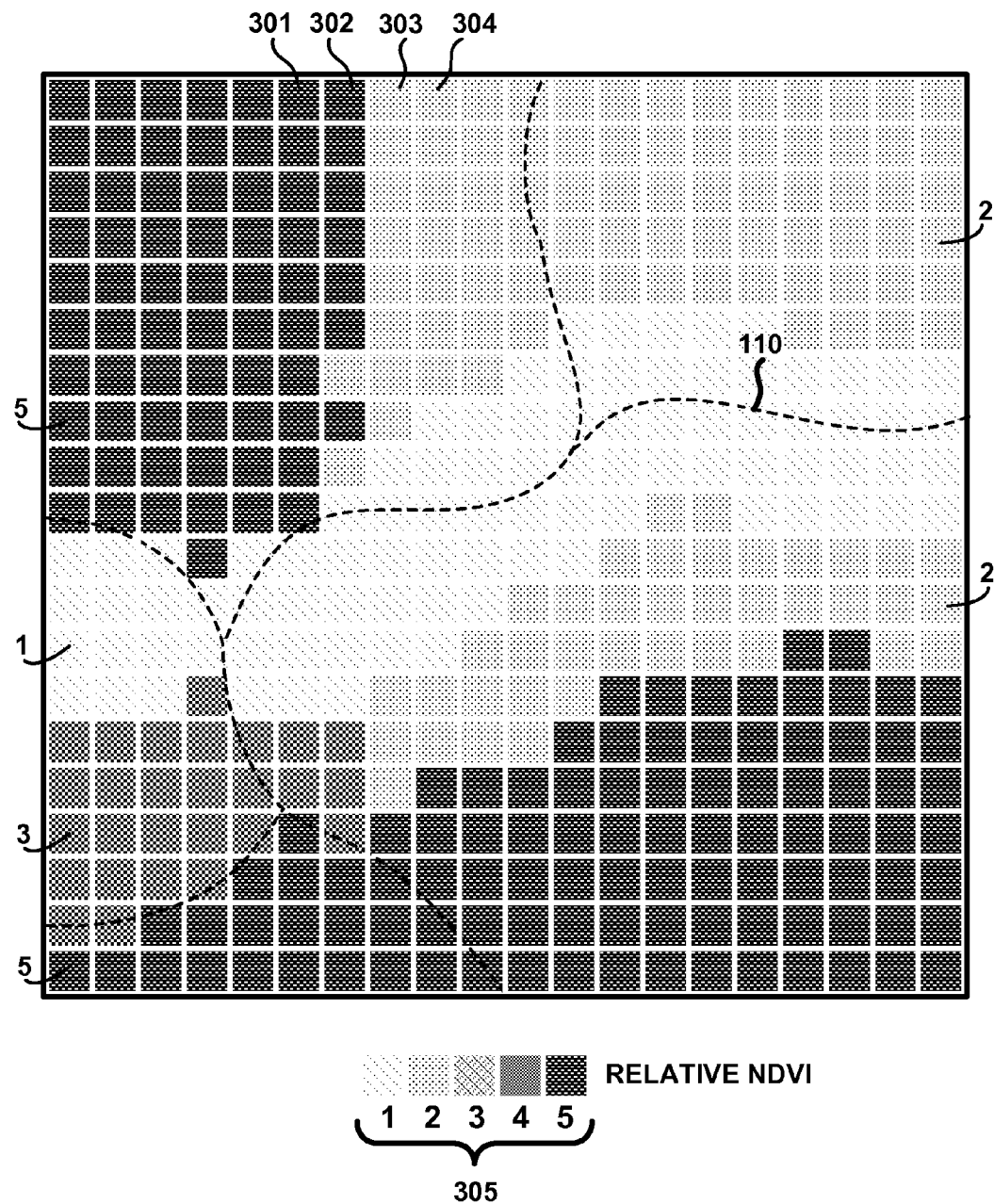
FIG. 3 shows a schematic satellite image of the fields of FIG. 1, according to various embodiments.

FIG. 3 shows a schematic satellite image of the fields of FIG. 1. The area of land illustrated in FIG. 3 is the same as the area shown in FIG. 1. The land in FIG. 3 has been divided into pixels (e.g., 301, 302, 303, 304) similar to those that may be obtained by satellite imaging. FIG. 3 is drawn for purposes of illustration only; it is not to scale. Pixels in an actual satellite image may represent areas in the range of roughly 1 $m^2$ to roughly 100 $m^2$. The resolution of today's satellite images is suitable for agricultural purposes; it is no longer a limiting factor as was the case several years ago.

Scale 305 in FIG. 3 is a schematic representation of an NDVI scale. Darker pixels represent higher values of NDVI. Although only five relative NDVI levels are shown in FIG. 3, much higher precision is available from actual satellite images. Actual satellite images, however, do not provide absolute NDVI with the high accuracy available using ground-based sensors. Variations in lighting (i.e., position of the sun), atmospheric effects (e.g., clouds, haze, dust, rain, etc.), and satellite position all introduce biases and offsets that are difficult to quantify.

It is apparent that NDVI measurements for the set of fields shown in FIGS. 1 and 3 may be obtained by either ground or satellite sensors. Ground measurements provide absolute NDVI at high accuracy while satellite measurements provide relative NDVI over wide areas. When ground and satellite data are available for a common area at times that are not too far apart, the ground data may be used to resolve the unknown bias or offset in the satellite data. As an example, if field 107 in FIG. 1 is measured by a GreenSeeker scan and fields 101 through 109 (including 107) are measured by satellite imaging, then overlapping ground and satellite data for field 107 can be used to calibrate the satellite data for all of the fields. The accuracy of ground-based data has been extended to a wide area. Generally "times that are not too far apart" are within a few days of one another; however, the actual maximum time difference for useful calibration depends on how fast plants are growing. Measurements must be closer together in time for fast-growing crops. Methods to estimate plant growth rate and extend the amount by which ground and satellite measurements can be separated in time are discussed below.

Figure 4:
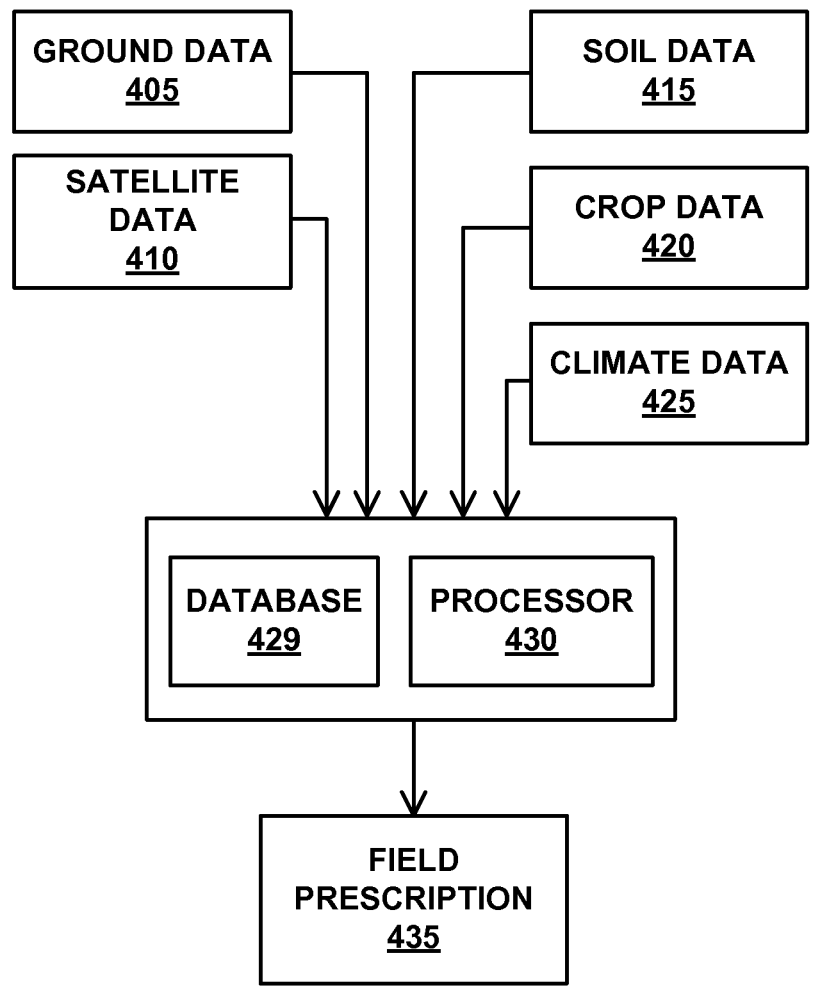
FIG. 4 shows a block diagram of a wide-area field prescription system, according to various embodiments.

FIG. 4 shows a block diagram of a wide-area field prescription system. In FIG. 4, ground data 405 and satellite data 410 are inputs to a database 429 and processor 430 (which may be part of a computer system). The output from the database and processor is a field prescription 435; i.e., a plan detailing how much chemical application is needed to optimize yield from a farm field. A field prescription may be visualized as a map showing when, where and how much fertilizer or pesticide is required on a field. The prescription may be used by an automated application system such as a spray truck with dynamically controllable spray nozzles.

Soil data 415, crop data 420 and climate data 425 may also be inputs to the database 429 and processor 430 although not all of these data may be needed for every application. All of the data sources 405 through 425, and other data not shown, are georeferenced. Each data point (soil type, crop type, climate history, NDVI from various sources, etc.) is associated with a location specified in latitude and longitude or any other convenient mapping coordinate system. The various data may be supplied at different spatial resolution. Climate data, for example, is likely to have lower spatial resolution than soil type.

Data inputs 405 through 425 are familiar to agronomists as inputs to plant yield potential algorithms. Database 429 and processor 430 are thus capable of generating wide-area field prescriptions based on any of several possible plant models and algorithms. The ability to run different hypothetical scenarios offers farmers a powerful tool to assess the risks and rewards of various fertilizer or pesticide application strategies. For example, a farmer might simulate the progress of one of his fields given rainfall and growing degree day scenarios representing average growing conditions and also growing conditions likely to occur only once every ten years. Furthermore, the farmer may send a ground-based NDVI sensor to scan small parts of just a few of his fields frequently, perhaps once a week, for example. These small data collection areas may then be used to calibrate satellite data covering a large farm. The resulting calibrated data provides the farmer with more precise estimates of future chemical needs and reduces crop yield uncertainty.

Figure 5:
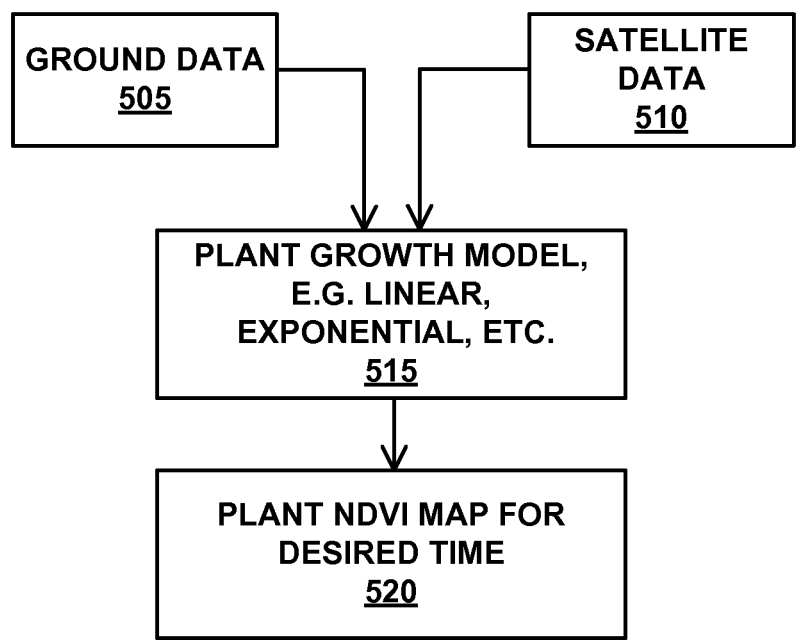
FIG. 5 shows a block diagram of a method to combine satellite and ground data acquired at different times, according to various embodiments.

It is rarely possible to obtain ground and satellite NDVI data measured at the same time. If only a few days separate the measurements, the resulting errors may be small enough to ignore. However, better results may be obtained by using a plant growth model to propagate data forward or backward in time as needed to compare asynchronous sources. FIG. 5 shows a block diagram of a method to combine satellite and ground data acquired at different times.

In FIG. 5, ground data 505, e.g., NDVI obtained by a GreenSeeker, and satellite data 510 are inputs to a plant growth model 515. Results from the model are used to generate an NDVI map 520 for any desired time. Most plants' growth is described approximately by a sigmoid function; the part of the sigmoid of interest to farmers is the main growth phase which is approximately exponential. Furthermore, for data not separated too far in time, plants' exponential growth may be approximated by a linear growth model.

Figure 6A:
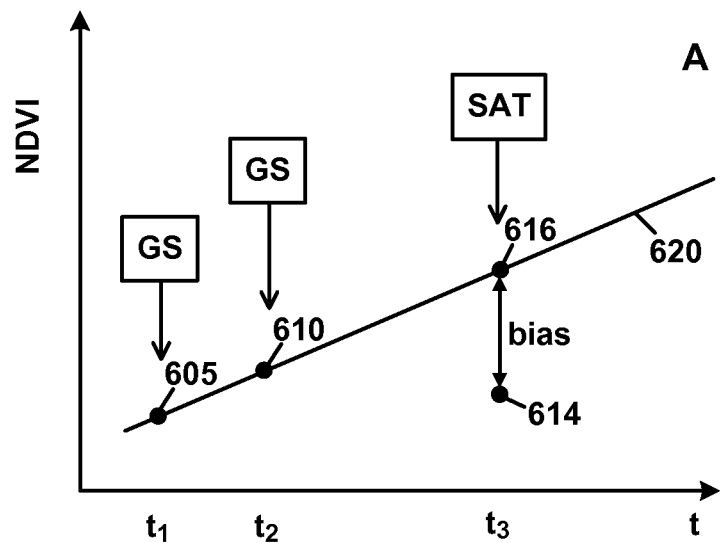
FIGS. 6A and 6B show a schematic graph of NDVI data obtained at different times via different methods, according to various embodiments.
Figure 6B:
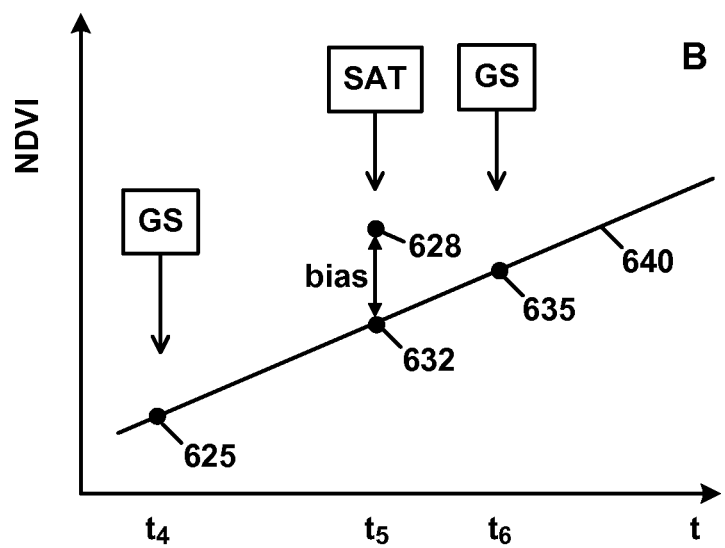

The use of a linear plant growth model to compare asynchronous ground-based and satellite measurements of NDVI may be understood by referring to FIGS. 6A and 6B that show a schematic graph of NDVI data obtained at different times via different methods. In FIG. 6A NDVI is plotted versus time for a small area, for example a single data point in a farm field, or a small section of a field. NDVI measurements 605 and 610 are obtained by a ground-based system at times $t_1$ and $t_2$ respectively, while NDVI measurement 614 is obtained from a satellite image at a later time $t_3$. Satellite-derived data point 614 has a bias or offset. The bias in data point 614 may be calculated by fitting line 620 to ground-derived data points 605 and 610. The result is that the actual NDVI measured by the satellite at time $t_3$ (for the specific ground area under consideration in FIG. 6A) is represented by data point 616, the value of the function represented by line 620 at $t_3$. Of course, the longer the interval between $t_2$ and $t_3$, the less confidence may be placed in linear extrapolation 620. However, the result is likely more accurate than simply forcing data point 614 to have the same value as data point 610, for example.

The situation plotted in FIG. 6B is similar to that of FIG. 6A except for the order in which data is obtained. In FIG. 6B NDVI measurements 625 and 635 are obtained by a ground-based system at times $t_4$ and $t_6$ respectively, while NDVI measurement 628 is obtained from a satellite image at an intermediate time $t_5$. Satellite-derived data point 628 has a bias or offset. The bias in data point 628 may be calculated by fitting line 640 to ground-derived data points 625 and 635. The result is that the actual NDVI measured by the satellite at time $t_5$ (for the specific ground area under consideration in FIG. 6B) is represented by data point 632, the value of the function represented by line 640 at $t_5$.

FIGS. 6A and 6B have been described in a simplified scenario in which plant growth is assumed to be easily modeled as a function of time. However, it may be more realistic to express plant growth as a function of heat input, represented for example by growing degree days since planting. If the number of growing degree days per actual day does not change (an idealized and somewhat unlikely scenario), then plant growth versus time or heat input will have the same functional form. In general, the time axis in FIGS. 6A and 6B may be replaced by a model which may include heat input, moisture, rainfall, sunlight intensity or other data that affect growth rate.

It will be apparent to those skilled in the art that the methods discussed above in connection with FIGS. 5 and 6 may be generalized. Two measurement sources—ground and satellite sensors—measure the same quantity. One source provides absolute measurements while the other includes an unknown bias. A linear model may be used for the time evolution of the measured quantity, NDVI. The situation is well suited for the application of a digital filter, such as a Kalman filter, to obtain an optimal estimate for NDVI. Relative measurements of NDVI over wide areas are calibrated by absolute measurements over smaller, subset areas.

Sparse spatial NDVI sampling may be sufficient to calibrate wide-area satellite data. More dense sampling is needed for smaller management zones which are often associated with more rapidly varying topography, while less dense sampling is sufficient for larger management zones which are often associated with flatter topography.

The wide-area agricultural and prediction systems and methods described herein give farmers more precise and accurate crop information over wider areas than previously possible. This information may be combined with soil, climate, crop and other spatial data to generate field prescriptions using standard or customized algorithms.

Although many of the systems and methods have been described in terms of fertilizer application, the same principles apply to fungicide, pesticide, herbicide and growth regulator application as well. Although many of the systems and methods have been described as using aerial images obtained from satellites, the same principles apply to images obtained from aircraft (airplanes, jets, and the like), helicopters, balloons, unmanned aerial vehicles (UAVs) and other aerial platforms. Aerial images may be captured from a high altitude platforms, like satellites or high flying aircraft, such that a single overhead image encompasses all or a large portion of a designated geographic area. Aerial images may also be captured by low flying platforms such that a single overhead image encompasses only a small fraction of a designated geographic area. For example, a crop duster flying less than 50 feet above a field may capture one or more (e.g., a series) of aerial images while applying a treatment, with a single image encompassing only a small portion of the geographic area of a field being treated, but an entire series of the captured images encompassing all or nearly all of the field being treated. Thus "aerial data" comprises data obtained from one or more satellite, airplane, helicopter, balloon and UAV imaging platforms. Similarly, "ground-based data" comprises data obtained from sensors that may be mounted on a truck, tractor or other vehicle or object that is land-bound, or that may be captured by a hand-held sensor or mobile device utilized by a human user. Although many of the systems and methods have been described in terms of NDVI, other reflectance-based vegetative indices may be used.

Figure 7:
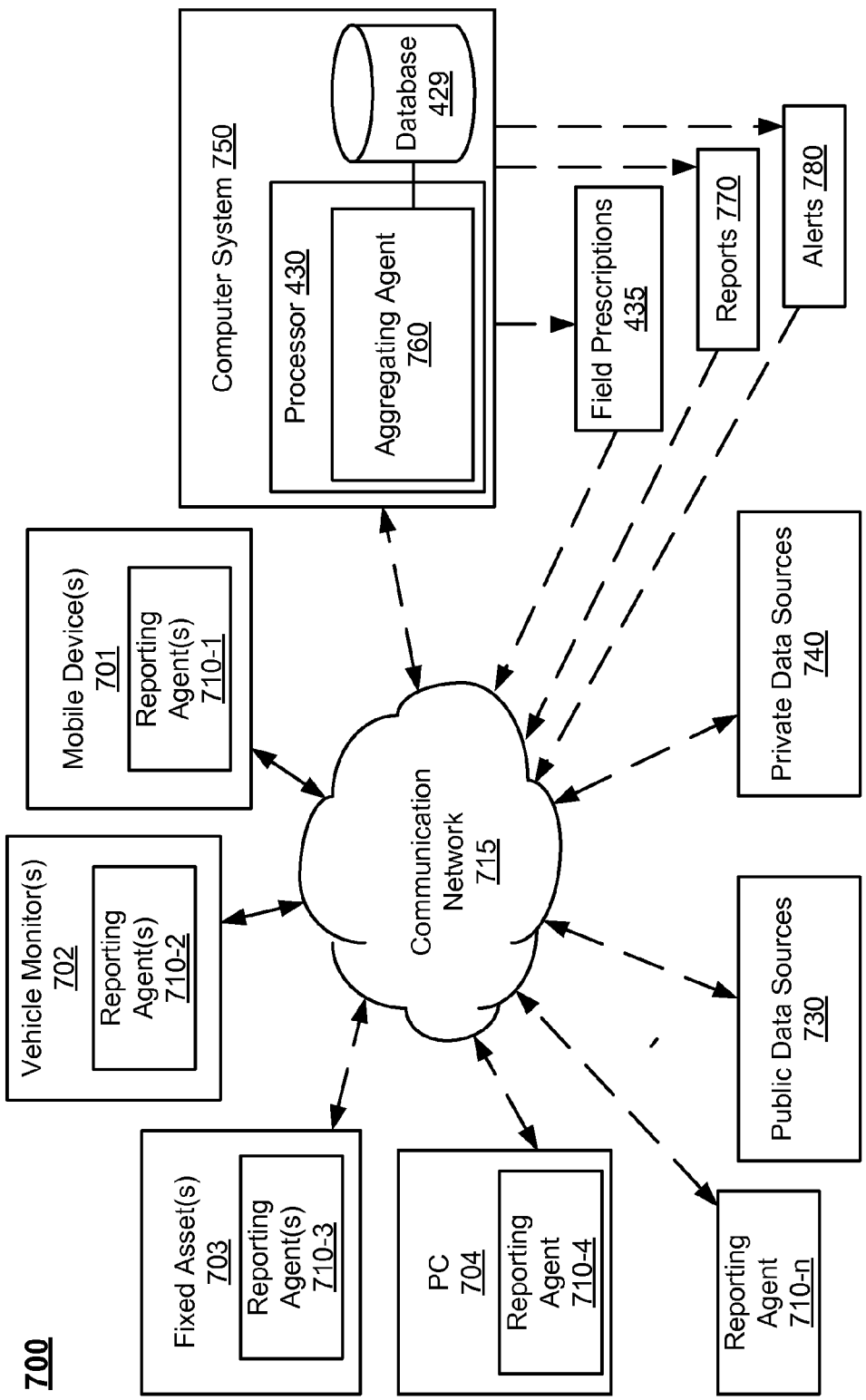
FIG. 7 is a block diagram of an example wide-area farming information collection and dissemination network, according to various embodiments.

FIG. 7 is a block diagram of an example wide-area farming information collection and dissemination network 700, according to various embodiments. In some embodiments, some aspects of network 700 may be utilized for monitoring and prediction (which includes synthesizing) as described herein. As illustrated in FIG. 7, in some embodiments, processor 430 and database 429 may be part of or coupled with a computer system 750. In FIG. 7, one or more reporting agents 710 (710-1 to 710-n) report farming related information regarding multiple farms which are dispersed from one another over a wide area such as across one or more counties, states, countries, and/or continents.

In various embodiments, one or more mobile devices 701 communicate with database 429 and processor 430 via communication network 715. Each of mobile device(s) 701 is configured with a respective reporting agent 710-1 disposed thereon for reporting farming related events and data to database 429 and processor 430. In various embodiments, mobile device(s) 701 comprise handheld devices including, but not limited to, personal digital assistants (PDAs), cellular telephones, smart phones, laptop computers, digital notebooks, digital writing pads, or the like which are configured for permitting a user to enter, store, and/or transmit data. The form factor of a mobile device is small enough that it is hand-holdable by a human user. Many mobile devices 701 are preconfigured with a GNSS (Global Navigation Satellite System) receiver, or may readily have one communicatively coupled thereto, for recording/reporting a position of the mobile device 701. In some embodiments, mobile device(s) 701 communicate with database 429 and processor 430 via a wireless communication network (e.g., 715). However, it is recognized that mobile device(s) 701 can also communicate via a wired network, or a combination of wired and wireless communication links. A reporting agent 710-1 may comprise an application on a mobile device 701, an item or hardware communicatively coupled with a mobile device 701, or some combination. A single mobile device 701 may comprise multiple reporting agents 710-1. Reporting agent(s) 710-1 can report user input data (such as by a farmer, agronomist, or other user) and/or report sensor data regarding a crop and/or field that may be provided by a sensor of or coupled with a mobile device 701. Some examples of sensor data which may be reported by a reporting agent 710-1 include, but are not limited to, one or more of: the moisture content of a harvested crop, the amount of crop harvested (e.g., being held in the grain tank of a harvester), the position of the mobile device 701 when collecting data, and/or other data received from sensors coupled with the vehicle such as the NDVI levels described above.

In various embodiments, network 700 additionally or alternatively comprises one or more vehicle monitor(s) 702 having respective reporting agents 710-2 disposed thereon. Vehicle monitor(s) 702 communicate with database 429 and processor 430 via communication network 715. Again, in accordance with various embodiments, vehicle monitor(s) 702 communicate with database 429 and processor 430 via a wireless communication network (e.g., 715), or can be coupled with a wired communication network, or a combination of wired and wireless communication links. In accordance with various embodiments, vehicle monitor(s) 702 are disposed upon ground or aerial vehicles which are used for various operations in the planting, monitoring, and harvesting of crops. Examples of vehicles implementing vehicle monitor(s) 702, include, but are not limited to, tractors, trucks, harvesters, earthmoving equipment, airplanes, crop dusting aircraft, helicopters, balloons, un-manned aerial vehicles (UAVs), etc. A single vehicle or vehicle monitor 702 may comprise multiple reporting agents 710-2. In one embodiment, reporting agent(s) 710-2 are coupled with or disposed as a part of a controller, or other data processing device disposed in a vehicle. As an example, many tractors and harvesters utilize a GNSS receiver and controller for determining the position of the vehicle, navigation, recording, and guidance and vehicle control. In some embodiments, reporting agent(s) 710-2 may be coupled with or disposed as a portion of the controller for the GNSS guidance and control of the vehicle. In general, reporting agent(s) 710-2 are used to record and/or report the position, condition, or activity of the respective vehicle upon which is it disposed. This information can also be derived from equipment operated by, or coupled with a particular vehicle. Examples, of such equipment includes, but is not limited to, ploughs, sprayers, planters, earthmoving implements such as bulldozer blades or backhoe buckets, chemical storage tanks (e.g., of fertilizers, herbicides, fungicide, pesticides, etc.), or other implements which can be coupled with a vehicle. Reporting agent(s) 710-2 can also be used to report conditions of the vehicles with which they are coupled. This can include operating parameters of the vehicle's engine, the speed, location, and direction of travel of the vehicle, fuel status, identity of the vehicle's operator, etc. Reporting agent(s) 710-2 can also report data regarding a crop such as the moisture content of a harvested crop, the amount of crop harvested (e.g., being held in the grain tank of a harvester), or other data received from sensors coupled with the vehicle such as the NDVI levels described above. In accordance with various embodiments, an operator of a vehicle can manually enter data which is conveyed by reporting agent(s) 710-2 such as the type of fertilizer, pesticide, herbicide, fungicide or other treatment being applied to a field, the crop varietal being planted, or other operation being performed such as NDVI monitoring of N-rich strip 210.

In various embodiments, network 700 additionally or alternatively comprises one or more fixed asset(s) 703 having respective reporting agents 710-3 disposed thereon. Fixed asset(s) 703 communicate with database 429 and processor 430 via communication network 715. Again, in accordance with various embodiments, fixed asset(s) 703 communicate with database 429 and processor 430 via a wireless communication network (e.g., 715), or can be coupled with a wired communication network, or a combination of wired and wireless communication links. In accordance with various embodiments, fixed asset(s) 703 comprise devices for monitoring various events and/or conditions associated with an agricultural operation. For example, fixed asset(s) 703 can comprise, but are not limited to, rainfall monitors, pump monitors, remote weather sensing stations, storage facilities (e.g., fuel, water, or chemical storage, storage of harvested crops, feed, seed, hay, etc.), water allocation monitors, or other devices used to measure and gather metrics of interest to an agricultural operation. A single fixed asset 703 may comprise multiple reporting agents 710-3.

In FIG. 7, network 700 further additionally or alternatively comprises one or more computing devices (e.g., a personal computer (PC) such as PC 704) having respective reporting agents 710-4 disposed thereon. In many agricultural operations, farmer uses PC 704 to enter data which they have collected. For example, many farmers collect data at their farm including, but not limited to, local weather conditions, treatments applied to fields such as fertilizers, pesticides, herbicides, fungicide, growth regulators, and harvest aids, crops planted, crop yields, fuel costs, equipment operational data, soil data, pest and disease infestations, and the like. Such information may be input via a PC 704 or even via a mobile device 701. Often, the farmers will use data analysis techniques to determine long-term patterns, or to predict future performance and/or yields based upon similar conditions in the past. As an example, some farmers perform a private soil analysis of their property in which soil samples are collected at regular intervals (e.g., every 100 meters) across their property and labeled to identify the location from which they were collected. The collected samples are then sent for analysis to determine the soil composition of the farmer's property and variations in the soil composition across the farmer's property. In so doing, the farmer can determine field management zones as shown above with reference to FIG. 1. The granularity of determining the soil composition across the farmer's property is dependent upon the sampling interval used in the collection of soil samples.

It is appreciated that network 700 may additionally or alternatively include one or more reporting agents 710-n, other than those described above, which communicate with database 429 and processor 430 to provide user input or sensor collected farming information.

In order to comply with current environmental and agricultural regulations, farmers may be required to monitor and report the location and time when various applications such as fertilizers, herbicides, fungicides, pesticides, or other chemicals are applied to fields. Collection of information to support compliance and/or certification can be particularly important on and around organic farms. For example organic farming operations often have to monitor or limit application of chemicals in the vicinity of their fields by third parties such as other farmers and highway road crews. Often, the farmers do not own the application equipment themselves and pay a third party, such as a crop dusting company or farmer's cooperative to apply the treatments. The farmer, the third party, or some other party may utilize a reporting agent 710 to manually or automatically report application of fertilizers, herbicides, fungicide, pesticides, or other chemicals are applied to fields. Reporting of this data may be coupled with reporting of other data, such as position data and/or timestamp data. Other farming information monitored by farmers and reported via a reporting agent 710 may pertain to, but is not limited to, one or more of: water use, soil erosion, crop disease, insect management, weed management, and overall crop health. For example, a reporting agent 710 may report manually input/sensed information regarding one or more of: how much water is drawn from a canal or underground aquifer at a particular location; the type and location of weeds in a field; the type, location, and level of infestation of insects in a field; the location and level of soil erosion in a field; and/or the type, location, and progression of a crop disease in a field. While farmers often collect this data for private use, it is not typically collected in a useful manner for distribution over a wider area.

In FIG. 7, database 429 and processor 430 is also coupled with public data sources 730 via communication network 715. Examples of public data sources 730 include, but are not limited to, public agronomists, government agencies, research institutions, universities, commodities markets, equipment suppliers, vendors, or other entities that which collect or generate data of interest to agricultural operations.

In FIG. 7, database 429 and processor 430 is also coupled with private data sources 740. Examples of private data sources 740 include private for-profit entities which collect and distribute data of interest to agricultural operations. For example, private companies which distribute satellite imagery such as TerraServer® can be contracted for a fee. In accordance with an embodiment, a farmer who has contracted with a private data source 740 can arrange to make that data available to database 429 and processor 430. In another embodiment, an account with a private data source 740 can be made by the operator of database 429 and processor 430. Some other private sources include seed producing/vending companies, herbicide producing/vending companies, pesticide producing/vending companies, fungicide producing/fending companies, fertilizer producing/vending companies, and/or farmers cooperatives.

It is noted that in some embodiments, mobile device(s) 701, vehicle monitor(s) 702, and fixed asset(s) 703 can be coupled with PC 704 which in turn stores the data collected by these devices and forwards the data to database 429 and processor 430. In some embodiments, one or more of mobile device(s) 701, vehicle monitor(s) 702, and fixed asset(s) 703, and PC 704 are integrated into a network used by a farmer to monitor his respective agricultural operations. In accordance with one embodiment, a wireless personal area network is used to communicate data between mobile device(s) 701, vehicle monitor(s) 702, fixed asset(s) 703, and PC 704. However, it is noted that these components can be implemented in other wireless manners and/or in a wired communication network as well. In some embodiments, data may also be transferred via a removable data storage device from a non-networked connected device to a networked device (e.g., a device communicatively coupled with network 715) and then to database 429 and processor 430 from the networked device. Data may also be transferred to database 429 and processor 430 when one of the devices (e.g., mobile device 701) is connected with a data transfer interface or docking station that is coupled with communication network 715.

In accordance with various embodiments, reporting agents 710-1, 710-2, and 710-3 are compliant with various software platforms. For example, reporting agents 710-1 may be compliant with the Java Platform, Micro-Edition (Java ME), the Windows Mobile® platform, or the like for facilitating the use of handheld devices to report data, conditions, and events pertinent to agricultural operations. In one embodiment, a reporting agent 710 (710-1 to 710-n) periodically determines whether data has been collected which is to be forwarded to database 429 and processor 430. In accordance with one embodiment, a reporting agent 710 (710-1 to 710-n) can be manually configured by a user to indicate which types of data are to be conveyed to database 429 and processor 430, PC 704, or another entity, as well as a polling interval to determine how often to report this data. In another embodiment, a reporting agent 710 (710-1 to 710-n) automatically forwards collected data when it is recorded. For example, when an operator of mobile device 701 records data and indicates that the data is to be saved, or forwarded, reporting agent 710-1 will automatically forward the data to database 429 and processor 430. As discussed above, the data will forwarded via a wireless communication network (e.g., communication network 715). In accordance with various embodiments, a reporting agent 710 (710-1 to 710-n) automatically appends additional data. For example, if mobile device(s) 701, vehicle monitor(s) 702, and fixed asset(s) 703 are equipped with a positioning device such as a GNSS receiver, or if a device is located at a known fixed location, a reporting agent 710 (710-1 to 710-n) automatically appends the position of the device in the message conveying collected data to database 429 and processor 430. Furthermore, a timestamp can be appended to each message when the message is sent.

In accordance with some embodiments, a reporting agent 710 (710-1 to 710-n) initiates deleting data which has been transmitted to database 429 and processor 430 in response to a message indicating that the data has been received and stored in database 429. In some embodiments, a reporting agent 710 (710-1 to 710-n) determines whether communications with communication network 715 have been established and to automatically forward the data to database 429 and processor 430 when it has been determined that communications have been established. Until the confirmation message has been received, the data will be stored locally on the respective device which has collected it. It is noted that a reporting agent 710 (710-1 to 710-n) reports data to PC 704 and the reporting agent 710-4 operating thereon as well. For example, in such a configuration, reporting agents 710-1, 710-2, and 710-3 will automatically forward collected data to PC 704 and automatically initiate deleting the data from their respective devices in response to a message from PC 704 confirming that the data has been received. Reporting agent 710-4 of PC 704 will then be responsible for forwarding the data to database 429 and processor 430 as described above.

In accordance with various embodiments, monitoring and prediction network 700 facilitates gathering, sorting, and distributing data relevant to agricultural operations based upon the participation of farmers over a wide area. In existing methods and systems, the data collected by a farmer is typically used by that farmer, with the addition of information from public sources such as the Department of Agriculture, the National Weather Service, local agronomists, published research articles, etc. In some existing methods and systems, data collected by an individual farmer may be utilized by another entity such as a farm product producer/vendor (e.g., a seed producer/vendor). Additionally, the volume of information available makes it difficult under existing methods and systems to sort through and find data relevant to a particular farmer, especially given the limited computing resources many users privately own. However, as described herein, monitoring and prediction network 700 allows farmers, and other entities involved in agricultural operations, to gather, filter, and distribute data over a larger region in a timely manner. As an example, if an infestation of pests or spread of disease occurs in one farm, this information can be sent to database 429 and processor 430. Using other data such as weather patterns, crop types, crop maturity, and the reports of other farmers, a subscriber to the services provided by monitoring and prediction network 700 can determine whether his farm in danger of the infestation or disease and can take timely action such as applying treatments to the crops to prevent damage to his crops.

A subscriber to monitoring and prediction network 700 can also participate in the distribution of goods, services, inventories, and commodities among other participants. For example, a farmer can report an excess, or shortage, of a commodity or resource to other participants in monitoring and prediction network 700. As will be described in greater detail below, the data sent by reporting agents 710-1, 710-2, 710-3, and 710-4 is stored in database 429. Aggregating agent 760 accesses database 429 and filters the data (which comprises data from numerous users across a wide area) for information which is relevant to a particular user and or a particular field. Such filtering may be based on one or more parameters, such as soil type, crop type, applied products (e.g., herbicide, pesticide, fungicide, and/or fertilizer) seed type, crop maturity, weather, etc. In accordance with various embodiments, aggregating agent 760 automatically generates reports 770 of requested information and alerts 780 based upon pre-determined parameters.

Consider a report generating example, where a farmer or other user inputs parameters of a particular agricultural field (e.g., seed type, growing period, soil type, and weather for example) aggregating agent 760 can filter data collected across a wide geographic area based on those parameters for the particular agricultural field which are input. Data across the wide geographic area which is acquired from other agricultural fields with common parameters to those input and filtered on are filtered out and aggregated into a report 760 that is relevant to particular agricultural field. In this manner a farmer in Nebraska who enters parameters for an agricultural field in Hamilton county, Nebraska may receive a report which includes relevant data acquired from a first agricultural field in Hall county Nebraska (a neighboring county), relevant data acquired from a second agricultural field in Iowa (a neighboring state), and relevant data acquired from a third agricultural field in Argentina (a separate country has similar parameters but an opposite growing season).

As an example of alert generating, a farmer may apply a treatment to a field which is incompatible with crops in adjacent fields owned by other farmers. Thus, if the treatment is carried by the wind to the neighboring farmer's fields, the neighbor's crops may be inadvertently killed off. This is especially problematic when crop dusting is used to apply treatments to fields as the potential for downwind distribution of chemicals to neighboring fields is greatly increased. However, if both farmers are subscribed to monitoring and prediction network 700, the farmer applying the treatment to his field can enter the location of the field and the treatment being applied using, for example, reporting agent 710-2 disposed upon the vehicle applying the treatment. This information can be conveyed wirelessly using communication network 715 to database 429 and processor 430. When database 429 and processor 430 receives this information, it can access current weather conditions in the area, as well as what crops are being grown in that area, and determine if there is a danger that the treatment being applied is harmful to crops growing downwind or crops growing in the field which is being/about to be treated. If it is determined that there is a danger of downwind contamination or danger to the crop in the field being treated, aggregating agent 760 can generate an alert 780 which is conveyed to the farmer/third party applying the treatment to the field, to the vehicle applying the treatment if they are in different locations, and/or to any farmers downwind from the treatment whose crops may be affected. Additionally, alert 780 can be generated and received in real time so that the application of the treatment can be prevented from occurring.

Example Computer System(s)

Figure 8:
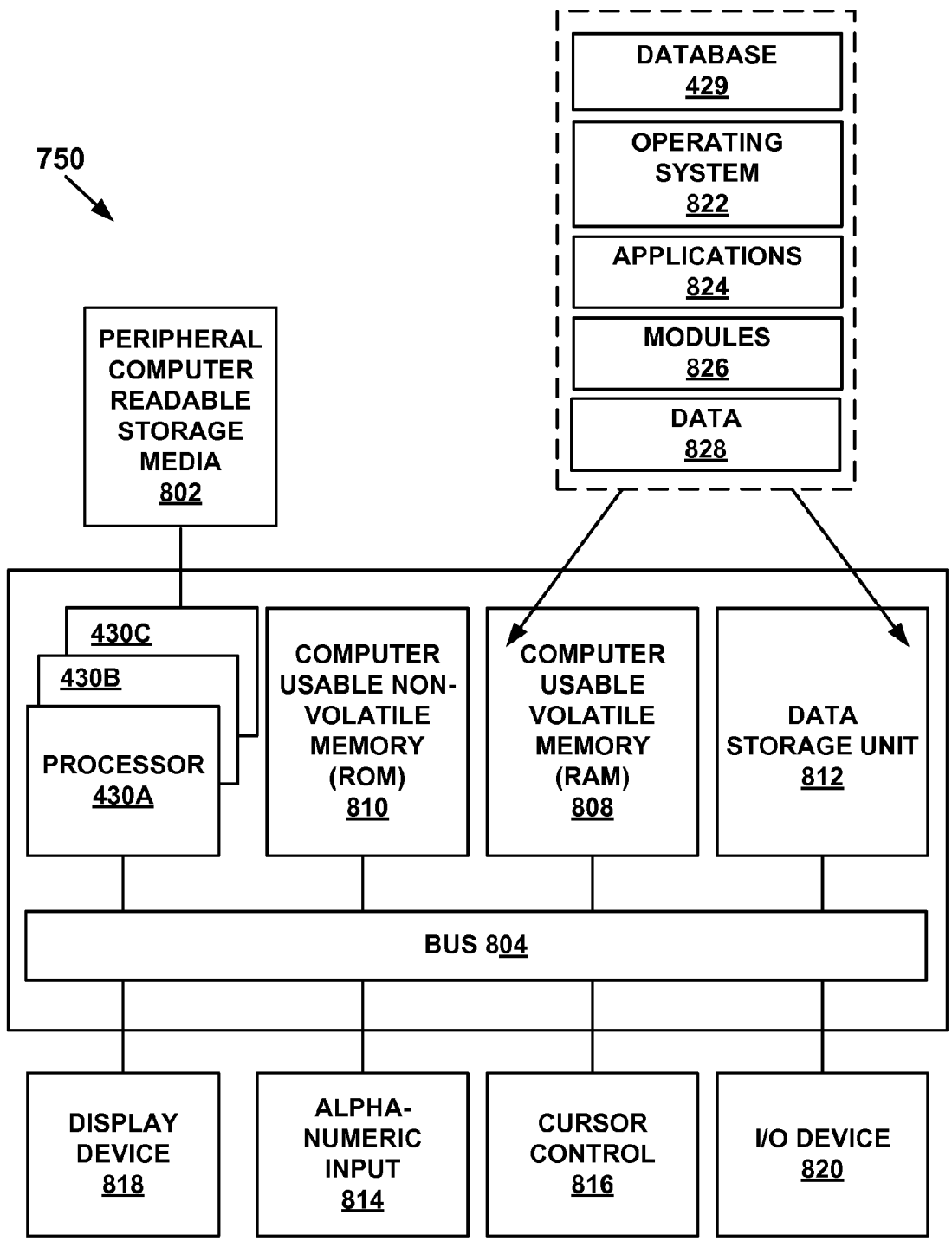
FIG. 8 is a block diagram of an example computer system with which or upon which various embodiments described herein may be implemented.

FIG. 8 is a block diagram of an example computer system 750 with which or upon which various systems, networks, and/or method embodiments described herein may be implemented. With reference now to FIG. 8, all or portions of some embodiments described herein are composed of computer-readable and computer-executable instructions that reside, for example, in computer-usable/computer-readable storage media of a computer system. That is, FIG. 8 illustrates one example of a type of computer (computer system 750) that can be used in accordance with or to implement various embodiments which are discussed herein. It is appreciated that computer system 750 of FIG. 8 is only an example and that embodiments as described herein can operate on or within a number of different computer systems including, but not limited to, general purpose networked computer systems, embedded computer systems, server devices, client devices, various intermediate devices/nodes, stand-alone computer systems, cloud computing systems, handheld computer systems, multi-media devices, and the like. Computer system 750 of FIG. 8 is well adapted to having peripheral tangible computer-readable storage media 802 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 750 of FIG. 8 includes an address/data bus 804 for communicating information, and a processor 430A coupled with bus 804 for processing information and instructions. As depicted in FIG. 8, system 750 is also well suited to a multi-processor environment in which a plurality of processors 430A, 430B, and 430B are present. Conversely, system 750 is also well suited to having a single processor such as, for example, processor 430A. Processors 430A, 430B, and 430B may be any of various types of microprocessors. System 750 also includes data storage features such as a computer usable volatile memory 808, e.g., random access memory (RAM), coupled with bus 804 for storing information and instructions for processors 430A, 430B, and 430B. System 750 also includes computer usable non-volatile memory 810, e.g., read only memory (ROM), coupled with bus 804 for storing static information and instructions for processors 430A, 430B, and 430B. Also present in system 750 is a data storage unit 812 (e.g., a magnetic or optical disk and disk drive) coupled with bus 804 for storing information and instructions. System 750 also includes an optional alphanumeric input device 814 including alphanumeric and function keys coupled with bus 804 for communicating information and command selections to processor 430A or processors 430A, 430B, and 430B. System 750 also includes an optional cursor control device 816 coupled with bus 804 for communicating user input information and command selections to processor 430A or processors 430A, 430B, and 430B. In one embodiment, system 750 also includes an optional display device 818 coupled with bus 804 for displaying information.

Referring still to FIG. 8, optional display device 818 of FIG. 8 may be a liquid crystal device, cathode ray tube, plasma display device or other display device suitable for creating graphic images and alphanumeric characters recognizable to a user. Optional cursor control device 816 allows the computer user to dynamically signal the movement of a visible symbol (cursor) on a display screen of display device 818 and indicate user selections of selectable items displayed on display device 818. Many implementations of cursor control device 816 are known in the art including a trackball, mouse, touch pad, joystick or special keys on alphanumeric input device 814 capable of signaling movement of a given direction or manner of displacement. Alternatively, it will be appreciated that a cursor can be directed and/or activated via input from alphanumeric input device 814 using special keys and key sequence commands. System 750 is also well suited to having a cursor directed by other means such as, for example, voice commands. System 750 also includes an I/O device 820 for coupling system 750 with external entities. For example, in one embodiment, I/O device 820 is a modem for enabling wired or wireless communications between system 750 and an external network such as, but not limited to, the Internet.

Referring still to FIG. 8, various other components are depicted for system 750. Specifically, when present, a database 429, an operating system 822, applications 824, modules 826, and data 828 are shown as typically residing in one or some combination of computer usable volatile memory 808 (e.g., RAM), computer usable non-volatile memory 810 (e.g., ROM), and data storage unit 812. In some embodiments, all or portions of various embodiments described herein are stored, for example, as collected data in database 429, an application 824 and/or a module 826 in memory locations within RAM 808, computer-readable storage media within data storage unit 812, peripheral computer-readable storage media 802, and/or other tangible computer-readable storage media. For example, aggregating agent 760 may be implemented as an application 824 which includes stored instructions for accessing database 429 and for controlling operation of computer system 750.

Example Method(s) of Agricultural Monitoring

Figure 9:
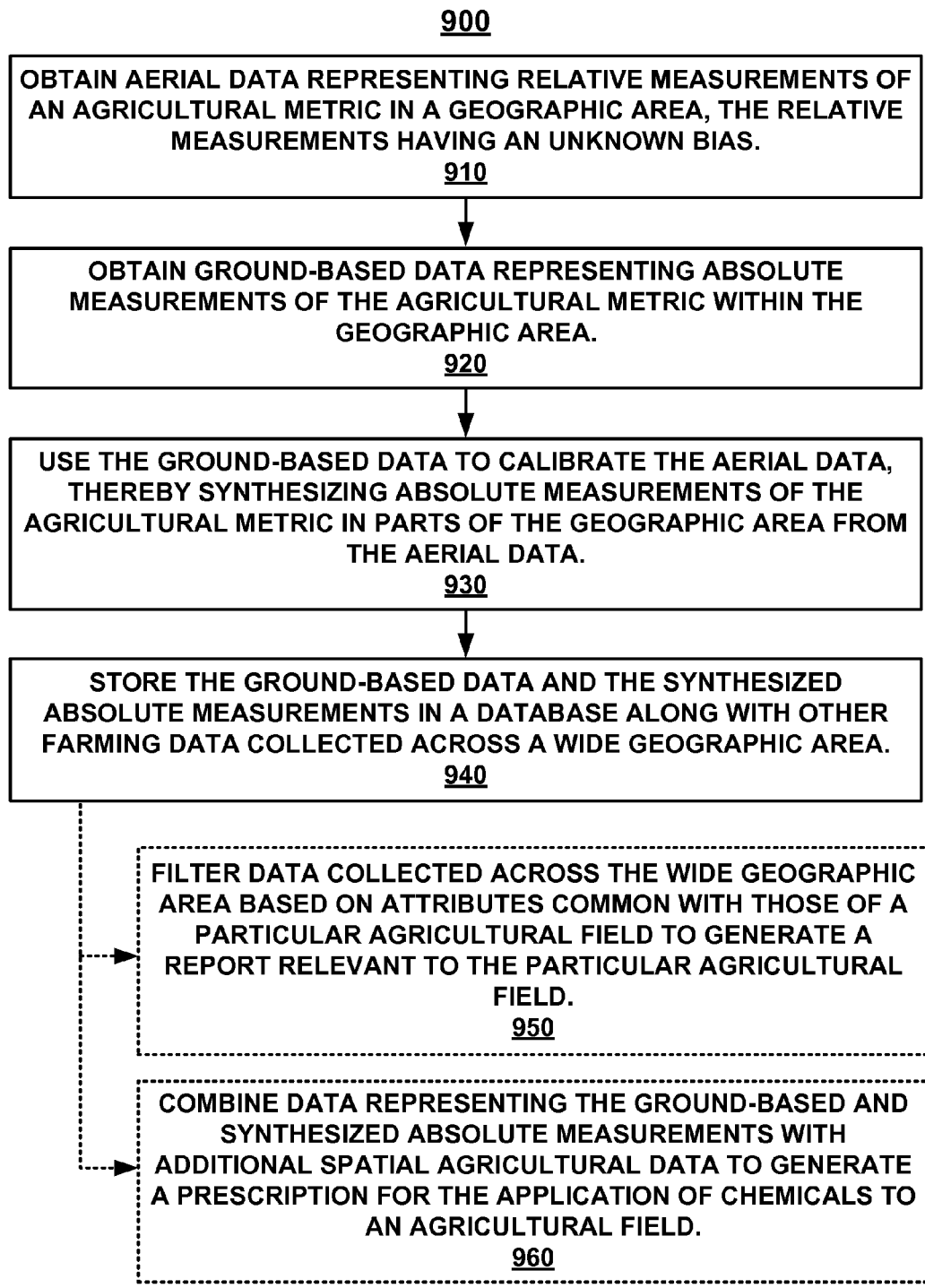
FIG. 9 illustrates a flow diagram of an example method of agricultural monitoring and prediction, according to various embodiments.

FIG. 9 is a flow diagram 900 of an example method of agricultural monitoring and prediction, according to various embodiments. Although specific procedures are disclosed in flow diagram 900, embodiments are well suited to performing various other procedures or variations of the procedures recited in flow diagram 900. It is appreciated that the procedures in flow diagram 900 may be performed in an order different than presented, that not all of the procedures in flow diagram 900 may be performed, and that additional procedures to those illustrated and described may be performed. All of, or a portion of, the procedures described by flow diagram 900 can be implemented by a processor or computer system (e.g., processor 430 and/or computer system 750) executing instructions which reside, for example, on computer-usable/readable media. The computer-usable media can be any kind of non-transitory storage that instructions can be stored on. Non-limiting examples of the computer-usable/readable media include but are not limited to a diskette, a compact disk (CD), a digital versatile device (DVD), read only memory (ROM), flash memory, and so on.

At 910 of flow diagram 900, in one embodiment, aerial data is obtained. The obtained aerial data represents relative measurements of an agricultural metric in a particular geographic area. The aerial data and the relative measurements that it represents have an unknown bias. Such aerial data may be communicated from a reporting agent on an aerial platform (satellite, aircraft, etc.) or acquired from a stored location in a public data source 730 or private data source 740.

At 920 of flow diagram 900, in one embodiment, ground-based data is obtained. The obtained ground-based data represents absolute measurements of the agricultural metric within the geographic area. The ground-based data may be obtained from a ground based reporting agent 710 which is coupled with a ground-based source (e.g., mobile device 701, vehicle monitor 702, fixed asset 703, and/or PC 704).

At 930 of flow diagram 900, in one embodiment, the ground-based data is used to calibrate the aerial data, thereby synthesizing absolute measurements of the agricultural metric in parts of the geographic area from the aerial data. The ground-based data which is used overlaps with a portion of the aerial data and the delta between overlapping portions can be used to determine the bias of the aerial data and thus calibrate all of the aerial data.

At 940 of flow diagram 900, once calibrated, the synthesized absolute measurements are stored in a database with along with the ground-based data. Additionally, other farming data is stored in the same database (or a communicatively coupled database). The other farming data is collected across a wide geographic area that is larger than the geographic area represented by the ground-based data and may be larger than the geographic area represented by the aerial data. For example, the geographic area represented by the aerial data may represent a single field of 80 acres or perhaps several square miles, while the wide geographic area for which farming data has been collected may represent an entire county, several counties, a state, several states, a country, several countries, a continent, or multiple continents. As described above, processor 430 can perform the calibrating and synthesizing, and database 429 can be utilized for storage.

At 950 of flow diagram 900, in some embodiments, the method of flow diagram 900 further includes filtering data collected across the wide geographic area based on attributes common with those of a particular agricultural field in order to generate a report relevant to the particular agricultural field. For example the synthesized absolute measurements may be for a particular field, and one or more parameters associated with the particular field or another field may be utilized to filter and aggregate relevant data (which shares one or more of these parameters) from various other, different agricultural fields across the wide geographic area represented by data stored in database 429. As described above, this filtering of data and aggregating it into a report 770 may be performed by aggregating agent 760. A report 770 may be presented in any of a variety of formats. In one non-limiting example, a report 750 may spatially represent the aggregated data on a visual representation (e.g., a line drawing, map, or image) of the particular field. In another non-limiting example, a report 770 may present aggregated data in a multi-column form such as with a latitude in first row of a first column, a longitude in a first row of a second column, and aggregated data associated with this latitude and longitude appearing in first rows of additional columns (with aggregated data for other coordinates similarly presented in a corresponding fashion in other respective rows of these columns).

At 960 of flow diagram 900, in some embodiments, the method of flow diagram 900 further includes combining data representing the ground-based and synthesized absolute measurements with additional spatial agricultural data to generate a prescription for the application of chemicals to an agricultural field. As previously describe, such a field prescription may be generated by processor 430 from data stored in database 429.

Example GNSS Receiver(s)

Figure 10:
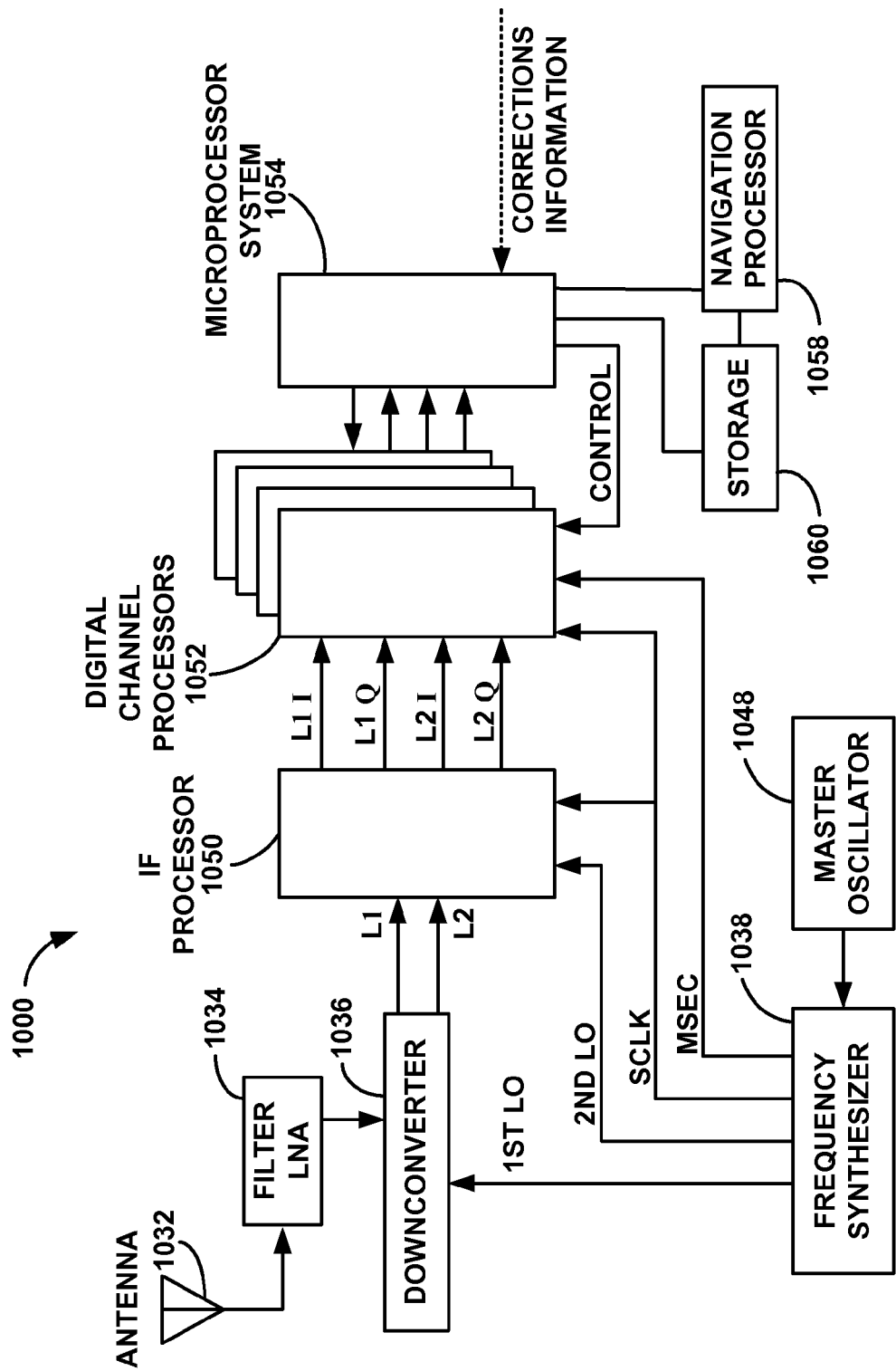
FIG. 10 is a block diagram of an example GNSS receiver used in accordance with one embodiment.

FIG. 10, shows an example GNSS receiver 1000 in accordance with one embodiment. It is appreciated that different types or variations of GNSS receivers may also be suitable for use in the embodiments described herein. In some embodiments, a GNSS receiver such as GNSS receiver 1000 may be coupled with or disposed as a portion of a reporting agent 710.

As illustrated in FIG. 10, received L1 and L2 signals are generated by at least one GPS satellite. Each GPS satellite generates different signal L1 and L2 signals and they are processed by different digital channel processors 1052 which operate in the same way as one another. FIG. 10 shows GPS signals (L1=1575.42 MHz, L2=1227.60 MHz) entering GNSS receiver 1000 through a dual frequency antenna 1032. Antenna 1032 may be a magnetically mountable model commercially available from Trimble Navigation of Sunnyvale, Calif. Master oscillator 1048 provides the reference oscillator which drives all other clocks in the system. Frequency synthesizer 1038 takes the output of master oscillator 1048 and generates important clock and local oscillator frequencies used throughout the system. For example, in one embodiment, frequency synthesizer 1038 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1034 performs filtering and low noise amplification of both L1 and L2 signals. The noise figure of GNSS receiver 1000 is dictated by the performance of the filter/LNA combination. The downconvertor 1036 mixes both L1 and L2 signals in frequency down to approximately 175 MHz and outputs the analogue L1 and L2 signals into an IF (intermediate frequency) processor 1050. IF processor 1050 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively. At least one digital channel processor 1052 inputs the digitally sampled L1 and L2 inphase and quadrature signals. All digital channel processors 1052 are typically are identical by design and typically operate on identical input samples. Each digital channel processor 1052 is designed to digitally track the L1 and L2 signals produced by one satellite by tracking code and carrier signals and to from code and carrier phase measurements in conjunction with the microprocessor system 1054. One digital channel processor 1052 is capable of tracking one satellite in both L1 and L2 channels. Microprocessor system 1054 is a general purpose computing device which facilitates tracking and measurements processes, providing pseudorange and carrier phase measurements for a navigation processor 1058. In one embodiment, microprocessor system 1054 provides signals to control the operation of one or more digital channel processors 1052. Navigation processor 1058 performs the higher level function of combining measurements in such a way as to produce position, velocity and time information for the differential and surveying functions. Storage 1060 is coupled with navigation processor 1058 and microprocessor system 1054. It is appreciated that storage 1060 may comprise a volatile or non-volatile storage such as a RAM or ROM, or some other computer readable memory device or media. In one rover receiver embodiment, navigation processor 1058 performs one or more of the methods of position correction.

In some embodiments, microprocessor 1054 and/or navigation processor 1058 receive additional inputs for use in refining position information determined by GNSS receiver 1000. In some embodiments, for example, corrections information is received and utilized. By way of non-limiting example, such corrections information can include differential GPS corrections, RTK corrections, and/or wide area augmentation system (WAAS) corrections.

Section 2: Water Erosion Management Incorporating Topography, Soil Type, and Weather Statistics Preventing, or minimizing, the effects of erosion and topsoil runoff are critical to the success of farming operations. For example, the topsoil generally hosts the highest concentrations of nutrients, organic matter, and microorganisms in a field. As a result, many plants concentrate their roots, and obtain most of their nutrients, from this region of the soil. When this layer of topsoil is washed away due to erosion, or blown away due to winds, this vital layer of nutrients is not available for crops. In extreme cases, the land is no longer able to support plant life. Furthermore, riverbeds, creeks, and lakes can become congested with unwanted silt. In addition to topsoil loss, surface runoff of rainwater can wash nutrients such as applied fertilizers, as well as herbicides, fungicides, and insecticides into watershed areas. This can result in unwanted effects such as algae blooms which kill fish, plants, and other animals. Additionally, other uses of the watershed, such as recreational activities or supplying potable water, can be adversely affects by the runoff of these chemicals. In addition to soil erosion and topsoil runoff, in some places of a farmer's field, insufficient drainage may occur. As a result, too much water may be retained in the farmer's field, or a sub-region of a particular field. This can make it more difficult to operate agricultural machinery, delay operations such as planting or harvesting, or make that particular area unsuited for planting a particular crop.

Figure 11:
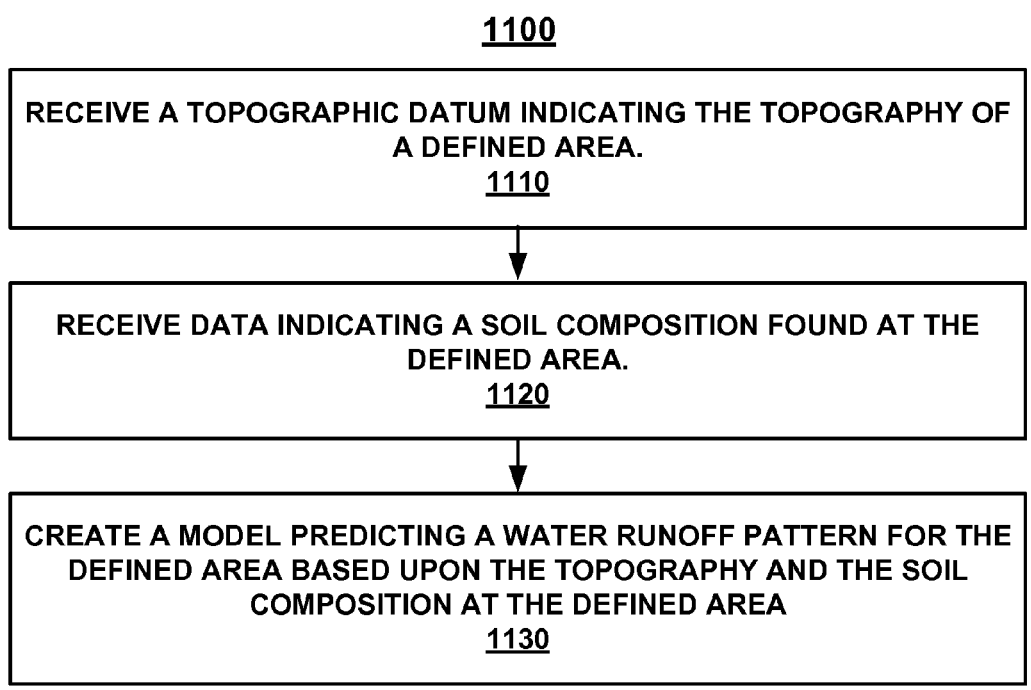
FIG. 11 illustrates a flow diagram of an example method of managing water erosion, according to various embodiments.

In accordance with various embodiments, methods of water erosion management are disclosed. FIG. 11 is a flow diagram 1100 of an example method of water erosion management, according to various embodiments. Although specific procedures are disclosed in flow diagram 1100, embodiments are well suited to performing various other procedures or variations of the procedures recited in flow diagram 1100. It is appreciated that the procedures in flow diagram 1100 may be performed in an order different than presented, that not all of the procedures in flow diagram 1100 may be performed, and that additional procedures to those illustrated and described may be performed. All of, or a portion of, the procedures described by flow diagram 1100 can be implemented by a processor or computer system (e.g., processor 430 and/or computer system 750) executing instructions which reside, for example, on computer-usable/readable media. The computer-usable media can be any kind of non-transitory storage that instructions can be stored on. Non-limiting examples of the computer-usable/readable media include but are not limited to a diskette, a compact disk (CD), a digital versatile device (DVD), read only memory (ROM), flash memory, and so on.

In operation 1110, a topographical datum is received indicating the topography of a defined area. In accordance various embodiments, topographical data can be collected from a variety of sources, which may be referred to as "reporting sources." For example, referring again to FIG. 7, processor 430 and/or database 429 can receive topographical data from reporting sources such as, but not limited to, mobile device(s) 701, vehicle monitor(s) 702, public data sources 730, private data sources 740, or other sources which are configured to detect, collect, or report topographical data. In some embodiments, a reporting agent 710 may transmit or allow access of the topographical data of a reporting source. In some embodiments, these reporting sources may provide the topographical data as a part of or in conjunction with capturing and providing absolute measurements of one or more agricultural metrics. Such reporting sources may also transmit or provide access to one or more of soil composition data 1320, weather data 1330, user input 1340, and subscriber data 1350.

Figure 12:
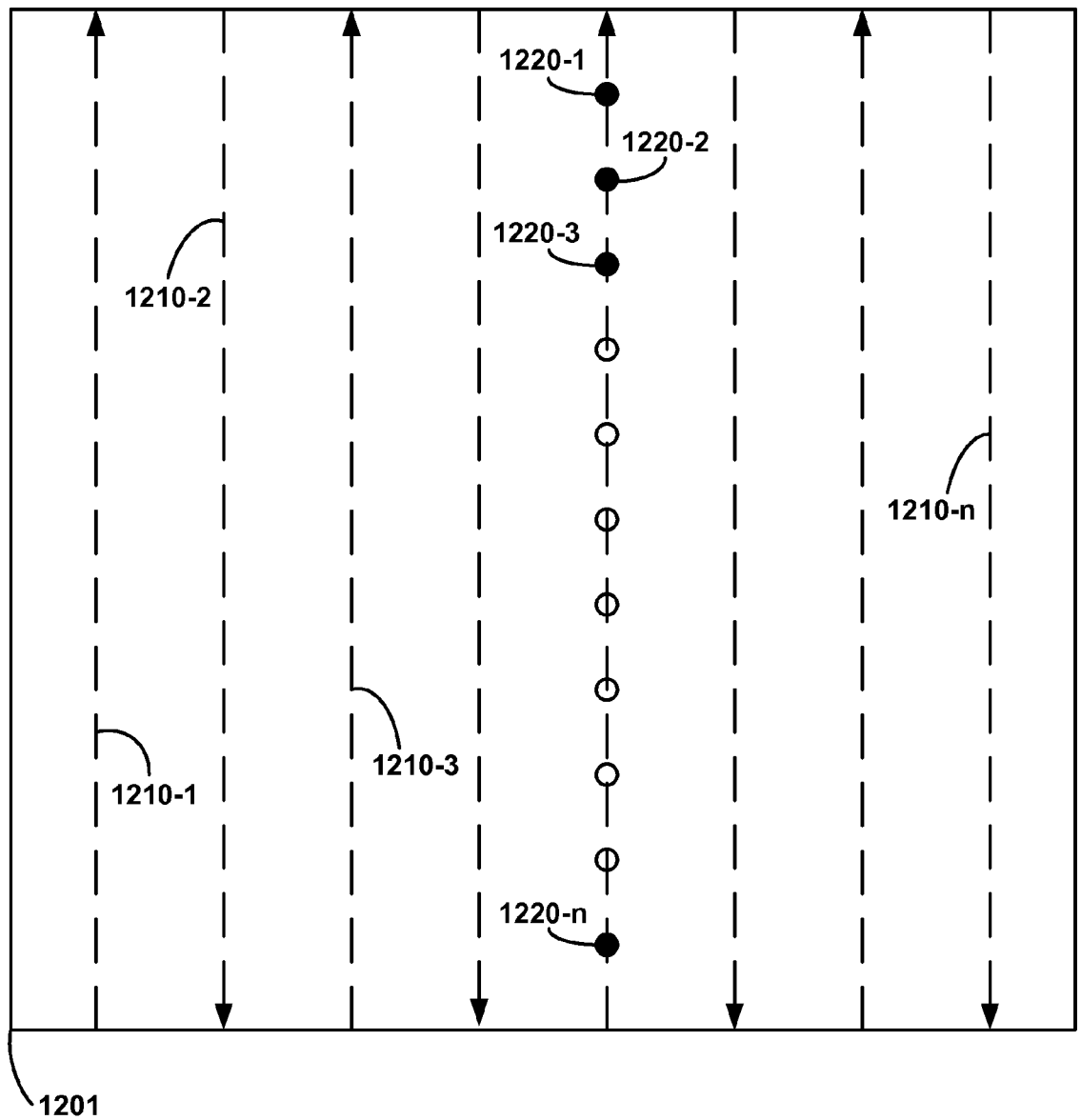
FIG. 12 illustrates a defined area and methods for collecting topographic data in accordance with various embodiments.
Figure 13:
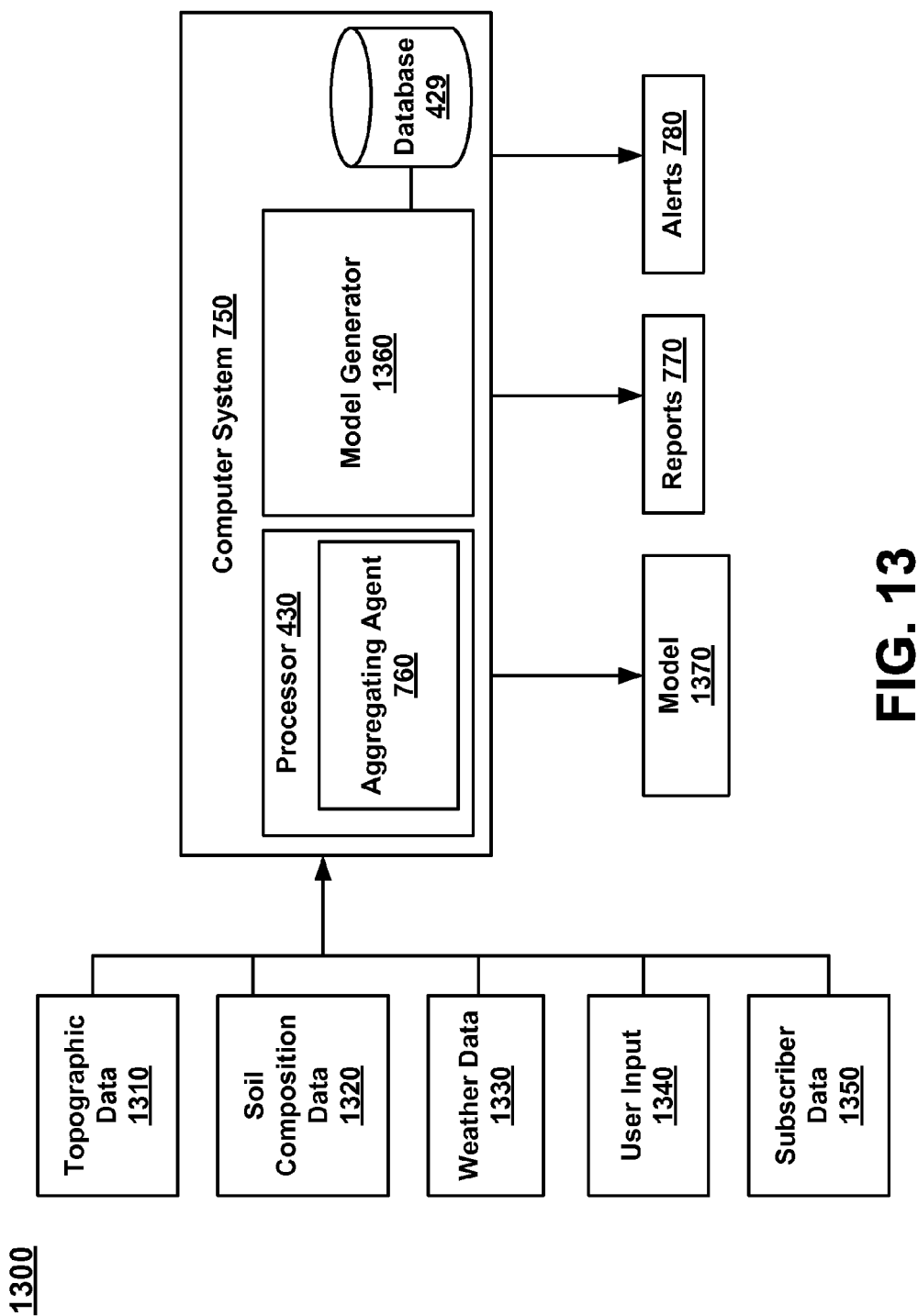
FIG. 13 is a block diagram of an example water erosion management system in accordance with one embodiment.

Receipt of topographical data is shown again in FIG. 13 where topographical data 1310 is received by computer system 750. As one example, referring now to FIG. 12 a farmer can traverse a defined area such as a field (e.g., field 1201 of FIG. 12. In one embodiment, the farmer can be walking across field 1201 in one or more linear passes such as shown by paths 1210-1, 1210-2, 1210-3 . . . 1210-n. In other words, simply by walking across field 1201 with mobile device 701, a farmer can generate in an ad-hoc manner topographic data 1310 which can be used later to generate a topographic map of field 1201. Alternatively, the farmer could make a series of stops at discreet sites such as shown by sites 1220-1, 1220-2, 1220-3 . . . 1220-n. In one embodiment, the farmer could be holding or carrying mobile device 701 which is configured with a GNSS receiver such as GNSS receiver 1000 of FIG. 10. In one embodiment, GNSS receiver 1000 periodically determines the position of mobile device 701 such as when the farmer is traversing field 1201. This can be performed as a dedicated effort on the part of the farmer to collect topographic data 1310 which will be used later to generate a topographic map (e.g., model 1370 of FIG. 13) of field 1201. This can also be performed simultaneously with or as a result of collection of other information, such as collection of absolute measurements of various agricultural metrics.

In one embodiment, the determination of the position of GNSS receiver 1000 includes determining its elevation. Thus, as the farmer traverses field 1201, GNSS receiver can generate a plurality of data points which can be used to develop a topographic map of field 1201. More specifically, a plurality of data points describing the elevation of GNSS receiver 1000, as well as its position, can be collected, stored, and sent using mobile device 701. Thus, in one embodiment, topographic data 1310 comprises position data as well as an elevation which is correlated with the position data. Alternatively, the same data can be collected when a farmer traverses field 1201 using, for example, a piece of agricultural machinery. In one embodiment, a vehicle monitor 702 can develop data points describing the elevation of GNSS receiver 1000, as well as its position, when a farmer is driving across field 1201, such as when plowing, applying a treatment, or harvesting a crop at field 1201. In one embodiment, mobile device 701 and/or vehicle monitor 702 performs this function in a manner which does not require manual intervention by a respective user. As an example, when a farmer registers with wide-area farming information collection and dissemination network 700, configuration information can be sent to mobile device 701, vehicle monitor 702, or other devices, which configures them to collect this information in a manner which is transparent to the operator of these devices. In one embodiment, when traversing field 1201, GNSS receiver 1000 is generating a continuous, or near continuous, stream of topographical data points which include the position and elevation of GNSS receiver at a given time. It is further noted that traversing the field can be performed in other patterns than shown in FIG. 12 such as in a grid pattern, etc.

In another embodiment, GNSS receiver 1000 generates the topographic data points including position and elevation of GNSS receiver 1000 at a particular time, at discreet sites as shown by points 1220-1, 1220-2, 1220-3 . . . 1220-n. As an example, a farmer can traverse field 1201 and collect soil samples at points 1220-1, 1220-2, 1220-3 . . . 1220-n. It is increasingly common for farmers to collect soil samples at regular intervals (e.g., every 100 meters) across their fields, which are then sent for analysis. The analysis of the soil samples tells the farmer what the soil composition is at each point where the samples were taken. This permits developing a detailed mapping of soil composition across a defined area such as field 1201. In one embodiment, a farmer can use mobile device 701, or vehicle monitor 701 to generate the position data which describes where each soil sample was taken. In one embodiment, when GNSS receive 1000 is used to generate a position fix (e.g., in response to a user action, it also automatically derives the elevation at that point as well. Referring again to FIG. 12, a farmer collects soil samples at sites 1220-1, 1220-2, 1220-3 . . . 1220-n. The farmer uses GNSS receiver 1000 to determine the position of sites 1220-1, 1220-2, 1220-3 . . . 1220-n for use in the soil analysis. In one embodiment, GNSS receiver 1000 also collects the elevation at each of these sites as well. The position and elevation data can be stored in an electronic file and sent, as topographic data 1310, via communication network 715 as it is collected. In another embodiment, the position and elevation data can be manually recorded by the farmer and later sent to computer system 750. It is noted that in one embodiment, the collection of topographic data, including position and elevation data, occurs simultaneous with the collection of soil samples used to determine soil composition. In another embodiment, these operations can occur at different times, or can be derived from separate sources.

In one embodiment, a model generator (e.g., model generator 1360 of FIG. 13) of computer system 750 accesses the topographic data 1310 and develops a 3-D map (e.g., model 1370) which conveys the contours of field 1201 based upon the received position and elevation data comprising topographic data 1310. It is appreciated that processor 420 may be provided with instructions to implement model generator 1360, in some embodiments. It is noted that other sources of topographical data 1310 can be used to develop model 1370 described above including, but not limited to, survey data, or similar data received from public data source 730 and/or private data source 740.

In operation 1120, data is received indicating a soil composition found at the defined area. As discussed above, in one embodiment, a farmer can collect soil samples at intervals across a defined area such as field 1201. In another embodiment, soil samples may be collected in another manner. For example, one or more electromagnetic induction sensors which can sense conductivity, may be utilized for mapping relative differences in soil characteristics in an agricultural field. An example of such as sensor is the EM38 sensor from Geonics Limited of Ontario, Canada. Such an electromagnetic sensor relies on detecting induced electric currents at depth in response to a magnetic field. The strength of the induced currents is determined by the electrical conductivity of the soil, often driven by the moisture profile in the soil matrix. Data logged from an electromagnetic sensor at various locations in a field can be utilized to map soil composition for the field. In some embodiments a reporting agent 710 is coupled with such an electromagnetic induction sensor for automatic reporting of collected soil composition data. Using these soil samples and knowing the position at which each soil sample was taken, model generator 1360 can include in model 1370, data showing the soil composition of field 1201. It is noted that model 1370 also shows how soil composition varies at different locations of field 1201. Furthermore, using the soil samples collected, for example, every 100 yards permits developing this information with a greater degree of granularity than is possible using many other sources of soil composition data such as government databases. For example, a government database is not typically configured to provide this level of granularity shown in model 1370 because of the time, effort, and money required to develop the data to this level of detail. Additionally, because of topographic changes within a field, soil composition may change. For example, sand and fine silt may collect in low-lying areas of a farmer's field due to it being conveyed in runoff. Thus, the tops of hills and ridges may have a higher composition of clay than areas of a field at the base of these terrain features which have a higher percentage of sand and silt. However, this may not be reflected in the soil composition maps retained at the federal, state, or county levels which typically map soil composition with much less detail.

In operation 1130, a model is created predicting water runoff patterns for the defined area based upon the topography of the defined area and the soil composition at the defined area. In one embodiment, model generator 1360 generates one of more model(s) 1370 which predicts water runoff patterns from field 1201 based upon the topography of field 1201 and the soil composition of field 1201. As noted above, model 1370 shows how soil composition varies at different locations of field 1201. In accordance with various embodiments, soil composition as well as the steepness of terrain found at field 1201, is used to develop model 1370.

Furthermore, model generator 1360 can access weather data (e.g., weather data 1330 of FIG. 13) in the development of model 1370. In accordance with various embodiments, weather data 1330 comprises historic weather data and/or predicted weather data. Weather data 1330 can be obtained from public sources such as the National Weather Service, or from private sources. One example of a private source of weather data 1330 is weather records maintained by the owner of field 1201. Another example of a private source of weather data 1330 is data collected by other farmers who live in the region of field 1201 and who have provided that data to wide-area farming information collection and dissemination network 700. Using this data, model generator 1360 can include in model 1370 a prediction of water runoff patterns at field 1201 based upon the available data. Model 1370 can also predict soil erosion, flooding, or other effects at field 1201 based upon the topographic data, soil composition, and weather data. For example, model 1370 can utilize historic rain fall data associated with various time periods, including but not limited to: several recent years (e.g., the most recent 5 year period); a time period of historic drought; a time period of historic wetness; a time period of historically high rainfall (e.g., a one day maximum; a one week maximum; rain fall associated with a 25, 50, or 100 year flood event; and the like). Other data can include overland flooding data, crop damage due to high winds, fire, or other events. In one embodiment, other farmers who also subscribe to wide-area farming information collection and dissemination network 700 can provide observed data which correlates soil composition, topographic data, and observed precipitation data. This facilitates adjusting the predicted water runoff patterns which are generated by model generator 1360 to more accurately model real-world conditions.

Thus, wide-area farming information collection and dissemination network 700 can provide a farmer a tool which is used to predict water runoff conditions at a defined area based upon topography, soil composition, and real, or hypothetical weather patterns. In one embodiment, user input 1340 of FIG. 13 permits a user to input other data such as existing land features, vegetation, and the like which change the topographic data of model 1370. As an example, a farmer can interact with model generator 1360 using mobile device 701, or PC 704 to change variables which are used to generate model 1370. For example, a farmer can change the topographic data of model 1370 to predict how water runoff conditions are affected by various terraforming operations. For example, a farmer can change the topography of model 1370 to level some hills and fill some low-lying areas. Based upon the changed topographic data and soil composition which results from these proposed operations, model generator 1360 will generate a new model 1370 which predicts the water runoff conditions which will result. Other operations which can be represented by model generator 1360 include, but are not limited to, the effects of installing drainage, sub-surface drainage, irrigation, changing the size, location, or course of existing water features, effects of planted vegetation on water runoff and erosion, etc. Again, changes to model 1370 can be based in part upon data (e.g., subscriber data 1350 of FIG. 13) from other subscribers to wide-area farming information collection and dissemination network 700 who have implemented or observed similar conditions on their property.

As a result, model generator 1360 permits a user to determine what actions to take to minimize erosion and/or control water runoff patterns on their property. Furthermore, model generator can access construction data which indicates or estimates the cost of various activities a user can model. For example, model 1370 can include information showing that it is estimated to cost $10,000 for a farmer to perform proposed terraforming operations on field 1201. This facilitates a cost/benefits analysis of various actions to determine not only whether the proposed terraforming operation will result in a desired outcome, but whether it is economically sound to perform a given terraforming operation.

In one embodiment, wide-area farming information collection and dissemination network 700 can also generate alerts 780 which can warn a farmer of potentially dangerous situations. For example, computer system 750 can access model 1370 and current weather predictions to determine if, for example, flooding will occur based upon projected rainfall in the next 72 hours. Knowing the terrain conformation of field 1201 and the soil composition at various sites across field 1201, computer system 750 can predict the capacity for the soil at field 1201 to absorb predicted rainfall within a given period. This prediction can be made more accurate by leveraging existing knowledge of other variables such as the current moisture content of the soil at field 1201, or of past flooding events which occurred under similar circumstances. As another example, computer system 750 can use data regarding flood levels upstream and/or downstream of field 1201, as well as the topographic data 1310 and soil composition data 1320, to predict whether flooding and/or erosion will occur at field 1201.

Section 3: Crop Treatment Compatibility

Various crop treatments may be applied to crops and fields by a variety different types crop treatment applicators. Some examples of crop treatment applicators include, but are not limited to: mounted sprayers, toying device and trailed (towed) sprayers, self-propelled sprayers (e.g., Hagie type sprayers), and aerial sprayers (e.g., spray planes/crop dusting aircraft), and combination applicators (i.e., a tractor with a mounted applicator towing a towed sprayer). Some examples of crop treatments include herbicides, fungicides, insecticides, and fertilizers. In some instances a particular crop treatment may not be compatible with application to a crop growing in a field where it is to be applied. In some instances a particular crop treatment may not be compatible with a crop growing in a bordering field to the field where the crop treatment is to be applied. For example, some field crops are bred or engineered with resistance to certain herbicides while others are not. Similarly, some field crops are unaffected by some selective herbicides, while others will be killed by the same selective herbicide. With respect to bordering fields, occasionally a crop treatment may migrate or drift (either in the air or in the soil) from the field where it is applied and a bordering field. If an incompatible crop treatment is applied to a crop results can include decreased yield and possible death/total loss of the crop. Various techniques, methods, systems, and devices, as described herein, may assist in ensuring compatibility of crop treatments with the crops that they are applied to and/or with crops growing in neighboring fields (such as the fields which border a field where a crop treatment is to be applied).

In discussion herein, for convenience, many examples will be illustrated with reference to a broad spectrum herbicide crop treatment. However, it is appreciated that these are only examples and the illustrated systems methods and devices also encompass utilization with other crop treatments. Broad spectrum herbicides include non-selective and selective herbicides. Some examples of broad spectrum herbicides include, but are not limited to: glyphosate (utilized, for example, in the Roundup® line of herbicides), which is a non-selective herbicide; glufosinate (utilized, for example, in some Basta®, Rely®, Finale®, Ignite®, Challenge® and Liberty® lines of herbicides), which is a non-selective herbicide; and 2,4-Dichlorophenoxyacetic acid, which is a selective herbicide commonly referred to as "2,4-D."

Figure 14:
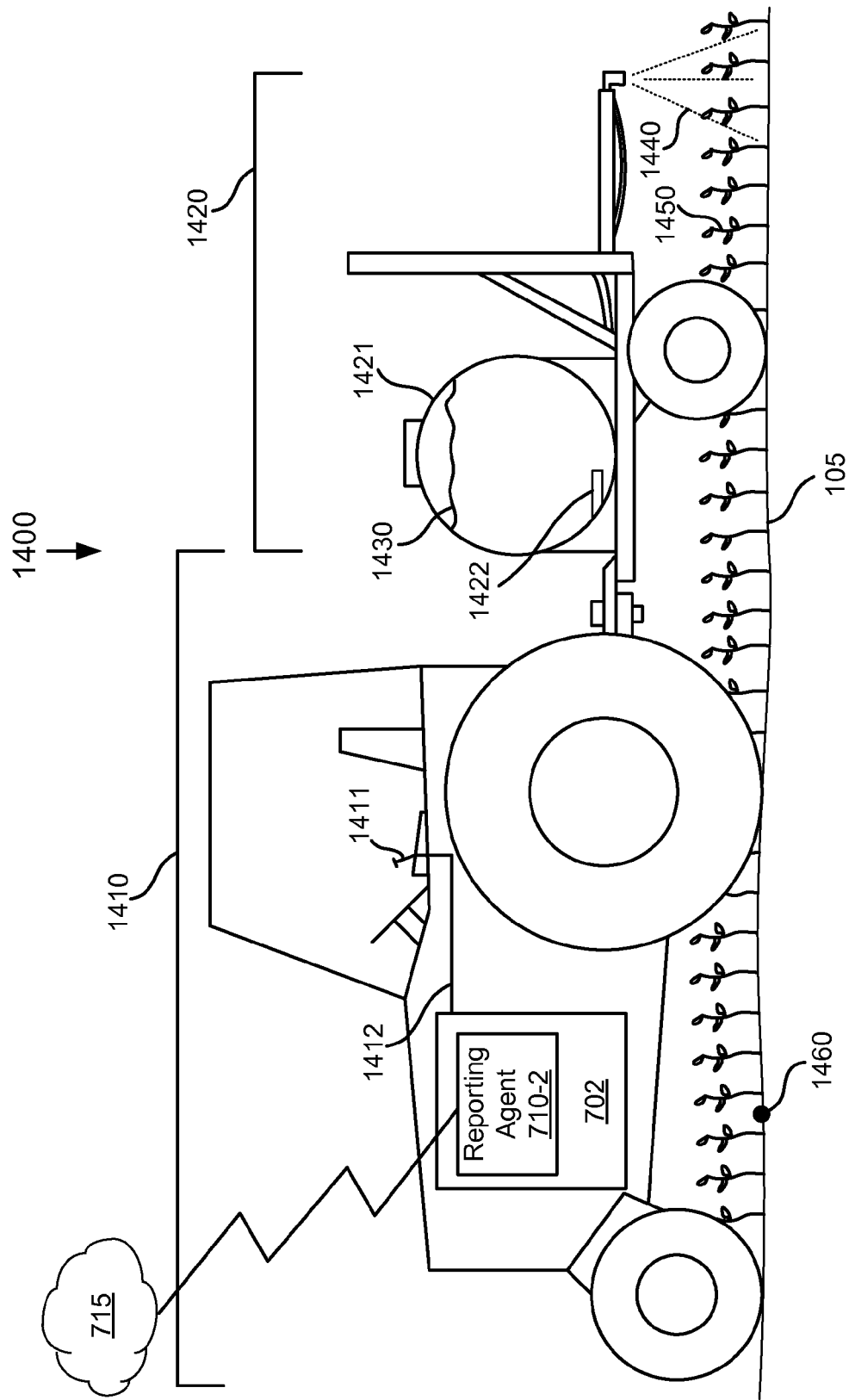
FIG. 14 illustrates an example crop treatment applicator in a planted field, in accordance with various embodiments.

FIG. 14 illustrates an example crop treatment applicator 1400 in a planted field 105, in accordance with various embodiments. Crop treatment applicator 1400 comprises a tractor 1410 coupled with a towed sprayer 1420. It is appreciated that the description with respect to crop treatment applicator 1400 is extensible to and equally applicable to other types of crop applicators, such as aerial crop applicators, mounted crop applicators, combination applicators, and self-propelled crop applicators, to name several. As depicted, towed sprayer 1420 is controlled from tractor 1410. Tractor 1410 comprises one or more vehicle monitor(s) 702 having respective reporting agents 710-2 disposed thereon. It is appreciated that such a vehicle monitor 702 and/or reporting agent 710-2 may be additionally or alternatively be coupled with towed sprayer 1420. Vehicle monitor 702 is coupled with tractor control bus 1412 and can receive and communicate information via tractor control bus 1412. Vehicle monitor 702 is also coupled with or includes a GNSS receiver (e.g., GNSS receiver 1000) for determining a real-time location (e.g., latitude/longitude) 1460 of crop treatment applicator 1400. Various offsets may be applied to determine a real-time location of any portion of crop treatment applicator 1400. As has been previously described herein, vehicle monitor 702 communicates with database 429 and/or processor 430 via communication network 715. This communication can comprise providing a real-time location of crop treatment applicator 1400, information such as a description of the type of crop treatment 1430 resident in crop treatment applicator 1400 (e.g., glyphosate herbicide), and whether or not crop treatment initiation mechanism 1411 is in an on or off position. In some embodiments, an operator of crop treatment applicator 1400 may manually input information, such as via a user-interface of reporting agent 710-2, which is also communicated to database 429 and/or processor 430. An example of manually input information may be a description of crop treatment 1430 (e.g., "holding tank 1421 is filled with Roundup Ultramax™ herbicide"). In other embodiments, a sensor, such as sensor 1422, in crop treatment applicator 1400 automatically determines the nature of crop treatment 1430 (e.g., type of herbicide, fungicide, insecticide, or fertilizer) and provides such descriptive information about crop treatment 1430 to reporting agent 710-2.

Crop treatment 1430 is resident in a holding tank 1421 of crop treatment applicator 1400, and can be applied in a spray 1440 to planted crop 1450 when an operator engages crop treatment initiation mechanism 1411. Crop treatment initiation mechanism 1411 may be a switch or other interlock which, when actuated to an "on" position causes crop treatment 1430 to flow and be discharged as spray 1440, and when deactuated to an "off" position causes flow of crop treatment 1430 to cease and discharge of spray 1440 to cease. In some embodiments, crop treatment initiation mechanism 1411 is communicatively coupled with a control bus 1412 of tractor 1410 such that when actuation signal or deactuation signal indicating the state of crop treatment initiation mechanism 1411 is transmitted on control bus 1412. Such signal(s) may be routed to a control system associated with tractor 1410 and/or with crop treatment applicator 1400. The signal(s) may also be received by vehicle monitor 702 and serve as a trigger to reporting agent 710-2, such that in response to actuation or deactuation of crop treatment initiation mechanism 1411, reporting agent 710-2 transmits one or more of a real-time location of crop treatment applicator 1400, a description of crop treatment 1430, and/or on/off state of crop treatment initiation mechanism 1411 to database 429 and/or processor 450.

In some embodiments, reporting agent 710-2 may receive an "enable application command" or a "disable application command" transmitted wirelessly as a signal from computer system 750 via communication network 715. An enable application command is passed on to vehicle monitor 702 and may either serve as a second of two enable signals required to initiate spray 1440. For example, a control system of crop treatment applicator 1400 may require actuation of crop treatment initiation mechanism 1411 and an enable signal from vehicle monitor 702, before initiation of spray 1440 and thus application of crop treatment 1430. Similarly, a disable application command may be passed from reporting agent 710-2 to vehicle monitor 702. Vehicle monitor 702 then sends a disabling signal on bus 1412 to cause spray 1440 to cease or to prevent initiation of spray 1440, thus disabling application of crop treatment 1430.

Figure 15:
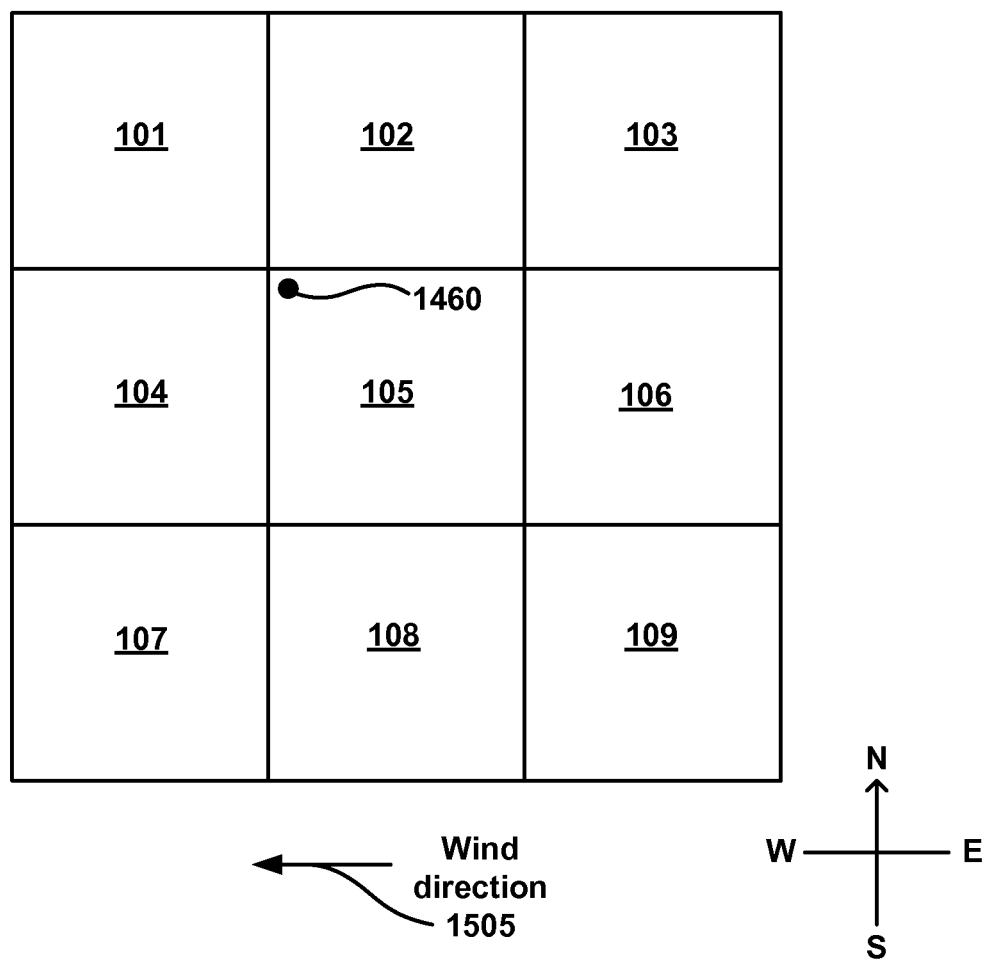
FIG. 15 shows a schematic of nine farm fields, according to various embodiments.

FIG. 15 shows a schematic of nine farm fields 101-109, according to various embodiments. For purposes of example, these are the same nine farm fields illustrated in FIG. 1. The location or positional bounds of fields 101-109 are known or stored in database 429. Location 1460 is shown in the Northwest corner of field 105. Arrow 1505 indicates a direction of wind across field 105, which may be reported to computer system 750 as part of weather data 1330. Weather data 1330 may include other information such as the speed of the wind, the temperature, and a forecast for the odds of precipitation in a region encompassing field 105.

Example Crop Treatment Compatibility System(s)

Figure 16:
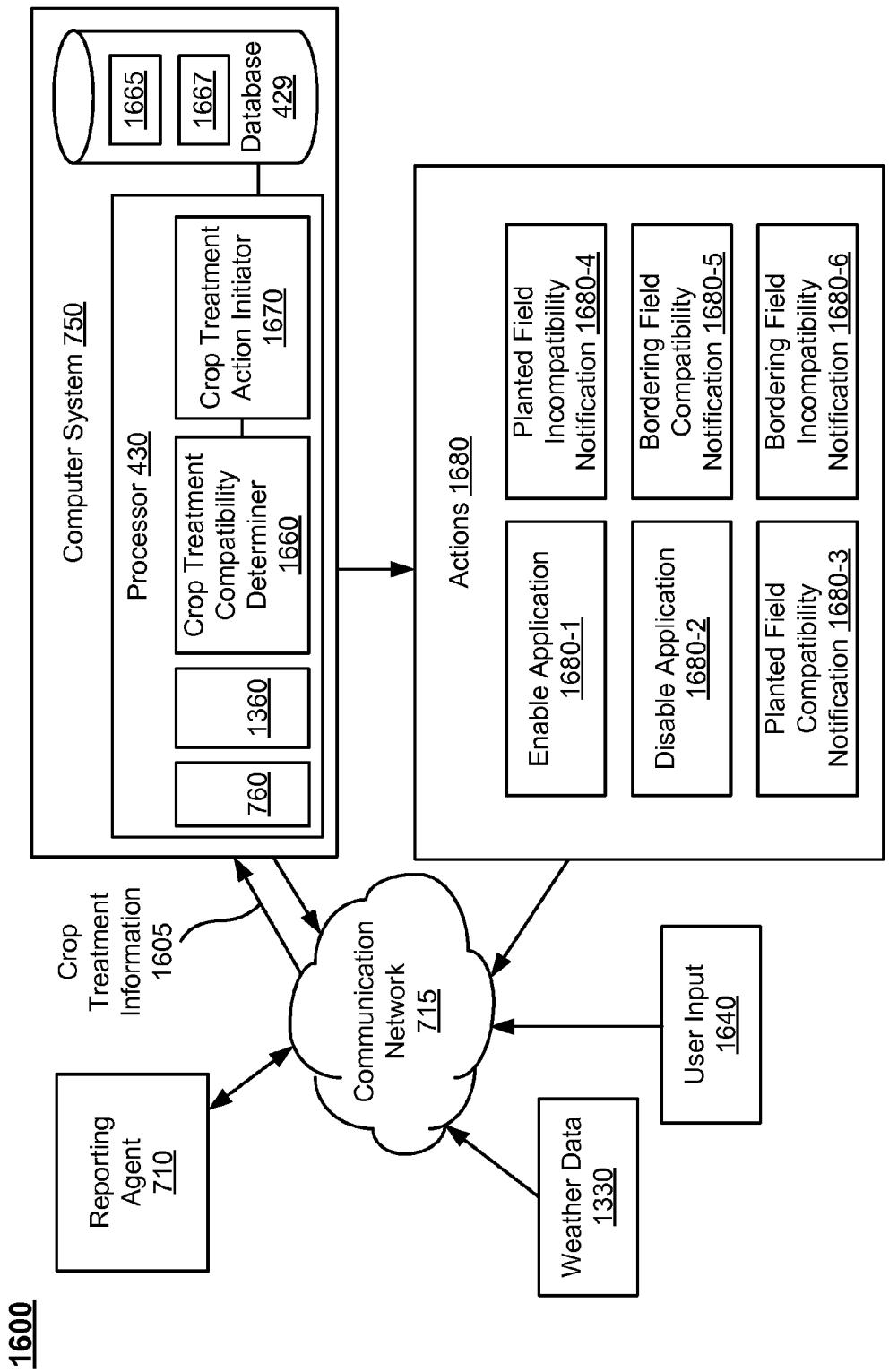
FIG. 16 is a block diagram of an example crop treatment compatibility system, in accordance with various embodiments.

FIG. 16 is a block diagram of an example crop treatment compatibility system 1600, in accordance with various embodiments. System 1600 includes a computer system 750 with a processor 430. Computer system 750 includes or is coupled with database 429 (although depicted in FIG. 16 as being a part of computer system 750, database 429 may reside in one or more locations remote from computer system 750 and be communicatively coupled with processor 430). Computer system 750 further includes crop treatment compatibility determiner 1660 and crop treatment action initiator 1670, either or both of which may be implemented as hardware, a combination of hardware and firmware, or a combination of hardware and software. In some embodiment, as illustrated, one or more of crop treatment compatibility determiner 1660 and crop treatment action initiator 1670 may be implemented by processor 430 from instructions accessed from a computer-readable medium.

Computer system 750, wireless communication network 715, reporting agent 710, processor 430, and database 429 have been previously described and operate in a manner consistent with previous description, with differences and additions identified below. In some embodiments, (as depicted) processor 430 may implement one or more of aggregator 760 and/or model generator 1360 (and/or other components described herein) in addition to implementing crop treatment compatibility determiner 1660 and/or crop treatment action initiator 1670.

Reporting agent 710 may be coupled with a crop treatment applicator and report treatment information that is automatically or manually gathered at the location of the crop treatment applicator. For example, reporting agent 710-2, as illustrated in FIG. 14, is coupled with crop treatment applicator 1400 and reports crop treatment information 1605 to computer system 750 and crop treatment compatibility determiner 1660.

Database 429 includes planted crop information 1665 for a plurality of planted fields. For example, with reference to FIG. 15, planted crop information 1665 for fields 101-109 may reside in database 429. Other information for these and other fields may be stored in database 429. If for example, a crop treatment is to be applied to field 105, database 429 thus includes planted crop information 1665 for field 105 and also includes planted crop information 1665 for one or more surrounding fields (101, 102, 103, 104, 106, 107, 108, 109) which border field 105. Planted crop information 1665 may be populated in database 429 by any means, including, but not limited to: user input 1640, automated input from a reporting agent 710, and/or by accessing public and private data sources such as government crop surveys and crop insurance databases. Planted crop information 1665 may include, among other information, the type of the crop, the age of the crop, genetic traits of the crop, and/or growing restrictions applicable to the crop. The type of the crop refers to the type of plant/seed that is being grown, some examples of different crop types include, but are not limited to: corn, wheat, soybeans, rice, cotton, canola, sunflower, sugarbeet, oats, spelt, sorghum, fescue, and alfalfa. Genetic traits, often referred to as "traits," include selectively bred and genetically engineered traits. Some examples of traits with applicability to crop treatment compatibility include, but are not limited to: glyphosate resistance (often referred to as RoundupReady®); and glufosinate resistance (often referred to as LibertyLink®). The age of the crop may be determined from the day of planting, day of sprouting, or day of known or estimated germination of the planted crop. Growing restrictions may include restrictions such as no use of pesticides, or no use of any manmade crop treatments. Growing restrictions are often associated with organic crops and may also be associated with fields where organic crops are grown or will be grown.

Crop treatment compatibility determiner 1660 receives crop treatment information 1605 related to a crop treatment applicator and determines if a crop treatment is compatible with a field in which the crop treatment applicator is located or in which the crop treatment will be applied.

Crop treatment information 1605 is received from sources such as user input 1640 (e.g., an electronic work order for an applicator to apply a particular crop treatment in a particular field/location). Such user input may be via a computer, personal digital assistant, smartphone, etc. Reporting agent 710 may also supply crop treatment information 1605, such as from an operator of a crop treatment applicator or automatically from a crop treatment applicator. Crop treatment information 1605 includes one or more of: a real-time location (e.g., a GNSS location) of a crop treatment applicator; a scheduled location of crop treatment application (such as from a work order); and a description of a crop treatment resident in the crop treatment applicator.

Crop treatment compatibility determiner 1660 makes a compatibility determination by accessing, from database 429, planted crop information 1665 for a field which encompasses the real-time location of the crop treatment applicator, and then evaluating the planted crop information 1665 and the crop treatment resident in the crop treatment system for compatibility based upon one or more stored crop treatment compatibility rules 1667. Such crop treatment compatibility rules 1667 may be stored in database 429, crop treatment compatibility determiner 1660, or any location where they can be accessed as needed.

Some non-limiting examples of crop treatment compatibility rules 1667 include: 1) 2,4-D containing herbicide is incompatible with application to soybeans; 2) 2,4-D containing herbicide is compatible with application to fescue; 3) 2,4-D containing herbicide is compatible with application to corn; 4) glyphosate containing herbicide is incompatible with application to any crop which does not possess a glyphosate resistant trait; 5) glyphosate containing herbicide is compatible with application to any crop which possesses a glyphosate resistant trait; 6) glufosinate containing herbicide is incompatible with any planted crop which does not possess a glufosinate resistance trait; 7) glufosinate containing herbicide is compatible with any planted crop which possesses a glufosinate resistance trait; 8) no herbicide is compatible with application to a certified organic planted crop; 9) no herbicide is compatible with application within 100 feet of a certified organic planted crop; 10) analyze compatibility for bordering planted fields that are downwind of a field where a crop treatment is being, or is to be, applied when prevailing wind is greater than 5 miles per hour and relative humidity is greater than 75%; 11) analyze compatibility for bordering planted fields that are downwind of a field where a crop treatment is being, or is to be, applied when prevailing wind is greater than 12 miles per hour; 13) compare real-time location with available work order information to determine if real-time location is compatible with scheduled location of crop treatment application.

It is appreciated that other embodiments may use other compatibility rules 1667, which may or may not include some or all of these example compatibility rules 1667. Compatibility rules 1667 may also be included or utilized for other crop treatments such as pesticides, fungicides, and fertilizers. Compatibility rules 1667 may take into account the age of a planted crop to determine if a crop treatment is being applied within a treatment window for which that crop treatment is compatible. Crop age is used to determine the lifecycle stage that a planted crop is in at any particular time, as some crop treatments which may normally be compatible with a planted crop may be incompatible at certain lifecycle stages such as before or during germination, or during pollination. For example, it may be desirable to apply fungicide to corn only before pollination to prevent yield loss. Likewise, application of a pre-emergent herbicide may only be compatible after a planted crop has germinated.

One or more crop treatment compatibility rules 1667 may be applied by crop treatment compatibility determiner 1660 to determine compatibility of a crop treatment with a field in which it is to be applied (or in which it is being applied). One or more crop treatment compatibility rules 1667 may also be applied by crop treatment compatibility determiner 1660 to determine compatibility of a crop treatment with a field which borders a field in which a crop treatment is to be applied (or in which it is being applied). One output of crop treatment compatibility determiner 1660 is a compatible/not compatible determination based on the application of one or more crop treatment compatibility rules 1667 to a planted field which encompasses a real-time location of a crop treatment applicator. Another output of crop treatment compatibility determiner, in some embodiments, is a compatible/not compatible determination based on the application of one or more crop treatment compatibility rules 1667 to one or more bordering planted fields which border or surround the planted field which encompasses a real-time location of a crop treatment applicator. Such compatibility/non-compatibility determinations are provided to crop treatment action initiator 1670 which may initiate one or more actions 1680 based on the compatibility determination for a planted field which encompasses the real-time location of the crop treatment applicator, or for one or more planted fields which border that planted field.

Crop treatment action initiator 1670 is a part of computer system 750 and is coupled with crop treatment compatibility determiner 1660. Crop treatment action initiator 1670 initiates, in real-time (in several seconds or less of receiving crop treatment information at computer system 750), one or more crop treatment actions 1680. Actions 1680 may be implemented, for example, in real-time from computer system 750 in response to the crop treatment compatibility/incompatibility determination that is made for a planted field in which a crop treatment is being applied or will be applied, or for one or more planted fields which border that planted field. Compatibility actions (e.g., enable application command 1680-1, planted field compatibility notification 1680-3, bordering field compatibility notification 1680-5 are three non-limiting examples) may be initiated in response to a compatibility determination, while incompatibility actions (disable application command 1680-2, planted field incompatibility notification 1680-4, and bordering field incompatibility notification 1680-6 are three non-limiting examples) may be initiated in response to an incompatibility determination. It is appreciated that some entities such as farmers or owners of fields may sign up as recipients of such actions 1680 and/or provide crop treatment information 1605 and/or planted crop information 1665 to computer system 750 in order to achieve reductions in crop insurance rates and/or improve peace of mind. Similarly, other entities such as crop treatment application companies and operators of crop treatment applicators may sign up as recipients of such actions 1680 and/or provide crop treatment information 1605 to computer system 750 to improve accurate delivery of crop treatment, to reduce liability, and/or to decrease insurance/bonding costs. Other entities such as crop insurance companies may sign up for receipt of certain actions 1680 and/or provide planted crop information 1665 in an effort to reduce crop insurance risk.

As example of initiating one or more planted field incompatibility actions, consider a situation where crop treatment applicator 1400 is located at location 1460 (in planted field 105) and crop treatment compatibility determiner 1660 determines that crop treatment 1430 is not compatible with application to the planted crop in field 105. In this situation, a disable application command 1680-2 may be sent to reporting agent 710-2. An owner of field 105 may also be text messaged a planted field incompatibility notification 1680-4, as a warning. An example of such a text message is "A glyphosate containing herbicide is about to be sprayed on corn in field 105 and this planted crop does not have a glyphosate resistant trait and is therefore not compatible with application of this herbicide." Another example of a crop treatment incompatibility action is an email message to a crop treatment company such as "Crop treatment applicator is in field 105 attempting to apply a crop treatment, which a work order has listed as scheduled for field application in field 102." Such incompatibility actions may be performed in isolation or in combination, in various embodiments.

As an example of initiating one or more planted field compatibility actions, consider a situation where crop treatment applicator 1400 is located at location 1460 (in planted field 105) and crop treatment compatibility determiner 1660 determines that crop treatment 1430 is compatible with application to the planted crop in field 105. In this situation, a crop treatment compatibility action such as texting a planted field compatibility notification 1680-3 to an owner of a planted field 105 is initiated, in real-time, in response to a determination by crop treatment compatibility determiner 1660 that a crop treatment 1430 is compatible with application to planted crop. An example of such a text message is "2-4,D is about to be sprayed on planted fescue in field 105 and this planted crop is compatible with application of this herbicide." In some embodiments, an enable application command 1680-1 may also be sent to reporting agent 710-2 of crop treatment applicator 1400. Such compatibility actions may be performed in isolation or in combination, in various embodiments.

Crop treatment action initiator 1670 may initiate a bordering field incompatibility action 1680-6, in real-time, in response to crop treatment compatibility determiner 1660 determining that the crop treatment for planted field 105 is not compatible with at least one of the bordering planted fields to planted field 105. As an example of initiating an incompatibility action for a bordering field, consider a situation where crop treatment applicator 1400 is located at location 1460 (in planted field 105) and crop treatment compatibility determiner 1660 determines that crop treatment 1430 is incompatible with application to the planted crop in field 104. An example of a bordering field crop treatment incompatibility action 1680-6 is placing an automated phone call to an owner of bordering field 104 stating "2-4,D is about to be sprayed on field 105 and this herbicide is not compatible with soybeans planted in field 104 which is downwind from field 105." Another example of a bordering field crop treatment incompatibility action 1680-6 is sending a pager message to an operator of crop treatment applicator 1400 stating "An herbicide is about to be sprayed in field 105, and this is incompatible with being sprayed within 100 feet of certified organic oats planted in field 102." In some embodiments, crop treatment action initiator may send a disable application command 1680-2 to reporting agent 710-2 in response to determining that application of a crop treatment in a first field is incompatible with planted crops in a bordering field. Various incompatibility actions, with respect to a bordering field, may be taken in isolation or in combination in one or more embodiments.

Crop treatment action initiator 1670 may initiate a bordering field compatibility action 1680-5, in real-time, in response to crop treatment compatibility determiner 1660 determining that the crop treatment for planted field 105 is compatible with at planted crops in all of the bordering planted fields to planted field 105. As an example of initiating a compatibility action for a bordering field, consider a situation where crop treatment applicator 1400 is located at location 1460 (in planted field 105) and crop treatment compatibility determiner 1660 determines that crop treatment 1430 is compatible with application to all known planted crops in field 101, 102, 103, 104, 106, 109, 110 (or for some subset of the bordering fields for which planted crop information is accessible by computer system 750). An example of a bordering field crop treatment compatibility action 1680-6 is placing an sending an email message to an owner of bordering field 104 stating "A glyphosate containing herbicide is about to be sprayed on a planted crop in field 105 and this herbicide is compatible with the glyphosate resistant trait of the soybeans planted in field 105." Various compatibility actions, with respect to a bordering field, may be taken in isolation or in combination in one or more embodiments.

While FIG. 16 illustrates a variety of actions 1680 which may be available in one or more embodiments, in other embodiments, a more limited set or more extensive set of actions 1680 may be available. A more limited set of actions 1680 or more extensive set of actions 1680 may include only a subset of the illustrated actions 1680-1 to 1680-6. For example, in one or more embodiments, a more limited set actions 1680 may include only planted field incompatibility notification 1680-4 from the illustrated actions 1680-1 to 1680-6. Other subsets of the illustrated actions 1680-1 to 1680-6 may be available in other embodiments.

Example Method(s) of Ensuring Crop Treatment Compatibility

Figure 17B:
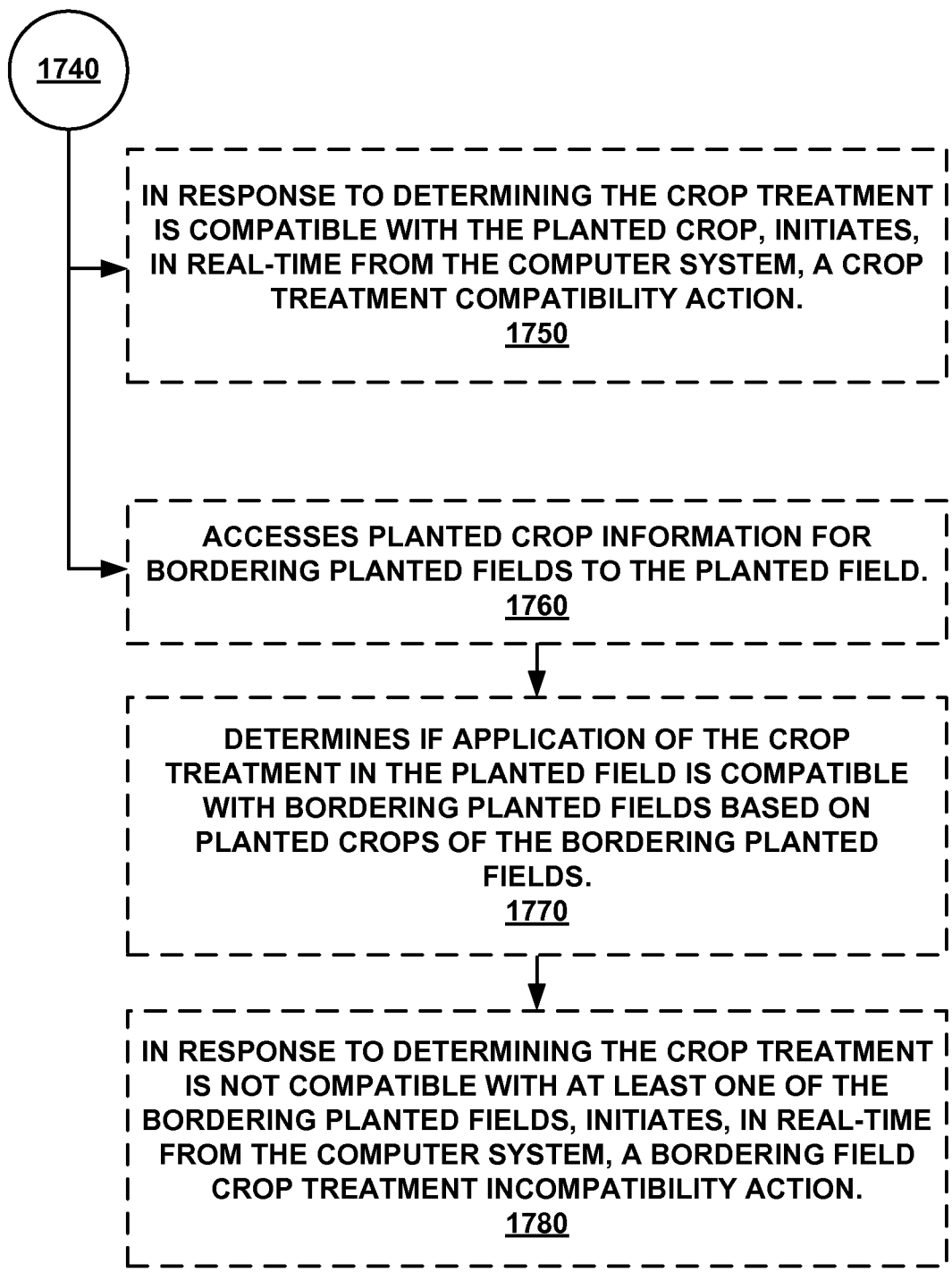

FIGS. 17A and 17B illustrate a flow diagram 1700 of an example method of ensuring crop compatibility, according to various embodiments. Although specific procedures are disclosed in flow diagram 1700, embodiments are well suited to performing various other procedures or variations of the procedures recited in flow diagram 1700. It is appreciated that the procedures in flow diagram 1700 may be performed in an order different than presented, that not all of the procedures in flow diagram 1700 may be performed, and that additional procedures to those illustrated and described may be performed. All of, or a portion of, the procedures described by flow diagram 1700 can be implemented by a processor or computer system (e.g., processor 430 and/or computer system 750) executing instructions which reside, for example, on computer-usable/readable media. The computer-usable/readable media can be any kind of non-transitory storage media that instructions can be stored on. Non-limiting examples of the computer-usable/readable media include, but are not limited to a diskette, a compact disk (CD), a digital versatile device (DVD), read only memory (ROM), flash memory, and so on.

At 1710 of flow diagram 1700, in one embodiment, crop treatment information is received at a computer system. As described above, this can comprise receiving crop treatment information 1605 at computer system 750, processor 430, and/or crop treatment compatibility determiner 1660. Crop treatment information 1605 comprises a real-time location of a crop treatment applicator and description of a crop treatment resident in the crop treatment applicator. It is appreciated that one or both of the real-time location and the description of the resident crop treatment may be received from a reporting agent 710 that is coupled with a crop treatment applicator 1400. One or more aspects of crop treatment information 1605 may also be received in the form of a reported work order for a crop treatment applicator 1400 and/or via user input 1640 of a farmer, owner of a field, crop treatment application company, or operator of crop treatment applicator 1400.

At 1720 of flow diagram 1700, in one embodiment, planted crop information 1665 is accessed for a planted field which encompasses the real-time location supplied as part of crop treatment information 1605. In one embodiment, crop treatment compatibility determiner 1660 requests, receives, or retrieves such planted crop information 1665 from database 429 or other location. The planted crop information 1665 comprises a description of a planted crop in a field with a known location. Planted crop information 1665 describes at least a type of crop seed planted in the planted field (e.g., wheat seed, corn seed, soybean seed, etc.). In some embodiments, the planted crop information 1665 may also describe a trait of the crop seed or lack of a trait of the crop seed. In some embodiments, the planted crop information 1665 may also describe an age of the planted crop.

At 1730 of flow diagram 1700, in one embodiment, a determination is made as to whether or not the crop treatment resident in the crop treatment applicator is compatible with application to the planted crop that is planted in the field which is encompasses the reported location of the crop treatment applicator. In one embodiment, crop treatment compatibility determiner 1660 makes this determination. This determination can be made after crop treatment compatibility determiner 1660 evaluates the planted crop information 1665 and the crop treatment 1430 resident in crop treatment applicator 1400 for compatibility based upon one or more stored compatibility rules 1667. Numerous non-limiting examples of such compatibility rules 1667 have previously been given and reference is made thereto.

At 1740 of flow diagram 1700, in one embodiment, in response to determining the crop treatment resident in the crop treatment applicator is not compatible with application to the planted crop in the field which encompasses the reported location of the crop treatment applicator, a crop treatment incompatibility action is initiated. In some embodiments, the crop treatment incompatibility action is initiated in real-time, from the computer system that has received crop treatment information 1605. In some embodiments, crop treatment action initiator 1670 initiates one or more actions 1680 that are associated with crop treatment incompatibility. Such actions can include sending a disable application command 1680-2 and/or sending a planted field incompatibility notification 1680-4. The crop treatment incompatibility notification 1680-4 may be sent by any electronic means (e.g., phone call, voice mail, text message, facsimile message, pager message, e-mail message, etc.) to an entity such as an owner of the planted field, a farmer of the planted field, an operator of the crop treatment applicator, a crop treatment application company, a crop insurance company, and/or a reporting agent 710 coupled with the crop treatment applicator. In one embodiment, sending a real-time disable application command 1680-2 to a reporting agent, such as reporting agent 710-2, which is coupled with a control system and/or control bus of the crop treatment applicator 1400 (such as through a vehicle monitor 702), causes the control system to disable application of crop treatment 1430.

At 1750 of flow diagram 1700, in one embodiment, the method as described in 1710-1740 further includes initiating a crop treatment compatibility action in response to determining the crop treatment is compatible with the planted crop. In some embodiments the crop treatment compatibility action is initiated in real-time from computer system that has received crop treatment information 1605. In some embodiments, crop treatment action initiator 1670 initiates one or more actions 1680 that are associated with crop treatment compatibility. Such actions can include sending an enable application command 1680-1 and/or sending a planted filed compatibility notification 1680-3. The crop treatment compatibility notification 1680-3 may be sent by any electronic means (e.g., phone call, voice mail, text message, facsimile message, pager message, e-mail message, etc.) to an entity such as an owner of the planted field, a farmer of the planted field, an operator of the crop treatment applicator, a crop treatment application company, a crop insurance company, and/or a reporting agent 710 coupled with the crop treatment applicator. In one embodiment, sending a real-time enable application command 1680-1 to a reporting agent, such as reporting agent 710-2, which is coupled with a control system and/or control bus of the crop treatment applicator 1400 (such as through a vehicle monitor 702), causes the control system to enable application of crop treatment 1430.

At 1760 of flow diagram 1700, in one embodiment, the method as described in 1710-1740 further includes accessing planted crop information 1665 for one or more bordering planted fields to the planted field in which a crop treatment is being, or is to be, applied. Bordering fields are those fields which border the field that encompasses the real-time location supplied as part of crop treatment information 1605. For example, if field 105 encompasses the real-time location, then fields 101, 102, 103, 104, 106, 107, 108, and 109 would be considered bordering fields. In one embodiment, crop treatment compatibility determiner 1660 requests, receives, or retrieves such planted crop information 1665 from database 429 or other location. The planted crop information 1665, for a bordering field, comprises a description of a planted crop in a field with a known location. Planted crop information 1665, for a bordering field, describes at least a type of crop seed planted in the bordering planted field (e.g., wheat seed, corn seed, soybean seed, etc.). In some embodiments, the planted crop information 1665, for a bordering field, may also describe a trait of the crop seed or lack of a trait of the crop seed. In some embodiments, the planted crop information 1665, for a bordering planted field, may also describe an age of the planted crop in the bordering planted field.

At 1770 of flow diagram 1700, in one embodiment, the method as described in 1760 further includes determining if application of the crop treatment in the planted field is compatible with one or more bordering planted fields. This comparison is based at least on planted crops of the one or more bordering planted fields. In one embodiment, crop treatment compatibility determiner 1660 makes this determination. This determination can be made after crop treatment compatibility determiner 1660 evaluates the planted crop information 1665 for the one or more bordering planted fields and the crop treatment 1430 resident in crop treatment applicator 1400 for compatibility based upon one or more stored compatibility rules 1667. Numerous non-limiting examples of such compatibility rules 1667 have previously been given and reference is made thereto.

At 1780 of flow diagram 1700, in some embodiments, the method of flow diagram 1770 further includes in response to determining the crop treatment is not compatible with at least one of the bordering planted fields, initiating a bordering field crop treatment incompatibility action. In some embodiments, the bordering field crop treatment incompatibility action is initiated in real-time, from the computer system that has received crop treatment information 1605. In some embodiments, crop treatment action initiator 1670 initiates one or more actions 1680 that are associated with bordering field crop treatment incompatibility. Such actions can include sending a disable application command 1680-2 and/or sending a bordering planted filed incompatibility notification 1680-6. The bordering field crop treatment incompatibility notification 1680-6 may be sent by any electronic means (e.g., phone call, voice mail, text message, facsimile message, pager message, e-mail message, etc.) to an entity such as an owner of the planted field, a farmer of the planted field, an owner of the bordering planted field, a farmer of the bordering planted field, an operator of the crop treatment applicator, a crop treatment application company, a crop insurance company, and/or a reporting agent 710 coupled with the crop treatment applicator. In one embodiment, sending a real-time disable application command 1680-2 to a reporting agent, such as reporting agent 710-2, which is coupled with a control system and/or control bus of the crop treatment applicator 1400 (such as through a vehicle monitor 702), causes the control system to disable application of crop treatment 1430.

The method of flow diagram 1770 may further include in response to determining that the crop treatment is compatible with all of the bordering planted fields (or at least all of the bordering planted fields for which planted crop information is accessible), initiating a bordering field crop treatment compatibility action. In some embodiments, the bordering field crop treatment compatibility action is initiated in real-time, from the computer system that has received crop treatment information 1605. In some embodiments, crop treatment action initiator 1670 initiates one or more actions 1680 that are associated with bordering field crop treatment compatibility. Such actions can include sending an enable application command 1680-1 and/or sending a bordering planted filed compatibility notification 1680-5. The bordering field crop treatment compatibility notification 1680-5 may be sent by any electronic means (e.g., phone call, voice mail, text message, facsimile message, pager message, e-mail message, etc.) to an entity such as an owner of the planted field, a farmer of the planted field, an owner of the bordering planted field, a farmer of the bordering planted field, an operator of the crop treatment applicator, a crop treatment application company, a crop insurance company, and/or a reporting agent 710 coupled with the crop treatment applicator. In one embodiment, sending a real-time enable application command 1680-1 to a reporting agent, such as reporting agent 710-2, which is coupled with a control system and/or control bus of the crop treatment applicator 1400 (such as through a vehicle monitor 702), causes the control system to enable application of crop treatment 1430.

Section 4: Exchanging Water Allocation Credits

Increasingly, the allocation of scarce resources is a concern for developed, and developing, nations. As an example, growing populations and urbanization are necessitating intervention in order to allocate water resources between agricultural and municipal water users. As the populations of cities grow, there is an increased need for water for drinking, sewage, industrial, and recreational use. As a result, there is less water available for agricultural use unless the water supply can be increased. Furthermore, the increased population requires more food. Often, to cope with this increased demand agricultural operations are expanded to more arid regions which require irrigation in order to support crops. Additionally, as cities expand, they often take over previously arable land for urban use, further driving the need for irrigation. As a result, the need for increasing the allocation of water for agricultural purposes competes with the increased need of cities to support their populations.

Typically, for irrigation purposes farmers pay up-front for their yearly water allocations from a water source. For example, a farmer will pay at the beginning of some annual period for an allocation of 10,000 cubic meters of water from a watershed water source which provides water for irrigating the farmer's field. If the farmer needs additional water above his yearly allocation during a period of low rainfall, the farmer will pay extra for that water. However, during periods of excess rainfall, the farmer may not need to draw all of his allocated water from the watershed water source. The farmer is not compensated for allocated water which is not drawn from the watershed water source. As a result, the farmer has paid for an asset which is not needed or used in that growing season.

In accordance with various embodiments, wide-area farming information collection and dissemination network 700 can be used to monitor, aggregate, and broker the sale or exchange of water allocation credit between users. In one embodiment, fixed assets 703 comprise pumps, or other devices such as flow meters or monitor, which provide or monitor water delivered to a home, farm, industrial operation, etc. Reporting agent 710-3 automatically monitors and/or reports the amount of water which is pumped by fixed asset 703, or which flows past reporting agent 710-3. In one embodiment, reporting agent 710-3 is automatically stores this information locally. Additionally, reporting agent 710-3, in some embodiments, automatically forwards information related to water allocation, such as the amount of water that has flowed past reporting agent 710-3, to aggregating agent 760. Alternatively, a farmer, or other water user, can collect the data from reporting agent 710-3 (e.g., using reporting agent 710-1 of mobile device 701). In another example, a farmer can manually enter the data into PC 704 which reports the water allocation data to aggregating agent 760 using reporting agent 710-4.

Figure 18:
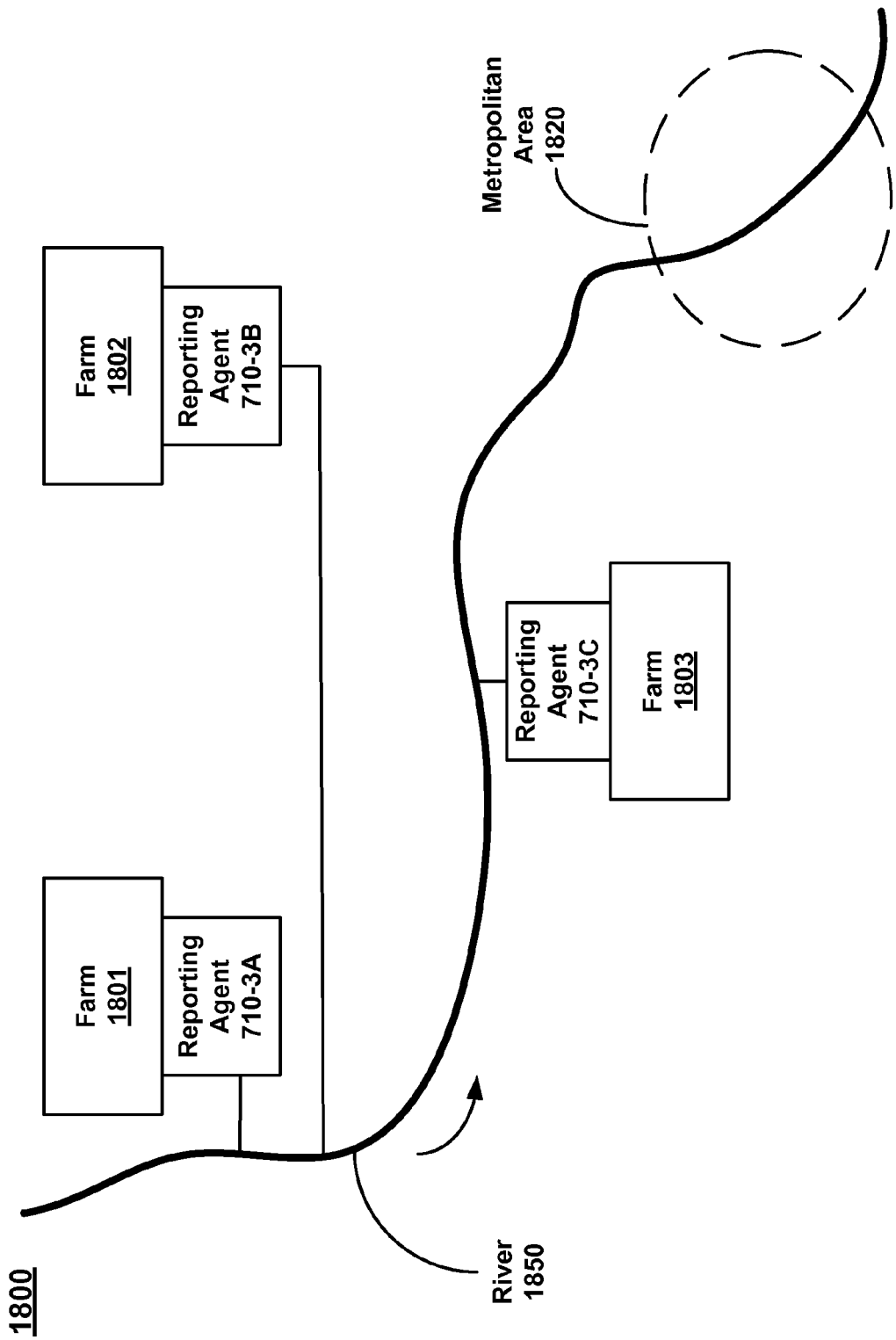
FIG. 18 is an example diagram of a watershed area in accordance with various embodiments.

FIG. 18 is an example diagram of a watershed area 1800 in accordance with various embodiments. A watershed area, such as watershed area 1850, may comprise any one or some combination of water sources such as a river, canal, reservoir, aquifer, or the like. In FIG. 18, farms 1801, 1802, and 1803 draw water from river 1850. For simplicity of illustration and discussion, only river 1850 is discussed, however discussion with respect to river 1850 is equally applicable to other watershed water sources and combinations thereof. Further downstream, metropolitan area 1820 also draws water from river 1850. As shown in FIG. 18, farms 1801, 1802, and 1803 use reporting agents 710-3A, 710-3B, and 710-3C respectively for monitoring and reporting of water drawn from river 1850. In accordance with various embodiments, reporting agents 710-3A, 710-3B, and 710-3C measure and report how much water a farmer has drawn from a water source such as river 1850. This data is sent to aggregating agent 760 of computer system 750 which acts as a broker system for exchanging water allocation credits. For example, if farm 1810 has received enough rainfall, it may not need all, or any, of its allocated water. Thus, if a farmer has paid in advance for 10,000 cubic meters of water, and only uses, or is projected to use, 2,000 cubic meters of water, computer system 750 can act as a broker to farms 1802 and 1803 which may be experiencing drier than anticipated rainfall and need water in excess of the water allocation which has been paid for. In accordance with one embodiment, a farmer who needs additional water can use the unused water allocation credit of another farmer who does not need it. For example, if farm 1801 has excess water, it can sell water allocation credits for the unused water allocation to farm 1803 which is located downstream of farm 1801. Additionally, this can be done without reducing the supply of water to other entities downstream of farm 1803 such as metropolitan area 1820. In another embodiment, the excess water allocation credit from multiple subscribers to wide-area farming information collection and dissemination network 700 can be aggregated and sold to another party. For example, the excess water allocation credit from each of farms 1801, 1802, and 1803 may be too small to be individually purchased by metropolitan area 1820. However, by aggregating the excess water allocation credits from farms 1801, 1802, and 1803 into a single, larger aggregated water allocation credit, wide-area farming information collection and dissemination network 700 can act as a broker to sell that larger aggregated water allocation credit to metropolitan area 1820.

In accordance with one embodiment, the data collection and reporting ability of wide-area farming information collection and dissemination network 700 can be leveraged to predict future precipitation projections and to send reports 770 to farmers (e.g., operators of farms 1801, 1802, and 1803) advising them that it is possible and/or advisable to sell some of their water allocation credit to another party. Again, in one embodiment, wide-area farming information collection and dissemination network 700 can act as an agent or broker for selling excess water allocation credit to another subscriber, or to another party. This can be based upon knowledge of the soil, topography, crops, weather patterns, current water levels of lakes and rivers, and other data which can be accessed by wide-area farming information collection and dissemination network 700. This permits generating a prediction of how much water a particular user will require from a water source.

In accordance with various embodiments, wide-area farming information collection and dissemination network 700 can be used to determine a cost/benefits analysis of drawing additional water from a water source in excess of the farmer's paid for water allocation. In some instances, farmers pay a higher rate when drawing additional water in excess of their normal water allocation. Again, wide-area farming information collection and dissemination network 700 can analyze the soil, weather, crops, and other variables, and generate a report 770 which describes whether a higher crop yield will recoup the cost of drawing additional water from a water source.

Figure 19:
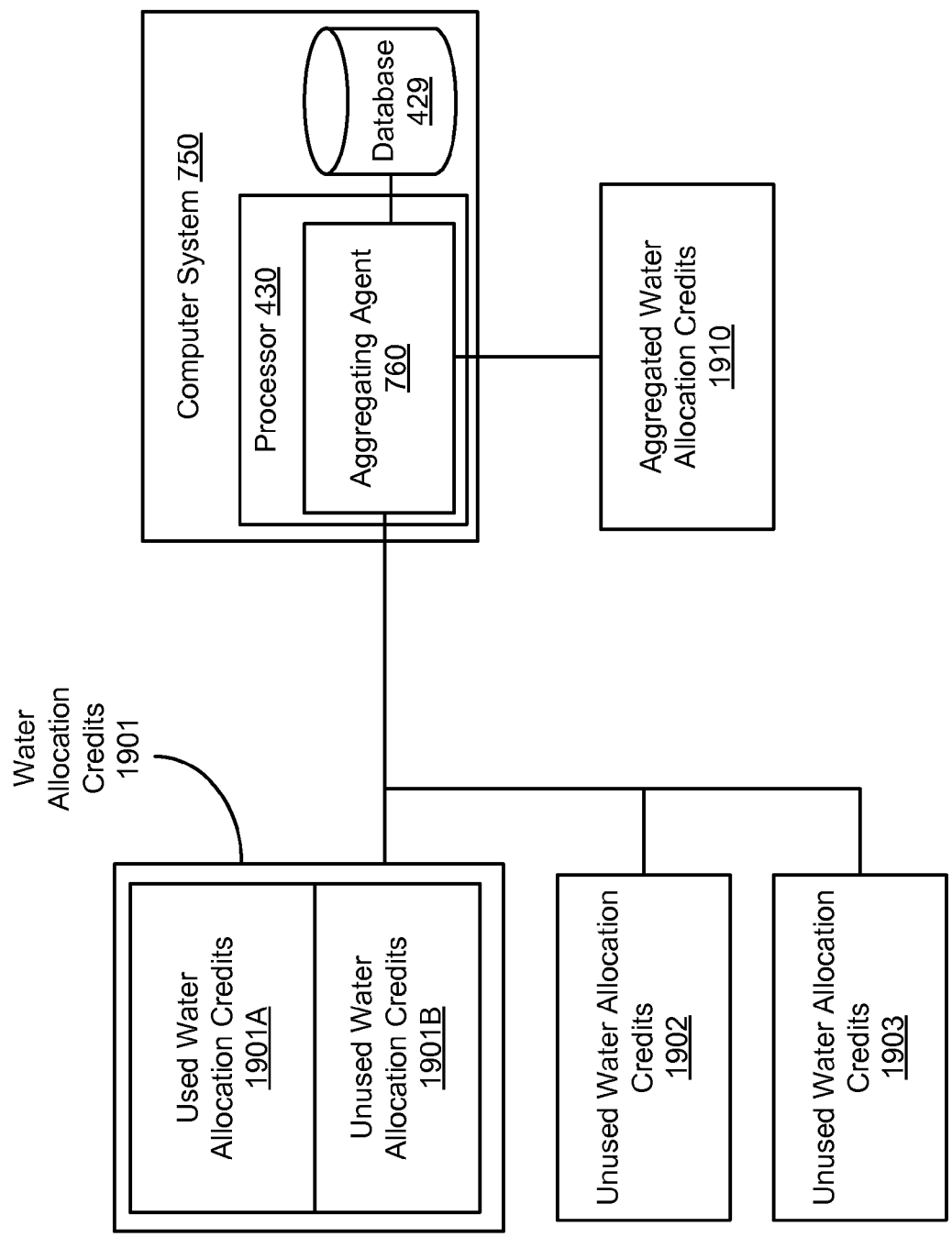
FIG. 19 is a block diagram showing examples of water allocation in accordance with various embodiments.
Figure 20:
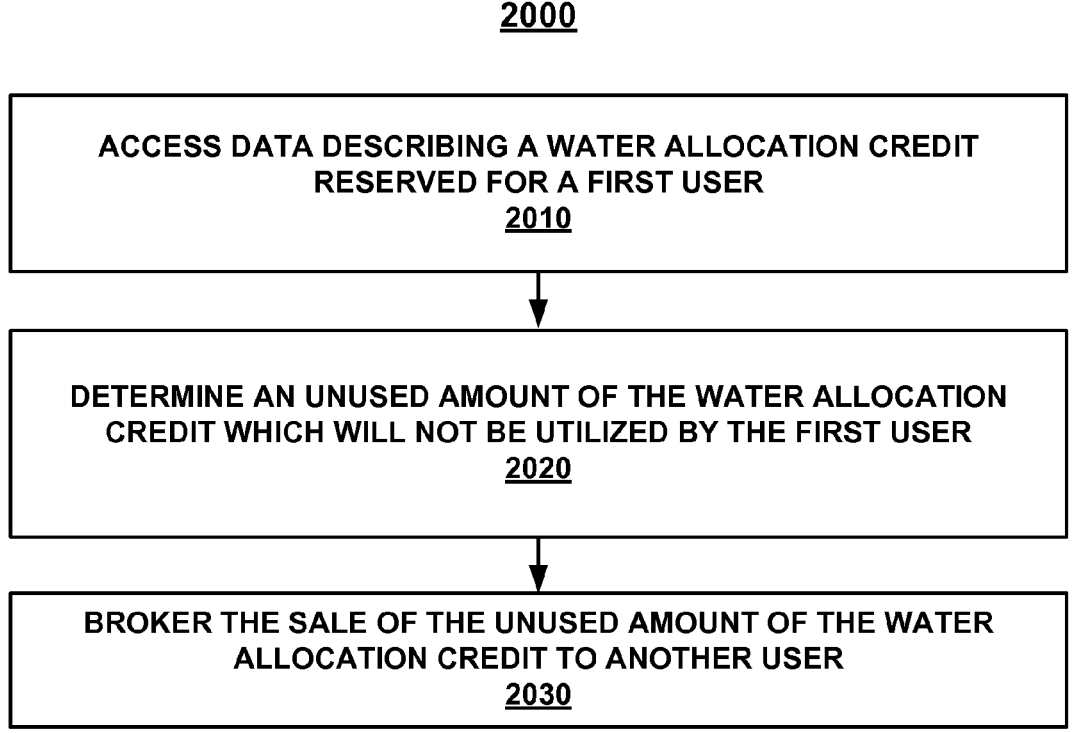
FIG. 20 is a flow diagram of an example method of exchanging water allocation credits in accordance with one embodiment.

FIG. 20 is a flow diagram of an example method 2000 of exchanging water allocation credits in accordance with one embodiment. In operation 2010 of FIG. 20, data is accessed describing a water allocation credit reserved for a first user. As described above, a farmer buys in advance the right to draw water from a water source. Typically, the farmer does not draw all of the water he paid for at that time, but instead will draw the water over an extended period such as the following year, or following growing season. Thus, in exchange for the money paid by the farmer, he receives water credits for drawing a given amount of water which is allocated to him. As described above, wide-area farming information collection and dissemination network 700 can gather information regarding various aspects of farming operations including irrigation and water allocation credit data. In one embodiment, a farmer can report the volume, and price paid, for his yearly allocation of water from a water source such as river 1850. As shown in FIG. 19, a farmer (e.g., operating farm 1801 of FIG. 18) can report his yearly water allocation as represented by water allocation 1901.

Wide-area farming information collection and dissemination network 700 can compare agricultural data for farm 1801 with historical records and/or subscriber data from other subscribers (e.g., farms 1802 and 1803) of wide-area farming information collection and dissemination network 700. Examples of this data include, but are not limited to, soil composition data, weather data (e.g., current weather patterns and forecasts, as well as historical data records), crop data, and the like. Using this information, wide-area farming information collection and dissemination network 700 can make a prediction of the amount of water which may be needed to meet a stated objective of the farmer. For example, the farmer could state a desired yield of crops per acre, a cost per acre to grow a crop, or another parameter, which is used by wide-area farming information collection and dissemination network 700 to predict how much water the farmer will need for that growing season. In one embodiment, wide-area farming information collection and dissemination network 700 can compare the agricultural data for the farmer at farm 1801 with similar data from other subscribers to more accurately model and predict the yield for the farmer based upon, for example, how much of a farmer's water allocation is needed or will be used to meet stated objective of the farmer. In another embodiment, wide-area farming information collection and dissemination network 700 can generate a message which predicts the farmer's crop yield if the farmer decides to sell his unused water allocation credit, or compare what additional gains in crop yield the farmer will realize for using additional amounts of the unused water allocation credit on his farm.

In operation 2020 of FIG. 20, an unused amount of the water allocation is determined which will not be used by the first user. As described above, wide-area farming information collection and dissemination network 700 can be used to determine how much water (e.g., used water allocation credit 1901A of FIG. 19) a farmer will need or use to meet a stated objective of a farmer. Thus, in some instances, a farmer will not necessarily need to use all of his water allocation for a given period or growing season. As a result, wide-area farming information collection and dissemination network 700 can determine an unused amount (e.g., unused water allocation credit 1901B of FIG. 19) of a farmer's given water allocation based upon this analysis. In one embodiment, wide-area farming information collection and dissemination network 700 will generate a message to a farmer stating that, while meeting the farmer's stated objectives, some amount of the farmer's water allocation credit remains, or will remain, unused. Alternatively, wide-area farming information collection and dissemination network 700 may generate a message stating that in order to meet another farmer's stated objective, more water than the farmer's current water allocation will be needed. Thus, a farmer can determine whether using more water allocation credits will result in a higher yield, or if he will benefit more by selling the unused water allocation credits to another party. In one embodiment, a reporting agent 710-3 coupled with a fixed asset 703 such as a pump, or flow meter of an irrigation system, can be used to report the actual amount of the allocated water a farmer has already used.

In operation 2030 of FIG. 20, the sale of the unused amount of the water allocation credit to another user is brokered. In one embodiment, wide-area farming information collection and dissemination network 700 can act as a broker for one, or a plurality of, subscribed users to sell goods, services, and commodities such as water for irrigation purposes. In one embodiment, wide-area farming information collection and dissemination network 700 can be implemented in the role of a broker for selling water allocation credits. As an example, the farmer operating farm 1801 can sell, via wide-area farming information collection and dissemination network 700, unused water allocation credit 1901B to the farmer(s) operating farms 1802 and/or 1803. Alternatively, wide-area farming information collection and dissemination network 700 can act as a broker between a plurality of farmers (e.g., operating farms 1801 and 1802) to another party. For example, in FIG. 18, the farmers operating farm 1801 and 1802 can, through aggregating agent 760, aggregate their unused water allocation credits (e.g., 1901B and 1902 of FIG. 19) to create aggregated water allocation credit 1910. Wide-area farming information collection and dissemination network 700 can then act as a broker to sell aggregated water allocation credit 1910 to another party. For example, wide-area farming information collection and dissemination network 700 can sell aggregated water allocation credit 1910 to another party. The other party may be elsewhere in watershed area 1800 outside of watershed area 1800. As one example, the other party to which aggregated water allocation credit 1910 is sold may be downstream along river 1850, such as farm 1803, or metropolitan area 1820. According to various embodiments, wide-area farming information collection and dissemination network 700 can aggregate the credit for unused water allocation credits, and broker their sale.

Section 5: Crop Characteristic Estimation

Figure 21:
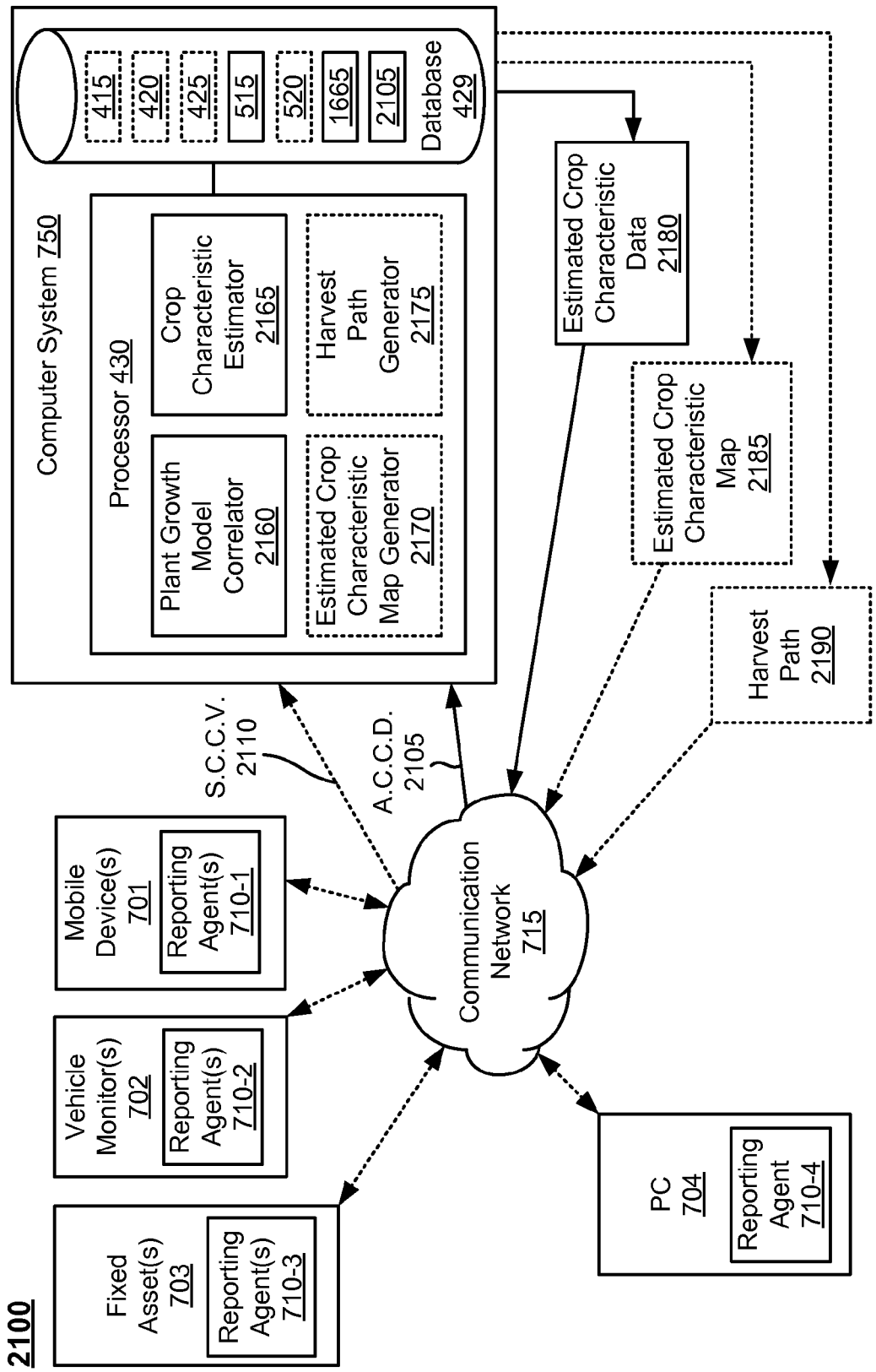
FIG. 21 is a block diagram of an example crop characteristic estimation system, in accordance with various embodiments.

FIG. 21 is a block diagram of an example crop characteristic estimation system 2100, in accordance with various embodiments. System 2100 includes a computer system 750 with a processor 430. Computer system 750 includes or is coupled with database 429 (although depicted in FIG. 21 as being a part of computer system 750, database 429 may reside in one or more locations remote from computer system 750 and be communicatively coupled with processor 430). Computer system 750 further includes plant growth model correlator 2160 and crop characteristic estimator 2165, either or both of which may be implemented as hardware, a combination of hardware and firmware, or a combination of hardware and software. In some embodiments, system 750 may further include one or more of estimated crop characteristic map generator 2170 and harvest path generator 2175, either or both of which may be implemented as hardware, a combination of hardware and firmware, or a combination of hardware and software. In some embodiment, as illustrated, one or more of plant growth model correlator 2160, crop characteristic estimator 2165, estimated crop characteristic map generator 2170, and/or harvest path generator 2175 may be implemented by processor 430 from instructions accessed from a computer-readable medium.

Computer system 750, wireless communication network 715, reporting agent 710, processor 430, and database 429 have been previously described and operate in a manner consistent with previous description, with differences and additions identified below. In some embodiments, (as depicted) processor 430 may implement one or more components or functions described herein in addition to implementing any or all of plant growth model correlator 2160, crop characteristic estimator 2165, estimated crop characteristic map generator 2170, and/or harvest path generator 2175.

Reporting agents 710 (710-1, 710-2, 710-3, 710-4, etc.) may be coupled with mobile device(s) 701, vehicle monitor(s) 702, fixed asset(s) 703, personal computer(s) 704, and other communication hardware. In one embodiment, a reporting agent 710 coupled a combine provides actual crop characteristic data (ACCD) 2105 from a harvested field. Such crop characteristic data may be data such as yield (i.e., bushels per acre measured at a plurality of locations in as a field is harvested), moisture content (i.e., a percentage of moisture content of a harvested crop measured at a plurality of locations as a field is harvested), protein content (i.e., percentage of protein contained in a harvested crop at a plurality of locations in a harvested field); and test weight. It is appreciated that modern combines are equipped to ascertain various crop characteristics such as one or more of yield, moisture content, protein content, and test weight, on-the-fly as a crop is being harvested. This information may be recorded in a memory on-board the combine and/or forwarded via communication network 715 to database 429 by a reporting agent 710. Actual crop characteristic data may also be provided to database 429 via one or more other sources, such as being sent from a personal computer of a farmer following the harvest of a field, or being sent from a mobile device of a farmer, agronomist, seed dealer or the like who samples a crop at a particular location in a field and then performs tests on the sampled crop to determine one or more items of crop characteristic data (e.g., moisture content %, protein content %, test weight, etc.).

In one embodiment, a user of system 2100, such as a farmer, custom cutter, combine operator, or the like may provide a specified crop characteristic value (SCCV) 2110 as an input for use in generating a harvest path to harvest a crop which satisfies the specified crop characteristic value 2110. Such an input specified crop characteristic 2110 is then forwarded to computer system 750 and harvest path generator 2175 via communication network 715 by a reporting agent 710. Some examples of specified crop characteristic value 2110 include, but are not limited to: estimated yield within a specified value range; estimated yield at or below a specified value; estimated yield at or above a specified value; estimated test weight within a specified value range; estimated test weight at or below a specified value; estimated test weight at or above a specified value; estimated moisture content within a specified value range; estimated moisture content at or below a specified value; estimated moisture content at or above a specified value; estimated protein content within a specified value range; estimated protein content at or below a specified value; estimated protein content at or above a specified value. It is understood that test weight and moisture content are very closely related, however, some entities prefer using one term rather than the other to describe a unit of grain. In general, test weight is a commonly accepted measure of quality used in the commercial exchange of bulk grain, while moisture content is a large sub-component in the overall test weight.

Database 429 includes planted crop information 1665 for a plurality of planted fields, plant growth models 515 for a plurality of fields, and actual crop characteristic data 2105 for a plurality of fields. It is appreciated that these data overlap. For example, database 429 will include planted crop information 1665, plant growth model information, and actual crop characteristic data 2105 for each of one or more field which have been planted, grown and harvested. Additionally, database 429 may include NDVI maps 520, soil data 415, crop data 420, climate data 425 and/or other information for various harvested and unharvested fields.

Plant growth model correlator 2160 is communicatively coupled with database 429. In one embodiment, plant growth model correlator 2160 is able to search database 429 to determine at least one harvested field which has a plant growth model that correlates with the plant growth model for at least a portion of an unharvested field. For example, if field 102 of FIG. 1 has been harvested and has a plant growth model which is available in database 429, plant growth model correlator 2160 may determine that regions with an NVDI shade of 2 (see FIG. 3) within management zone 1 (see FIG. 1) of field 102 correlate in their modeled plant growth with portions of field 103 which have an NVDI shade of 2 (see FIG. 3). Similarly, if field 104 of FIG. 1 has been harvested and has a plant growth model which is available in database 429, plant growth model correlator 2160 may determine that regions with an NVDI shade of 1 (see FIG. 3) within management zone 1 (see FIG. 1) of field 104 correlate in their modeled plant growth with portions of field 103 which have an NVDI shade of 1 (see FIG. 3).

Crop characteristic estimator 2165, in one embodiment, estimates a crop characteristic (i.e., estimated crop characteristic data 2180) for an unharvested field based on actual crop characteristic data obtained from at least one harvested field that has been correlated with the unharvested field. Such estimated crop characteristic data 2180 may be output from computer system 750 in an electronic form, such as a spread sheet which links such estimated crop characteristics to locations (e.g., latitude/longitude) within an unharvested field. Such a spreadsheet would typically have at least three columns, one for the estimated crop characteristic data, one for a latitude, and one for a longitude. Other formats for providing estimated crop characteristic data 2180 are possible and anticipated. Estimated crop characteristic data 2180 may be forwarded via communication network 715 to any location/ entity which can accept and display/utilize its content.

Following the previous example, if field 102 of FIG. 1 has been harvested and has a reported a protein content of harvested wheat averaging 15% in regions with an NVDI shade of 2 (see FIG. 3) within management zone 1 (see FIG. 1) of field 102, then crop characteristic estimator 2165 will, in one embodiment, estimated that portions of field 103 which have an NVDI shade of 2 (see FIG. 3) and a management zone of 1 will also have a wheat protein content of 15%. Similarly, if field 104 of FIG. 1 has been harvested and has a reported a protein content of harvested wheat averaging 13% in regions with an NVDI shade of 1 (see FIG. 3) within management zone 1 (see FIG. 1) of field 104, then crop characteristic estimator 2165 will, in one embodiment, estimated that portions of field 103 which have an NVDI shade of 1 (see FIG. 3) and a management zone of 1 will also have a wheat protein content of 13%. It is appreciated that other information may be taken into account in making crop characteristic estimates. Some examples of such other information include, but are not limited to: growing days for the correlated fields, weather data for the correlated fields, and time since harvest of the harvested field(s).

If field 102 of FIG. 1 has been harvested and has a reported a moisture content of harvested corn averaging 19% in regions with an NVDI shade of 2 (see FIG. 3) within management zone 1 (see FIG. 1) of field 102, then crop characteristic estimator 2165 will, in one embodiment, estimated that portions of field 103 which have an NVDI shade of 2 (see FIG. 3) and a management zone of 1 will also have a moisture content of corn which is at or below 19%. Similarly, if field 104 of FIG. 1 has been harvested and has a reported a moisture content of harvested corn averaging 17% in regions with an NVDI shade of 1 (see FIG. 3) within management zone 1 (see FIG. 1) of field 104, then crop characteristic estimator 2165 will, in one embodiment, estimated that portions of field 103 which have an NVDI shade of 1 (see FIG. 3) and a management zone of 1 will also have a moisture content of corn which is at or below 17%. It is appreciated that other information may be taken into account in making crop characteristic estimates. Some examples of such other information include, but are not limited to: growing days for the correlated fields, weather data for the correlated fields, and time since harvest of the harvested field(s).

In another example, if field 102 of FIG. 1 has been harvested and has a reported a test weight of harvested soybeans averaging 62 pounds/bushel in regions with an NVDI shade of 2 (see FIG. 3) within management zone 1 (see FIG. 1) of field 102, then crop characteristic estimator 2165 will, in one embodiment, estimated that portions of field 103 which have an NVDI shade of 2 (see FIG. 3) and a management zone of 1 will also have a test weight for soybeans which is at or above 62 pounds/bushel. Similarly, if field 104 of FIG. 1 has been harvested and has a reported a test weight of harvested soybeans averaging 55 pounds/bushel in regions with an NVDI shade of 1 (see FIG. 3) within management zone 1 (see FIG. 1) of field 104, then crop characteristic estimator 2165 will, in one embodiment, estimated that portions of field 103 which have an NVDI shade of 1 (see FIG. 3) and a management zone of 1 will also have a test weight for soybeans which is at or above 55 pounds/bushel. It is appreciated that other information may be taken into account in making crop characteristic estimates. Some examples of such other information include, but are not limited to: growing days for the correlated fields, weather data for the correlated fields, and time since harvest of the harvested field(s).

In another example, if field 102 of FIG. 1 has been harvested and has a reported a yield of harvested barley averaging 85 bushels/acre in regions with an NVDI shade of 2 (see FIG. 3) within management zone 1 (see FIG. 1) of field 102, then crop characteristic estimator 2165 will, in one embodiment, estimated that portions of field 103 which have an NVDI shade of 2 (see FIG. 3) and a management zone of 1 will also produce an average of 85 bushels/acre for barley. Similarly, if field 104 of FIG. 1 has been harvested and has a reported a yield of harvested barley averaging 70 bushels/acre in regions with an NVDI shade of 1 (see FIG. 3) within management zone 1 (see FIG. 1) of field 104, then crop characteristic estimator 2165 will, in one embodiment, estimated that portions of field 103 which have an NVDI shade of 1 (see FIG. 3) and a management zone of 1 will also have a yield for barley which is at or above 70 bushels/acre. It is appreciated that other information may be taken into account in making crop characteristic estimates. Some examples of such other information include, but are not limited to: growing days for the correlated fields, weather data for the correlated fields, and time since harvest of the harvested field(s).

In one embodiment, estimated crop characteristic map generator 2170 generates and outputs an estimated crop characteristic map 2185. Estimated crop characteristic map 2185 visibly illustrates and portrays the estimated crop characteristic(s) relative to locations within an unharvested field.

Figure 22:
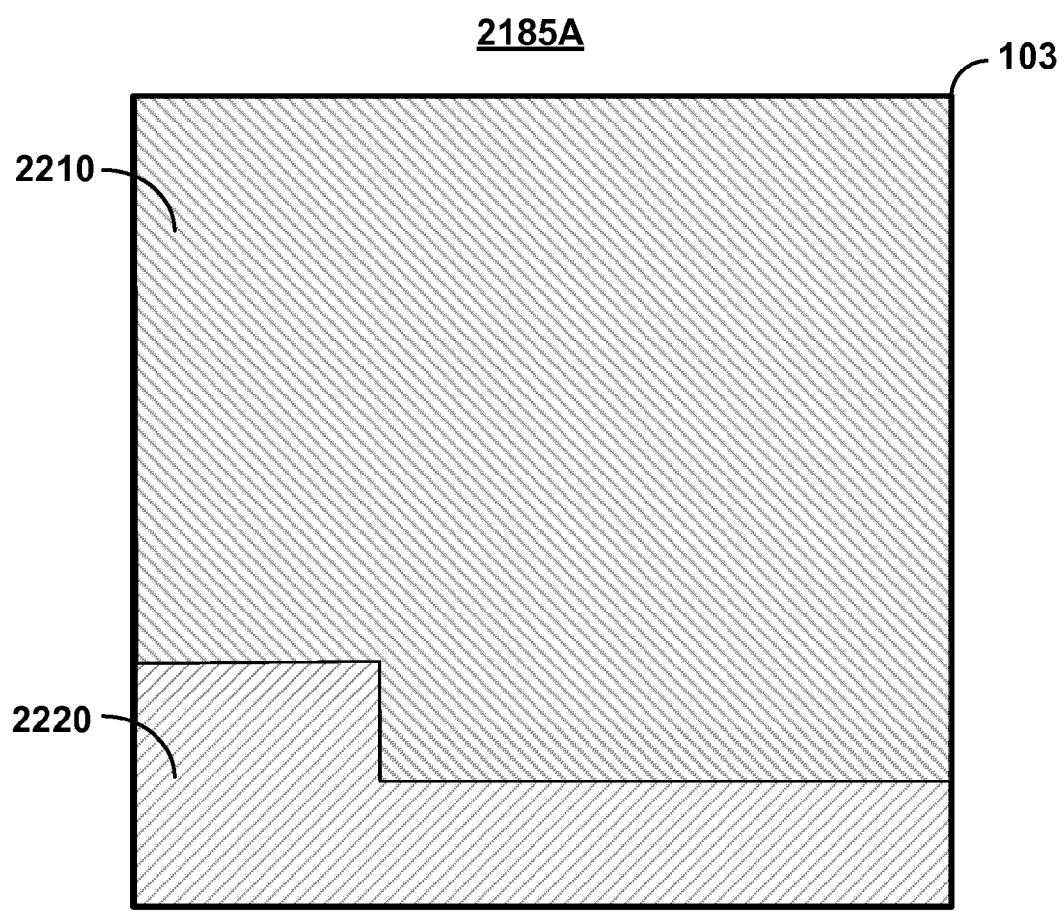
FIG. 22 illustrates an example estimated crop characteristic map for an unharvested field, according to one or more embodiments.

FIG. 22 illustrates an example estimated crop characteristic map 2185A for an unharvested field (field 103 of FIG. 1), according to one or more embodiments. Region 2210 is illustrated as having a first estimated crop characteristic, while region 2220 is illustrated as having a second and different estimated crop characteristic. Estimated crop characteristic map 2185A, of FIG. 22 may be printed, electronically displayed, and/or provided via communication network 715 to any location/entity which can accept and display/utilize/output its content.

In one embodiment, harvest path generator 2175 generates a harvest path 2190 for an unharvested field based on the estimated crop characteristic map. For example, the harvest path 2190 may be generated to harvest crops of a certain estimated crop characteristic separately from crops of a differing estimated crop characteristic. In one embodiment, a user may input or specify one or more items of information which are utilized by harvest path generator 2175. Some examples of specified information include a desired direction of harvest for hilled row crops (e.g., to prevent harvesting across the hills); a width of a combine head/number of rows which a combine head can handle; and a specified crop characteristic value 2110 for which the harvest path 2190 is to be generated. An example of a specified crop characteristic value 2110 may be protein content above or below a value or within a range. Another example of a specified crop characteristic value 2110 may be moisture content above or below a value or within a range. For example, a farmer may wish to generate a harvest path 2190 to harvest wheat with a specified average protein content % in order to fulfill a contract which requires wheat at or above a certain protein content %. In another case, a farmer may which to generate a harvest path 2190 to harvest corn with a moisture content within a specified average moisture content % in order to deliver the grain directly to a local cooperative without being docked in price for drying and shrinkage. In yet another case, a farmer may which to generate a harvest path 2190 to harvest soybeans with test weight above specified value in order to take advantage of a favorable prevailing market price for such a crop.

Figure 23:
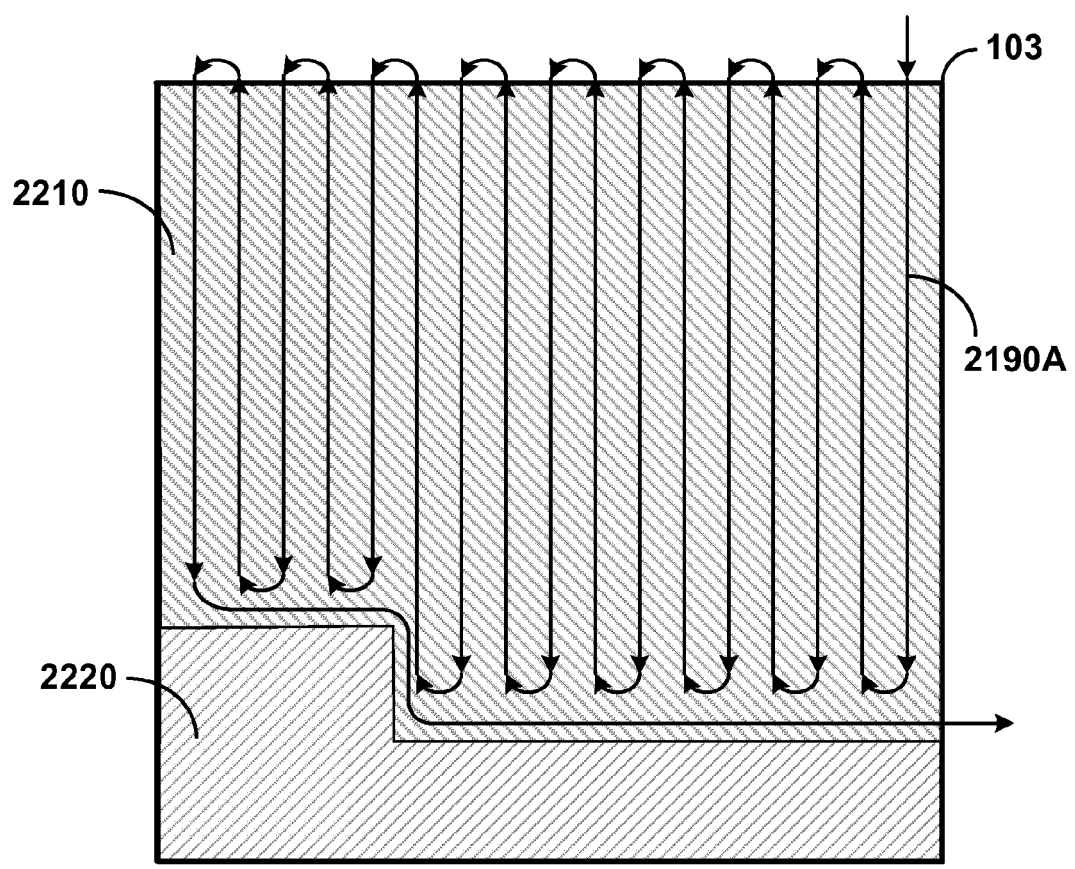
FIG. 23 illustrates an example of a harvest path generated for an unharvested field, according to one or more embodiments.

FIG. 23 illustrates an example of a harvest path 2190A generated for an unharvested field (field 103 of FIG. 1), according to one or more embodiments. Harvest path 2190A of FIG. 23 is configured to harvest of a region 2210 of a crop in the illustrated region of field 103 which possesses a particular estimated crop characteristic value that is different from an estimated crop characteristic value of the crops growing in region 2220. Of note, harvest path 2190A attempts to harvest only region 2210 in an efficient manner while avoiding region 2220. In one embodiment, harvest path 2190A is forwarded via communication network 715 to a steering control of a combine and utilized to auto steer the combine through field 103.

Example Method(s) of Crop Characteristic Estimation

Figure 24B:
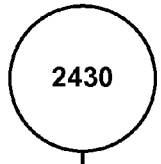
Figure 24C:
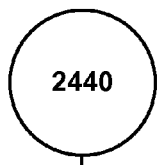

FIGS. 24A, 24B, and 24C illustrate a flow diagram 2400 of an example method of crop characteristic estimation, according to various embodiments. Although specific procedures are disclosed in flow diagram 2400, embodiments are well suited to performing various other procedures or variations of the procedures recited in flow diagram 2400. It is appreciated that the procedures in flow diagram 2400 may be performed in an order different than presented, that not all of the procedures in flow diagram 2400 may be performed, and that additional procedures to those illustrated and described may be performed. All of, or a portion of, the procedures described by flow diagram 2400 can be implemented by a processor or computer system (e.g., processor 430 and/or computer system 750) executing instructions which reside, for example, on computer-usable/readable media. The computer-usable/readable media can be any kind of non-transitory storage media that instructions can be stored on. Non-limiting examples of the computer-usable/readable media include, but are not limited to a diskette, a compact disk (CD), a digital versatile device (DVD), read only memory (ROM), flash memory, and so on.

At 2410 of flow diagram 2400, in one embodiment, a database containing plant growth models for a plurality of fields is accessed. This can comprise, for example, computer system 750 and/or plant growth model correlator 2160 accessing database 429 to acquire or search plant growth models 515 and/or other crop related information available in database 429.

At 2420 of flow diagram 2400, in one embodiment, at least one harvested field with a first plant growth model is determined which correlates with a second plant growth model for at least a portion of an unharvested field. This can comprise, for example, computer system 750 and/or plant growth model correlator 2160 accessing database 429 to acquire or search plant growth models 515 available in database 429. The determination of a correlating harvested field may be based on recent data (same growing season), historical data (past growing seasons), or a combination thereof. The correlation of the first and second plant growth models may be further based upon other factors, including, but not limited to: a commonality of management zones between portions of the harvested and unharvested fields; correlation between growing days between the harvested and unharvested fields; and/or correlation between weather data for the harvested and unharvested fields. In one embodiment, a correlation may be found if items being correlated correlate above some threshold, such as a statistical correlation of between 0.75 and 1.0, a statistical correlation between 0.90 and 1.0, a statistical correlation between 0.95 and 1.0. Such correlations may be preset and/or user defined. In general, certain correlations may need to be stronger than others in order to achieve reliable estimations of crop characteristics. For example, in one embodiment, the correlation between management zones of harvested and unharvested fields is required to be stronger than the correlation between plant growth models of the same harvested and unharvested fields. For example, in one embodiment, in one embodiment, the correlation between management zones of harvested and unharvested fields is required to be 1.0 while the correlation between plant growth models of the same harvested and unharvested fields is required to be 0.95 or higher. Other correlation ranges are possible and anticipated.

At 2430 of flow diagram 2400, in one embodiment, a crop characteristic for the unharvested field is estimated based on actual crop characteristic data obtained from the at least one harvested field. The estimated crop characteristic, in various embodiments, may be a yield, moisture content, protein content, test weight, or other crop characteristic that can be measured from the harvested crop. This estimation is performed, in one embodiment, by crop characteristic estimator 2165. In one embodiment, the estimate comprises estimating correlated portions of the harvested and unharvested field to have identical crop characteristics. In other embodiments, the estimate can be adjusted away from identical or specified as a range based on a variety of factors such as the strength of correlation, weather, growing days, time since harvest, etc. For example, given a strong or identical correlation between a harvested and unharvested field, estimations for a characteristic such as moisture content of corn may decrease with an increase growing time for the unharvested field as compared to the harvested field, in general this is because after a certain period of growing time moisture content may decrease at a fairly predictable rate but will not increase further.

At 2440 of flow diagram 2400, in one embodiment, the method as described in 2410-2430 further includes generating an estimated crop characteristic map 2185 of the unharvested field. In one embodiment, estimated crop characteristic map generator 2170 generates the estimated crop characteristic map 2185. Estimated crop characteristic map 2185 illustrates the estimated crop characteristic(s) relative to locations within the unharvested field. In one embodiment, estimated crop characteristic map 2185 is generated and output in a tangible form by computer system 750, such as by sending estimated crop characteristic map 2185 to a printer. In other embodiments, this may comprise providing an electronic version of estimated crop characteristic map 2185 which may be displayed on a display device, printed, or utilized in another manner. Estimated crop characteristic map 2185A of FIG. 22 provides one example of an estimated crop characteristic map 2185.

At 2450 of flow diagram 2400, in one embodiment, the method as described in 2440 further includes generating a harvest path 2190 for the unharvested field based on the estimated crop characteristic map 2185. In one embodiment, harvest path generator 2175 generates the harvest path 2190. As described previously, in some embodiments, the harvest path 2190 may be generated based upon the estimated crop characteristic map 2190 and a specified crop characteristic value 2110. The specified crop characteristic value 2110 may be above or below a certain estimated value for a crop characteristic, or a range of estimated values for the crop characteristic. Other user specified information such as a desired general direction of travel of a combine and/or width/number of rows covered by a combine head may be received by harvest path generator as inputs upon which a generation of a harvest path 2190 is based. Harvest path 2190A of FIG. 23 illustrates one example of a harvest path 2190.

The above description of embodiments is provided to enable any person skilled in the art to make or use the disclosure. The described embodiments have been presented for purposes of illustration and description and are not intended to be exhaustive or to limit the description of embodiments to the precise forms disclosed. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A system for agricultural monitoring and prediction, said system comprising:

a first reporting agent configured for reporting aerial data representing relative measurements of an agricultural metric in a geographic area, the relative measurements having an unknown bias;

a second reporting agent configured for reporting ground-based data representing absolute measurements of the agricultural metric for a portion of the geographic area; and a database configured for storing said ground-based data and said aerial data along with other farming data for a wide geographic area; and a processor configured for accessing the database and using said ground-based data for the portion of said geographic area to calibrate said aerial data, thereby synthesizing absolute measurements of the agricultural metric for said geographic area from said aerial data, wherein said synthesizing absolute measurements further comprises:

using a plant growth model to propagate said ground-based data forward or backward in time as needed to compare it with non-contemporaneous aerial data, wherein said processor is further configured to generate a prescription for an application of chemicals to an agricultural field based in part on said synthesized absolute measurements, and wherein a physical crop treatment applicator is configured to apply said chemicals to said agricultural field based on said generated prescription for the application of chemicals.

2. The system of claim 1, further comprising an aggregating agent configured for coupling with said database and filtering data collected across said wide geographic area based on attributes common with those of a particular agricultural field to generate a report relevant to said particular agricultural field.

3. The system of claim 1, wherein said first reporting agent comprises a reporting agent coupled with an aircraft.

4. The system of claim 1, wherein said first reporting agent is coupled with a crop dusting aircraft.

5. The system of claim 1, wherein said second reporting agent is coupled with a land bound vehicle.

6. The system of claim 1, wherein said second reporting agent is coupled with a mobile device which is hand-holdable.

7. A system for agricultural monitoring and prediction, said system comprising:

a data source of aerial data representing relative measurements of an agricultural metric in a geographic area, the relative measurements having an unknown bias;

a reporting agent configured for reporting ground-based data representing absolute measurements of the agricultural metric for a portion of the geographic area; and a database configured for storing said ground-based data and said aerial data along with other farming data for a wide geographic area; and a processor configured for accessing the database and using said ground-based data for the portion of said geographic area to calibrate said aerial data, thereby synthesizing absolute measurements of the agricultural metric for said geographic area from said aerial data, wherein said synthesizing absolute measurements further comprises:

using a plant growth model to propagate said ground-based data forward or backward in time as needed to compare it with non-contemporaneous aerial data, wherein said processor is further configured to generate a prescription for an application of chemicals to an agricultural field based in part on said synthesized absolute measurements, and wherein a physical crop treatment applicator is configured to apply said chemicals to said agricultural field based on said generated prescription for the application of chemicals.

8. The system of claim 7, further comprising an aggregating agent configured for coupling with said database and filtering data collected across said wide geographic area based on attributes common with those of a particular agricultural field to generate a report relevant to said particular agricultural field.

9. The system of claim 7, wherein said data source comprises a public data source.

10. The system of claim 7, wherein said data source comprises a private data source.

11. The system of claim 7, wherein said reporting agent is coupled with a land bound vehicle.

12. The system of claim 7, wherein said reporting agent is coupled with a mobile device which is hand-holdable.

13. A non-transitory computer-readable storage medium having computer readable instructions stored thereon which, when executed, cause a processor to perform a method of agricultural monitoring and prediction, said method comprising:

obtaining aerial data representing relative measurements of an agricultural metric in a geographic area, said aerial data having an unknown bias;

obtaining ground-based data representing absolute measurements of said agricultural metric within said geographic area;

using said ground-based data to calibrate said aerial data, thereby synthesizing absolute measurements of said agricultural metric in parts of said geographic area from said aerial data; wherein said synthesizing absolute measurements further comprises:

using a plant growth model to propagate said ground-based data forward or backward in time as needed to compare it with non-contemporaneous aerial data;

storing said ground-based data and said synthesized absolute measurements in a database along with other farming data collected across a wide geographic area and generating a prescription for an application of chemicals to an agricultural field based in part on said synthesized absolute measurements, and wherein a physical crop treatment applicator is configured to apply said chemicals to said agricultural field based on said generated prescription for the application of chemicals.

14. The non-transitory computer-readable storage medium of claim 13, wherein said instructions for said method further comprise instructions for:

filtering data collected across said wide geographic area based on attributes common with those of a particular agricultural field to generate a report relevant to said particular agricultural field.

15. The non-transitory computer-readable storage medium of claim 13, wherein said instructions for said method further comprise instructions for:

combining said ground-based data and said synthesized absolute measurements with additional spatial agricultural data for the generating of the prescription for the application of chemicals to the agricultural field.

16. The non-transitory computer-readable storage medium of claim 15, wherein said combining said ground-based data and said synthesized absolute measurements with additional spatial agricultural data for the generating of the prescription for the application of chemicals to the agricultural field comprises:

using a second agricultural metric and climate data as said additional spatial agricultural data.

17. The non-transitory computer-readable storage medium of claim 16, wherein said using an agricultural metric and climate data as said additional spatial agricultural data comprises:
    using a normalized difference vegetative index as said second agricultural metric and growing degree days since planting as said climate data.

18. The non-transitory computer-readable storage medium of claim 13, wherein said plant growth model is a linear model.

19. The non-transitory computer-readable storage medium of claim 13, wherein said agricultural metric comprises a normalized difference vegetative index.

20. The non-transitory computer-readable storage medium of claim 13, wherein said agricultural metric comprises a reflectance-based vegetative index.

* * * * *

UNITED STATES PATENT AND TRADEMARK OFFICE
CERTIFICATE OF CORRECTION

PATENT NO. : 9,058,633 B2  
APPLICATION NO. : 13/280298  
DATED : June 16, 2015  
INVENTOR(S) : Robert J. Lindores et al.

It is certified that error appears in the above-identified patent and that said Letters Patent is hereby corrected as shown below:

ON THE TITLE PAGE

Page 3, Item (56) Other Publications, Column 2, Line 19,
Delete: "A Simplt Model for Nitrogen-limited Plant"
Insert: --A Simple Model for Nitrogen-limited Plant--

IN THE CLAIMS

Column 44, Line 39, Claim 13: Delete: "area and"
Insert: --area; and--

Signed and Sealed this
Sixth Day of October, 2015

Michelle K. Lee
*Director of the United States Patent and Trademark Office*